(12) United States Patent
Araki et al.

(10) Patent No.: US 10,947,346 B2
(45) Date of Patent: Mar. 16, 2021

(54) POLYARYLENE SULFIDE RESIN, METHOD FOR PRODUCING SAME, POLY(ARYLENE SULFONIUM SALT), AND METHOD FOR PRODUCING POLY(ARYLENE SULFONIUM SALT)

(71) Applicants: DIC Corporation, Tokyo (JP); National University Corporation, Iwate University, Morioka (JP)

(72) Inventors: Shun Araki, Ichihara (JP); Hajime Watanabe, Ichihara (JP); Satoshi Ogawa, Morioka (JP); Toshikazu Takata, Tokyo (JP)

(73) Assignees: DIC Corporation, Tokyo (JP); National University Corporation, Iwate University, Morioka (JP)

( * ) Notice: Subject to any disclaimer, the term of this patent is extended or adjusted under 35 U.S.C. 154(b) by 0 days.

(21) Appl. No.: 16/750,418

(22) Filed: Jan. 23, 2020

(65) Prior Publication Data
US 2020/0157284 A1 May 21, 2020

Related U.S. Application Data

(62) Division of application No. 15/552,936, filed as application No. PCT/JP2016/055260 on Feb. 23, 2016, now Pat. No. 10,577,464.

(30) Foreign Application Priority Data

Feb. 26, 2015 (JP) ................................. 2015-036565
Jan. 25, 2016 (JP) ................................. 2016-011898

(51) Int. Cl.
*C08G 75/0227* (2016.01)
*C08L 81/02* (2006.01)
(Continued)

(52) U.S. Cl.
CPC ......... *C08G 75/0227* (2013.01); *C08G 75/02* (2013.01); *C08G 75/0231* (2013.01); *C08L 81/02* (2013.01)

(58) Field of Classification Search
CPC .... C07F 7/0801; C07F 7/0832; C07F 7/0827; C08G 75/00; C07B 51/00; C07D 209/12
See application file for complete search history.

(56) References Cited

U.S. PATENT DOCUMENTS 2,513,188 A 6/1950 Macallum
3,354,129 A 11/1967 Edmonds, Jr. et al.
(Continued)

FOREIGN PATENT DOCUMENTS

CN 104254574 A 12/2014
EP 2053074 A1 4/2009
(Continued)

OTHER PUBLICATIONS

Kenichi Oyaizu et al., "Convenient Syntheses of Methylsulfonioarylene and Thioarylene Polymers from 1,4-bis (Methylsulfinyl) benzene", Journal of Macromolecular Science Part A—Pure and Applied Chemistry, vol. 40, Issue 4, 2003, p. 415-p. 423 and information sheets.

(Continued)

*Primary Examiner* — Shane Fang
(74) *Attorney, Agent, or Firm* — Locke Lord LLP; James E. Armstrong, IV; Nicholas J. DiCeglie, Jr.

(57) ABSTRACT

Disclosed is a production method comprising a step of obtaining a poly(arylene sulfonium salt) comprising a terminal group including at least one functional group selected from the group consisting of a carboxy group, a hydroxy group and an amino group, and a step of dealkylating or dearylating the poly(arylene sulfonium salt) to obtain a polyarylene sulfide resin, and a polyarylene sulfide resin (Continued)

comprising a terminal group including a functional group obtainable by the production method.

3 Claims, 46 Drawing Sheets

(51) Int. Cl.
*C08G 75/02* (2016.01)
*C08G 75/0231* (2016.01)

(56) References Cited

U.S. PATENT DOCUMENTS

| | | | |
|---|---|---|---|
| 3,987,016 | A | 10/1976 | Haddad et al. |
| 6,159,657 | A | 12/2000 | Fleming et al. |

FOREIGN PATENT DOCUMENTS

| | | | |
|---|---|---|---|
| EP | 2860221 | A1 | 4/2015 |
| JP | 10-182825 | A | 7/1998 |
| JP | 2013-010908 | A | 1/2013 |
| JP | 2015-048447 | A | 3/2015 |
| WO | 94/025507 | A1 | 11/1994 |
| WO | 2013/161321 | A1 | 10/2013 |
| WO | 2014/046483 | A1 | 3/2014 |

OTHER PUBLICATIONS

Satoshi Ogawa et al., "Synthesis and Properties of Poly(p-phenylene sulfide) Derivatives via Poly(sulfonium salt) by Copolymerization of Two Monomer Species", CSJ:The Chemical Society of Japan Koen Yokoshu, vol. 94th, No. 4, Mar. 12, 2014, p. 1312, information sheets and English transation thereof.

Satoshi Ogawa et al., "Development of New Synthetic Procedure of Poly(phenylene sulfide)", CSJ:The Chemical Society of Japan Koen Yokoshu, vol. 91st, No. 4, Mar. 11, 2011, p. 1320, information sheets and English translation thereof.

Satoshi Ogawa et al., "Synthesis and properties of terminal-modified poly(p-phenylene sulfide) intended to improve polymer properties", Kagakukeigaku Kyokai Tohoku Taikai Program Oyobi Koen Yokoshu, vol. 2012, Sep. 15, 2012, p. 114, information sheets and English translation thereof.

Leuninger J et al., "Novel Approach to Ladder-Type Polymers:Polydithiathianthrene via the Intramolecular Acid-Induced Cyclization of Methylsulfinyl-Substituted Poly(meta phenylene sulfide)", Macromol Chem Phys,vol. 202, No. 14, Sep. 28, 2001, p. 2832-p. 2842.

International Search Report dated May 17, 2016, issued for PCT/JP2016/055260.

International Preliminary Report on Patentability dated Sep. 8, 2017and Written Opinion dated May 17, 2016, issued for PCT/JP2016/055260.

Kenichi Oyaizu et al., "Convenient Syntheses of Methylsulfonioarylene and Thioarylene Polymers from 1,4-bis (Methylsulfinyl) benzene", Journal of Macromolecular Science, Part A—Pure and Applied Chemistry., vol. 40, No. 4, Jan. 4, 2003, pp. 415-423, XP055322966.

Search Report dated Jun. 25, 2018, issued for the European patent application No. 16755482.3.

Notification of First Office Action issued in corresponding Chinese Patent Application No. CN 201680011426.4, dated Mar. 20, 2019.

Office Action issued in corresponding Taiwanese Patent Application No. TW 105105581, dated Aug. 8, 2019.

POLYARYLENE SULFIDE RESIN, METHOD FOR PRODUCING SAME, POLY(ARYLENE SULFONIUM SALT), AND METHOD FOR PRODUCING POLY(ARYLENE SULFONIUM SALT)

CROSS REFERENCE TO RELATED APPLICATIONS

This Application is a Divisional of U.S. patent application Ser. No. 15/552,936 filed on Aug. 23, 2017, which application is a 371 U.S. National Phase Application of Application No. PCT/JP2016/055260, filed Feb. 23, 2016, which application claims priority to Japanese Patent Application No. 2016-011898 filed on Jan. 25, 2016 and Japanese Patent Application No. 2015-036565 filed on Feb. 26, 2015. The entire contents of these applications are incorporated herein by reference in their entirety.

TECHNICAL FIELD

The present invention relates to a polyarylene sulfide resin, a method for producing the same, a poly(arylene sulfonium salt), and a method for producing the same.

BACKGROUND ART

Polyarylene sulfide resins (hereinafter sometimes abbreviated as "PAS resin"), the representative of which is a polyphenylene sulfide resin (hereinafter sometimes abbreviated as "PPS resin") are excellent in heat resistance, chemical resistance and the like and widely utilized for applications such as electric/electronic parts, automotive parts, water heater parts, fibers and films.

A polyphenylene sulfide resin is conventionally produced by using solution polymerization in which p-dichlorobenzene, and sodium sulfide or sodium hydrosulfide, and sodium hydroxide are used as raw materials to polymerize in an organic polar solvent (e.g., see Patent Literature 1). Polyphenylene sulfide resins which are currently commercially available are generally produced by this method.

However, since dichlorobenzene was used for a monomer in the method, the concentration of halogen remaining in the resin after synthesis tends to be high. It was also necessary to perform polymerization reaction under a severe environment of high temperature and high pressure/strong alkaline, which requires to use a polymerization vessel using titanium, chromium or zirconium, which is expensive and hard-to-process, for the wetted part.

Accordingly, methods for producing a polyarylene sulfide resin without using dichlorobenzene as a monomer for polymerization and under moderate polymerization conditions are known. For Example, Patent Literature 2 discloses a solvent-soluble poly(arylene sulfonium salt) as a precursor for synthesis of a polyarylene sulfide resin. Poly(arylene sulfonium salt) is produced through a method of homopolymerizing a sulfoxide having one sulfinyl group (hereinafter, also referred to as "monofunctional sulfoxide") such as methyl phenyl sulfoxide in the presence of an acid (e.g., see Patent Literature 2 and Non Patent Literature 1).

CITATION LIST

Patent Literature

Patent Literature 1: U.S. Pat. No. 3,354,129
Patent Literature 2: Japanese Unexamined Patent Publication No. H10-182825

Non Patent Literature

Non Patent Literature 1: JOURNAL OF MACROMOLECULAR SCIENCE Part A—Pure and Applied Chemistry, Volume 40, Issue 4, p. 415-423

SUMMARY OF INVENTION

Technical Problem

In the case of a method for producing a polyarylene sulfide resin through homopolymerization of a monofunctional sulfoxide, the constitutional unit possessed by the resin is measured by the structure of a monofunctional sulfoxide as a raw material. Hence, when the constitutional unit possessed by a polyarylene sulfide resin is changed in accordance with the intended use, the first task is usually design of a monofunctional sulfoxide as a raw material. However, the number of available options for the monofunctional sulfoxide is small, and the acceptable range of the constitutional unit of a polyarylene sulfide resin is quite limited in a substantial way.

In addition, polyarylene sulfide resins produced through the above production methods have no highly reactive functional group at the terminal, and thus they are poor in reactivity to resins other than polyarylene sulfide resins and insufficient in functionality as a resin.

Non Patent Literature 1 discloses a method of reacting 1,4-bis(methylsulfinyl)benzene, as a sulfoxide having two sulfinyl groups (hereinafter, sometimes referred to as "bifunctional sulfoxide"), with various aromatic compounds in the presence of diphosphorus pentoxide and trifluoromethanesulfonic acid. According to this method, a wide variety of polyarylene sulfide resins having a sulfide group can be produced by changing the aromatic compound. In this method, however, it is difficult to obtain a resin having a sufficiently high molecular weight.

In addition, polyarylene sulfide resins produced through this production method have no highly reactive functional group at the terminal, and thus they are poor in reactivity to other resins and lack functionality as a resin.

Accordingly, the object to be achieved by the present invention is to provide a polyarylene sulfide resin allowing a high degree of freedom in design of the constitutional unit, having a sufficiently high molecular weight, and having a highly reactive functional group, and a method for producing the same.

Solution to Problem

The present inventors diligently studied to achieve the object, and found that a polyarylene sulfide resin comprising a particular functional group at a terminal can be obtained by a production method comprising a step of obtaining a poly(arylene sulfonium salt) comprising a particular functional group at a terminal, and a step of dealkylating or dearylating the poly(arylene sulfonium salt) to obtain a polyarylene sulfide resin, and thus the above object was achieved.

Specifically, one aspect of the present invention relates to (1) a polyarylene sulfide resin comprising a main chain including a constitutional unit represented by the following formula (1-1) or the following formula (2-1) and a terminal group bonding to a terminal of the main chain and including at least one functional group selected from the group consisting of a carboxy group, a hydroxy group and an amino group.

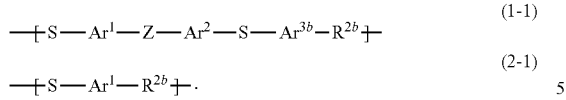

(1-1)

(2-1)

In the formulas, $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1$, $Ar^2$, $Ar^{3b}$ and $Ar^{4b}$ each independently represent an arylene group optionally having a substituent; and Z represents a direct bond, $-S-$, $-O-$, $-CO-$, $-SO_2-$ or $-C(CF_3)_2-$.

Provided that, in formula (1-1), Z is a direct bond, $-CO-$, $-SO_2-$ or $-C(CF_3)_2-$ in the case that $Ar^1$, $Ar^2$ and $Ar^{3b}$ are each a 1,4-phenylene group and $R^{2b}$ is a direct bond, and Z is $-S-$, $-O-$, $-CO-$, $-SO_2-$ or $-C(CF_3)_2-$ in the case that $Ar^1$, $Ar^2$ and $Ar^{3b}$ are each a 1,4-phenylene group, $R^{2b}$ is $-Ar^{4b}-$, and $Ar^{4b}$ is a 1,4-phenylene group.

Still another aspect of the present invention is (2) a method for producing a polyarylene sulfide resin comprising a main chain including a constitutional unit represented by the following formula (1-1) or the following formula (2-1) and a terminal group bonding to a terminal of the main chain and including at least one functional group selected from the group consisting of a carboxy group, a hydroxy group and an amino group.

The method comprises a step of dealkylating or dearylating a poly(arylene sulfonium salt) comprising a main chain including a constitutional unit represented by the following formula (1-2) or a constitutional unit represented by the following formula (2-2) and a terminal group bonding to a terminal of the main chain and including at least one functional group selected from the group consisting of a carboxy group, a hydroxy group and an amino group.

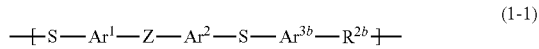

(1-1)

(2-1)

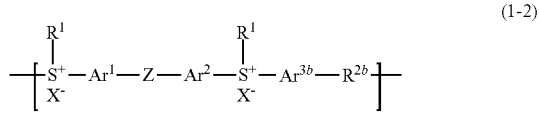

(1-2)

(2-2)

In formulas (1-1), (1-2), (2-1) and (2-2), $R^1$ represents an alkyl group having 1 to 10 carbon atoms or an aryl group optionally having an alkyl group having 1 to 10 carbon atoms; $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1$, $Ar^2$, $Ar^{3b}$ and $Ar^{4b}$ each independently represent an arylene group optionally having a substituent; Z represents a direct bond, $-S-$, $-O-$, $-CO-$, $-SO_2-$ or $-C(CF_3)_2-$; and $X^-$ represents an anion.

Another aspect of the present invention relates to (3) a poly(arylene sulfonium salt) comprising a main chain including a constitutional unit represented by the following formula (1-2) or the following formula (2-2) and a terminal group bonding to a terminal of the main chain and including at least one functional group selected from the group consisting of a carboxy group, a hydroxy group and an amino group.

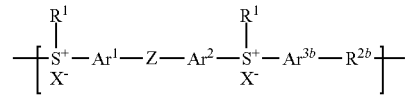

(1-2)

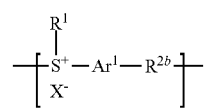

(2-2)

In formulas (1-2) and (2-2), $R^1$ represents an alkyl group having 1 to 10 carbon atoms or an aryl group optionally having an alkyl group having 1 to 10 carbon atoms; $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1$, $Ar^2$, $Ar^{3b}$ and $Ar^{4b}$ each independently represent an arylene group optionally having a substituent; Z represents a direct bond, $-S-$, $-O-$, $-CO-$, $-SO_2-$ or $-C(CF_3)_2-$; and $X^-$ represents an anion.

Still another aspect of the present invention relates to (4) a method for producing a poly(arylene sulfonium salt) comprising a main chain including a constitutional unit represented by the following formula (1-2) or a constitutional unit represented by the following formula (2-2) and a terminal group bonding to a terminal of the main chain and including at least one functional group selected from the group consisting of a carboxy group, a hydroxy group and an amino group, the method comprising (a) reacting a sulfoxide represented by the following formula (1-3) with an aromatic compound represented by the following formula (1-4) in the presence of an aromatic compound having at least one functional group selected from the group consisting of a carboxy group, a hydroxy group and an amino group, or, (b) polymerizing (reacting) a sulfoxide represented by the following formula (2-3) in the presence of an aromatic compound having at least one functional group selected from the group consisting of a carboxy group, a hydroxy group and an amino group.

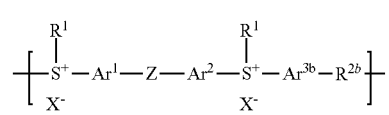

(1-2)

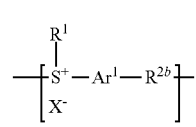

(2-2)

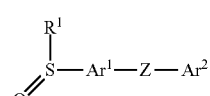

(1-3)

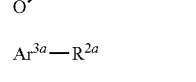

(1-4)

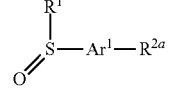

(2-3)

In the formulas, $R^1$ represents an alkyl group having 1 to 10 carbon atoms or an aryl group optionally having an alkyl group having 1 to 10 carbon atoms; $R^{2a}$ represents a hydrogen atom, $-Ar^{4a}$, $-S-Ar^{4a}$, $-O-Ar^{4a}$, $-CO-Ar^{4a}$, $-SO_2-Ar^{4a}$ or $-C(CF_3)_2-Ar^{4a}$; $Ar^{3a}$ and $Ar^{4a}$ each independently represent an aryl group optionally having a substituent; $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1, Ar^2, Ar^{3b}$ and $Ar^{4b}$ each independently represent an arylene group optionally having a substituent; Z represents a direct bond, $-S-$, $-O-$, $-CO-$, $-SO_2-$ or $-C(CF_3)_2-$; and $X^-$ represents an anion.

Still another aspect of the present invention relates to (5) a polyarylene sulfide resin comprising a main chain including a constitutional unit represented by the following formula (5-1) and having a terminal group bonding to a terminal of the main chain and represented by the following formula (3-1b), (3-2b), (3-3b), (3-4b), (3-5b) or (3-6b).

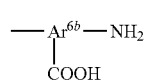
(5-1)

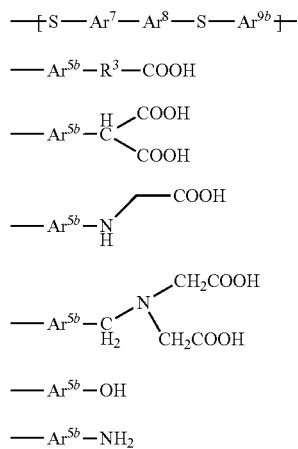

In formula (5-1), $Ar^7$, $Ar^8$ and $Ar^{9b}$ each independently represent a phenylene group optionally having a substituent; and in formulas (3-1b), (3-2b), (3-3b), (3-4b), (3-5b) and (3-6b), $R^3$ represents a direct bond or an alkylene group having 1 to 10 carbon atoms; and $Ar^{5b}$ represents an aryl group.

Still another aspect of the present invention relates to (6) a polyarylene sulfide resin comprising a main chain including a constitutional unit represented by the following formula (5-1) and a terminal group bonding to a terminal of the main chain and represented by the following formula (4-1b), (4-2b), (4-3b) or (4-4b).

—⟮S—Ar⁷—Ar⁸—S—Ar⁹ᵇ⟯— (5-1)

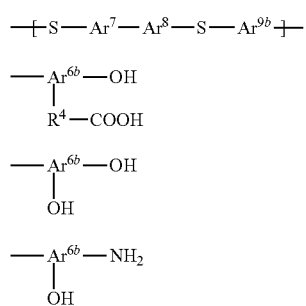

—Ar⁶ᵇ—NH₂ (4-4b)
     |
     COOH

In formula (5-1), $Ar^7$, $Ar^8$ and $Ar^{9b}$ each independently represent a phenylene group optionally having a substituent; and in formulas (4-1b), (4-2b), (4-3b) and (4-4b), $R^4$ represents a direct bond or an alkylene group having 1 to 10 carbon atoms; and $Ar^{6b}$ represents an aryl group.

Still another aspect of the present invention relates to (7) a poly(arylene sulfonium salt) comprising a main chain including a constitutional unit represented by the following formula (5-2) and a terminal group bonding to a terminal of the main chain and represented by the following formula (3-1b), (3-2b), (3-3b), (3-4b), (3-5b) or (3-6b).

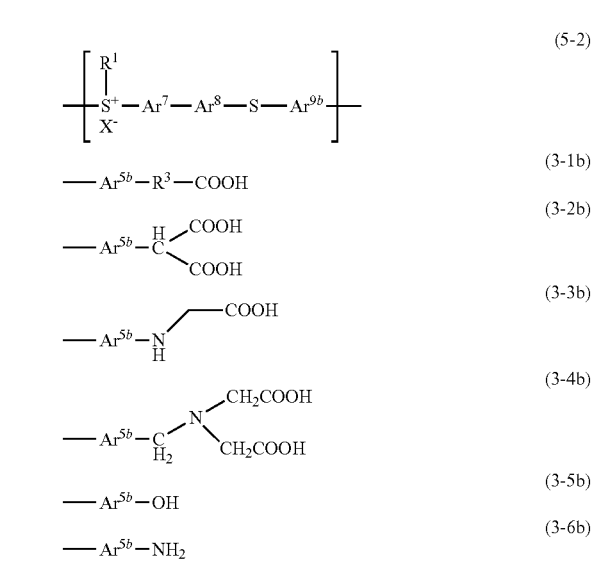

In formula (5-2), $R^1$ represents an alkyl group having 1 to 10 carbon atoms or an aryl group optionally having an alkyl group having 1 to 10 carbon atoms; $Ar^7$, $Ar^8$ and $Ar^{9b}$ each independently represent a phenylene group optionally having a substituent; and $X^-$ represents an anion; and in formulas (3-1b), (3-2b), (3-3b), (3-4b), (3-5b) and (3-6b), $R^3$ represents a direct bond or an alkylene group having 1 to 10 carbon atoms; and $Ar^{5b}$ represents an aryl group.

Still another aspect of the present invention relates to (8) a poly(arylene sulfonium salt) comprising a main chain including a constitutional unit represented by the following formula (5-2) and a terminal group bonding to a terminal of the main chain and represented by the following formula (4-1b), (4-2b), (4-3b) or (4-4b).

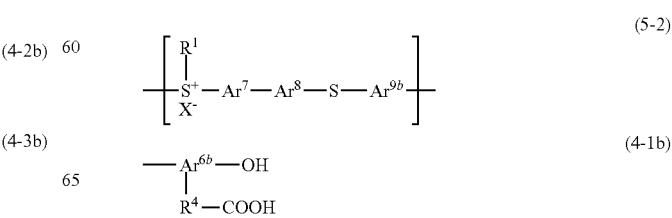

-continued

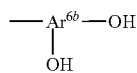
(4-2b)

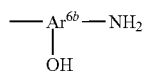
(4-3b)

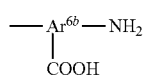
(4-4b)

In formula (5-2), $R^1$ represents an alkyl group having 1 to 10 carbon atoms or an aryl group optionally having an alkyl group having 1 to 10 carbon atoms; $Ar^7$, $Ar^8$ and $Ar^{9b}$ each independently represent a phenylene group optionally having a substituent; and $X^-$ represents an anion; and in formulas (4-1b), (4-2b), (4-3b) and (4-4b), $R^4$ represents a direct bond or an alkylene group having 1 to 10 carbon atoms; and $Ar^{6b}$ represents an aryl group.

Still another aspect of the present invention relates to (9) a molding comprising the polyarylene sulfide resin.

Advantageous Effects of Invention

The present invention can provide a polyarylene sulfide resin allowing a high degree of freedom in design of the constitutional unit, having a sufficiently high molecular weight, and having a highly reactive functional group, and a method for producing the same.

indicates the absorption peak derived from the free O—H stretching vibration of a hydroxy group.

Figure 21:
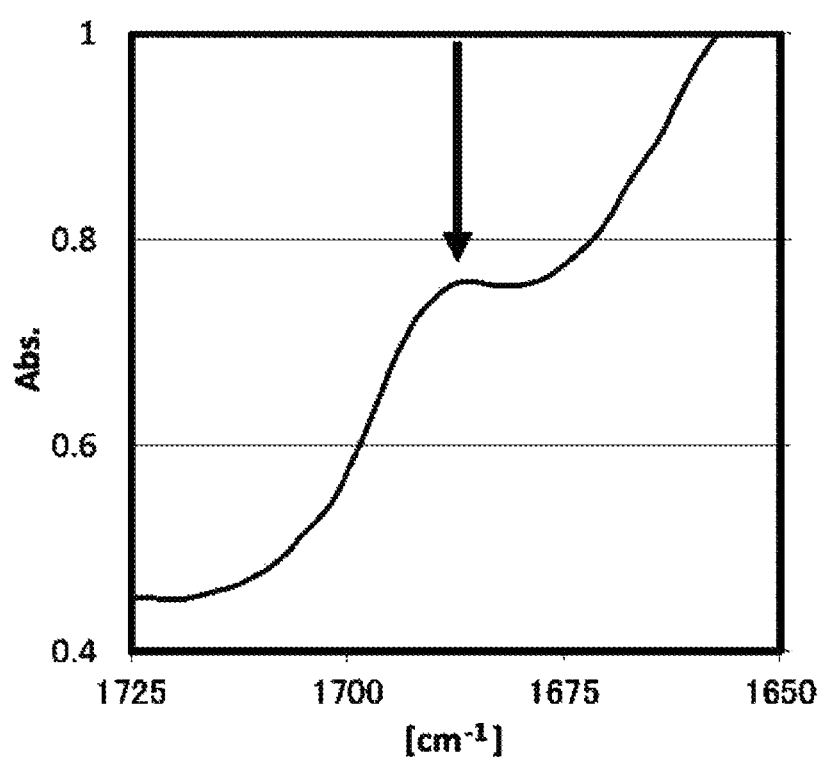

FIG. 21 shows a chart acquired from measurement of the infrared absorption spectrum of poly(p-phenylene sulfide) obtained in Example 20. The arrow (position of 1687 cm$^{-1}$) indicates the absorption peak derived from the C=O stretching vibration of a carboxy group.

Figure 22:
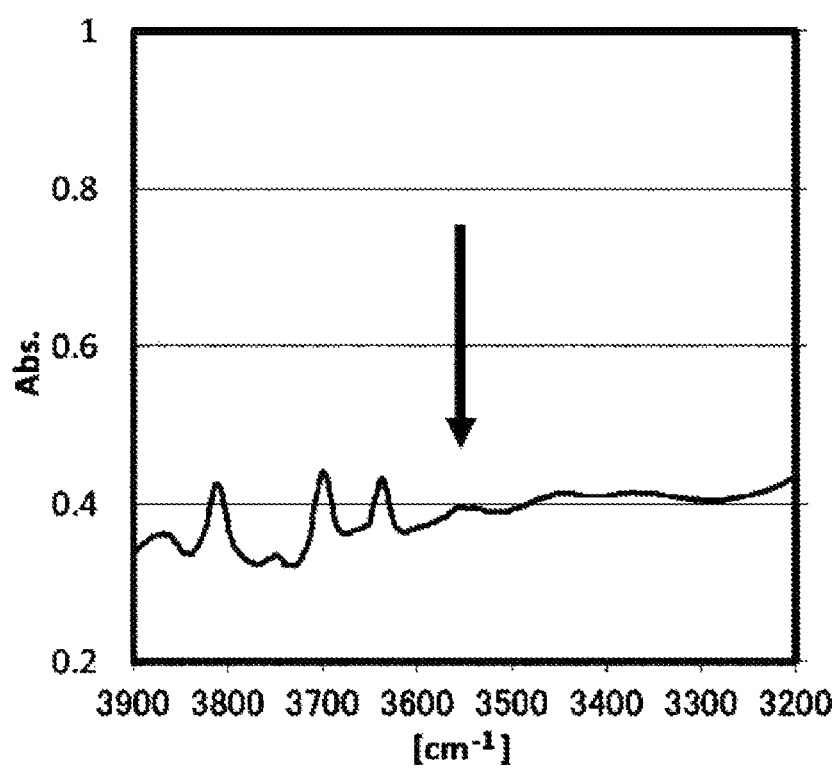

FIG. 22 shows a chart acquired from measurement of the infrared absorption spectrum of poly(p-phenylene sulfide) obtained in Example 21. The arrow (position of 3555 cm$^{-1}$) indicates the absorption peak derived from the free O—H stretching vibration of a hydroxy group.

Figure 23:
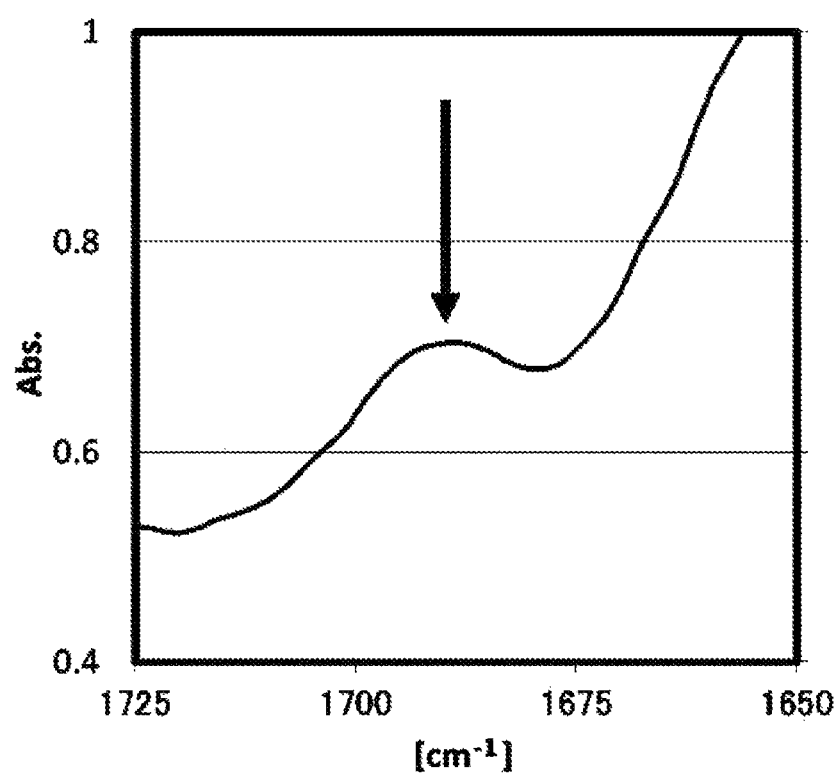

FIG. 23 shows a chart acquired from measurement of the infrared absorption spectrum of poly(p-phenylene sulfide) obtained in Example 21. The arrow (position of 1690 cm$^{-1}$) indicates the absorption peak derived from the C=O stretching vibration of a carboxy group.

Figure 24:
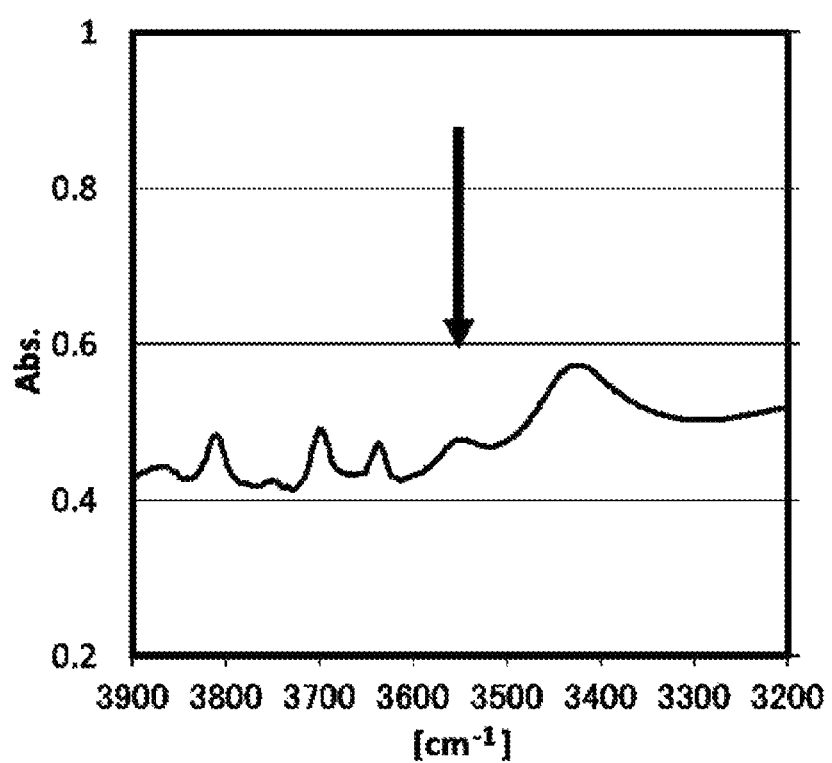

FIG. 24 shows a chart acquired from measurement of the infrared absorption spectrum of poly(p-phenylene sulfide) obtained in Example 22. The arrow (position of 3555 cm$^{-1}$) indicates the absorption peak derived from the free O—H stretching vibration of a hydroxy group.

Figure 25:
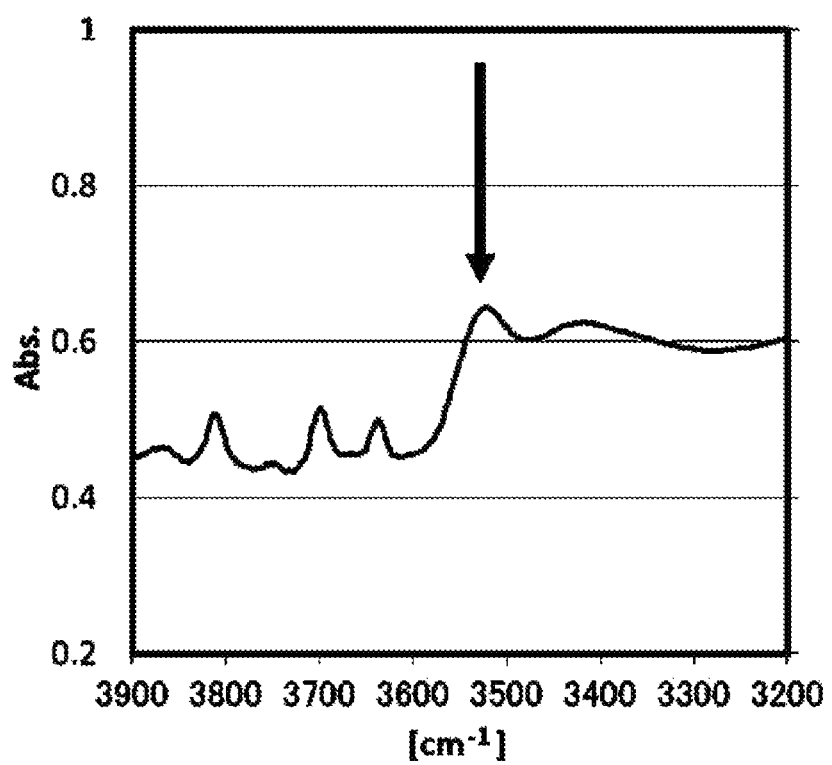

FIG. 25 shows a chart acquired from measurement of the infrared absorption spectrum of poly(p-phenylene sulfide) obtained in Example 23. The arrow (position of 3524 cm$^{-1}$) indicates the absorption peak derived from the free O—H stretching vibration of a hydroxy group.

Figure 26:
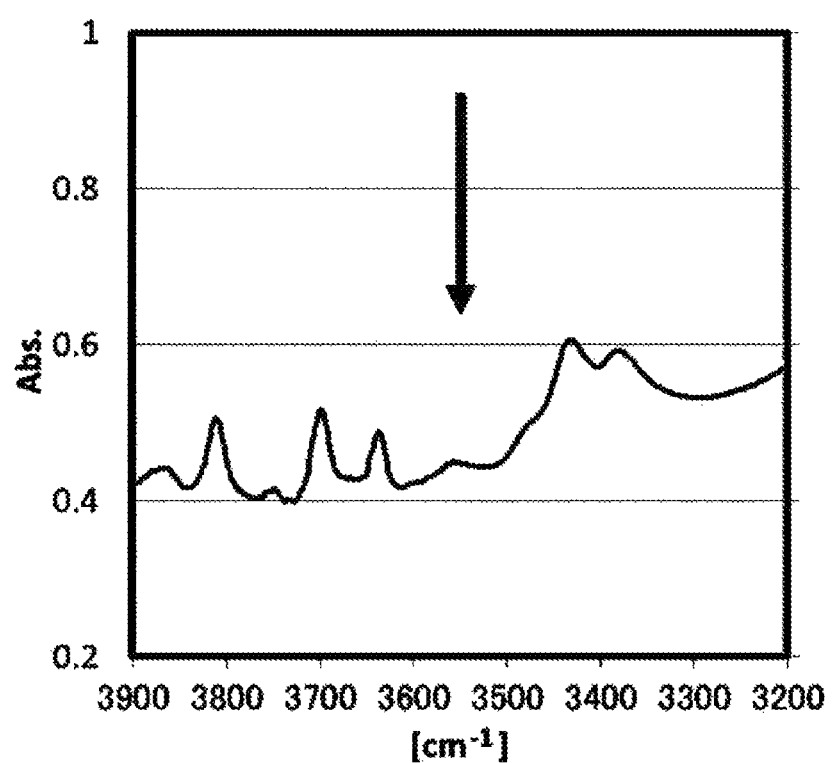

FIG. 26 shows a chart acquired from measurement of the infrared absorption spectrum of poly(p-phenylene sulfide) obtained in Example 24. The arrow (position of 3555 cm$^{-1}$) indicates the absorption peak derived from the free O—H stretching vibration of a hydroxy group.

Figure 27:
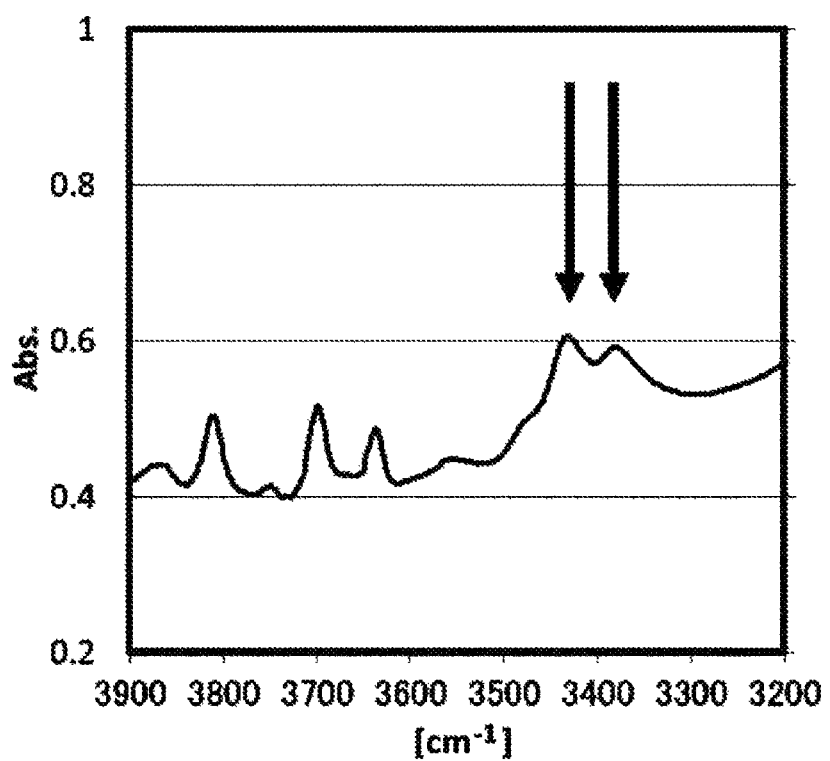

FIG. 27 shows a chart acquired from measurement of the infrared absorption spectrum of poly(p-phenylene sulfide) obtained in Example 24. The arrows (positions of 3433 cm$^{-1}$ and 3377 cm$^{-1}$) indicate the absorption peaks derived from the N—H stretching vibration of an amino group.

Figure 28:
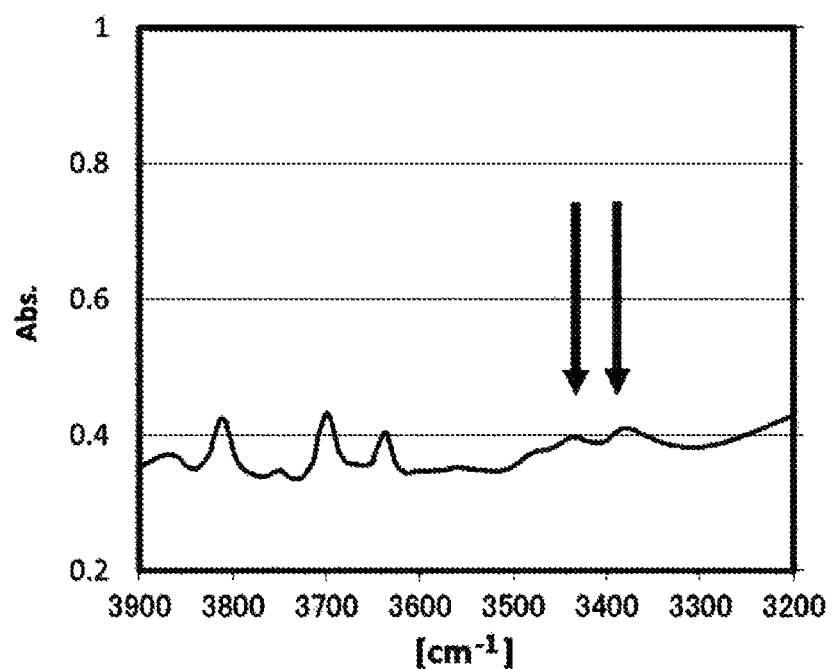

FIG. 28 shows a chart acquired from measurement of the infrared absorption spectrum of poly(p-phenylene sulfide) obtained in Example 25. The arrows (positions of 3433 cm$^{-1}$ and 3377 cm$^{-1}$) indicate the absorption peaks derived from the N—H stretching vibration of an amino group.

Figure 29:
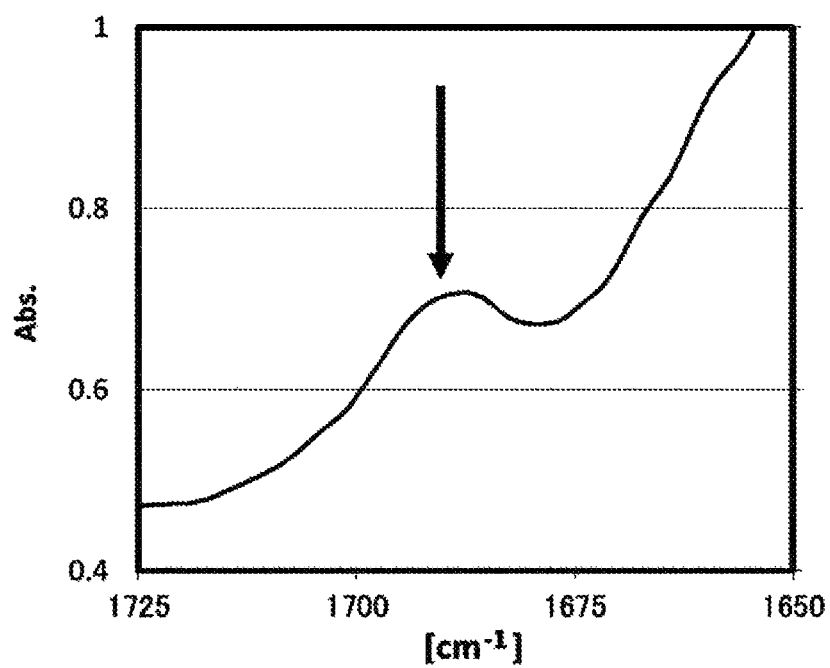

FIG. 29 shows a chart acquired from measurement of the infrared absorption spectrum of poly(p-phenylene sulfide) obtained in Example 25. The arrow (position of 1689 cm$^{-1}$) indicates the absorption peak derived from the C=O stretching vibration of a carboxy group.

Figure 30:
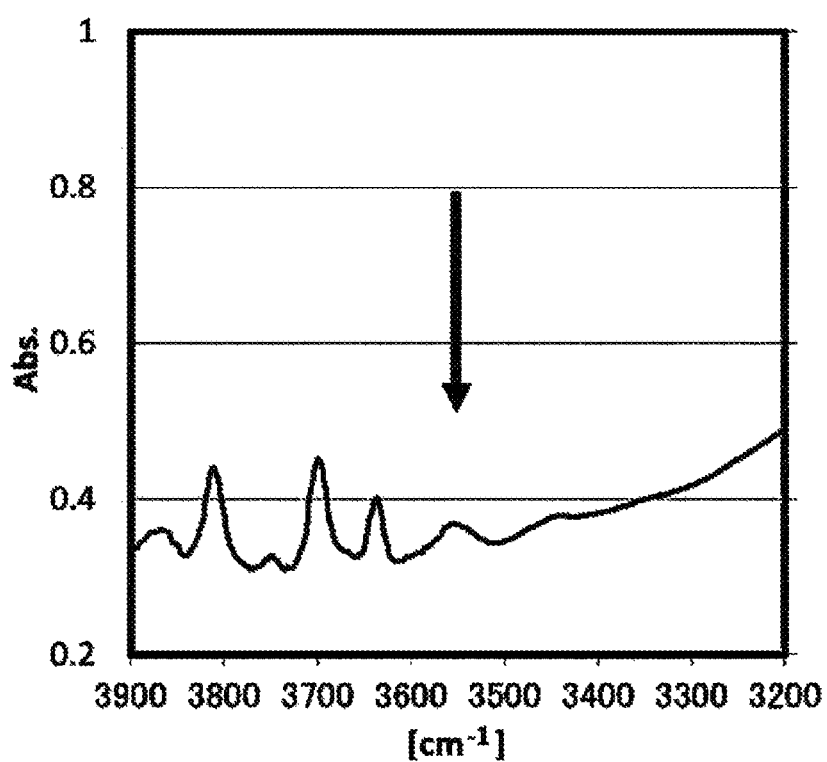

FIG. 30 shows a chart acquired from measurement of the infrared absorption spectrum of poly(p-phenylene sulfide) obtained in Example 26. The arrow (position of 3555 cm$^{-1}$) indicates the absorption peak derived from the free O—H stretching vibration of a hydroxy group.

Figure 31:
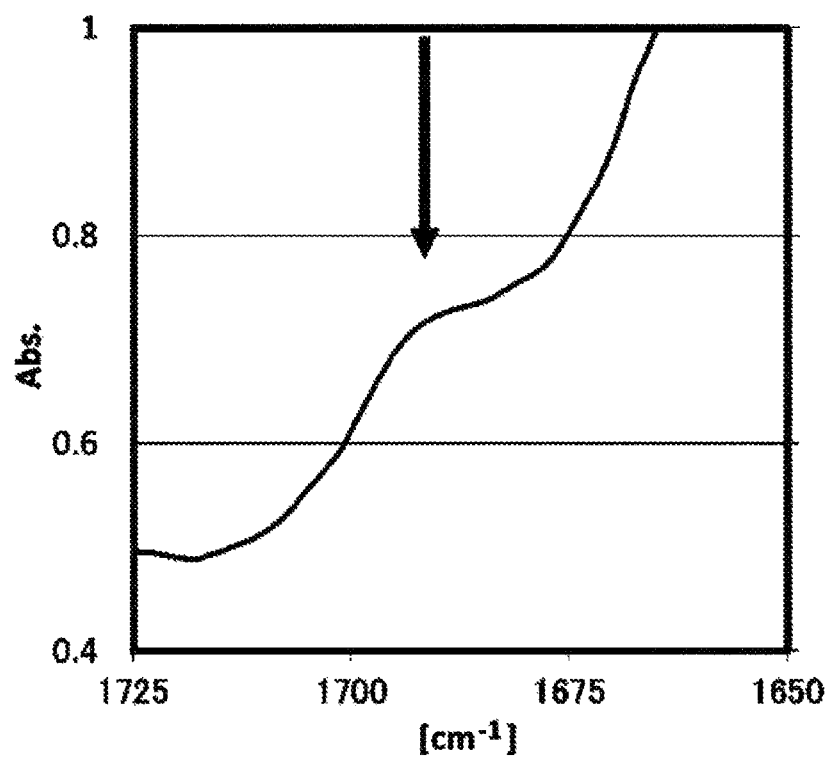

FIG. 31 shows a chart acquired from measurement of the infrared absorption spectrum of poly(p-phenylene sulfide) obtained in Example 26. The arrow (position of 1692 cm$^{-1}$) indicates the absorption peak derived from the C=O stretching vibration of a carboxy group.

Figure 32:
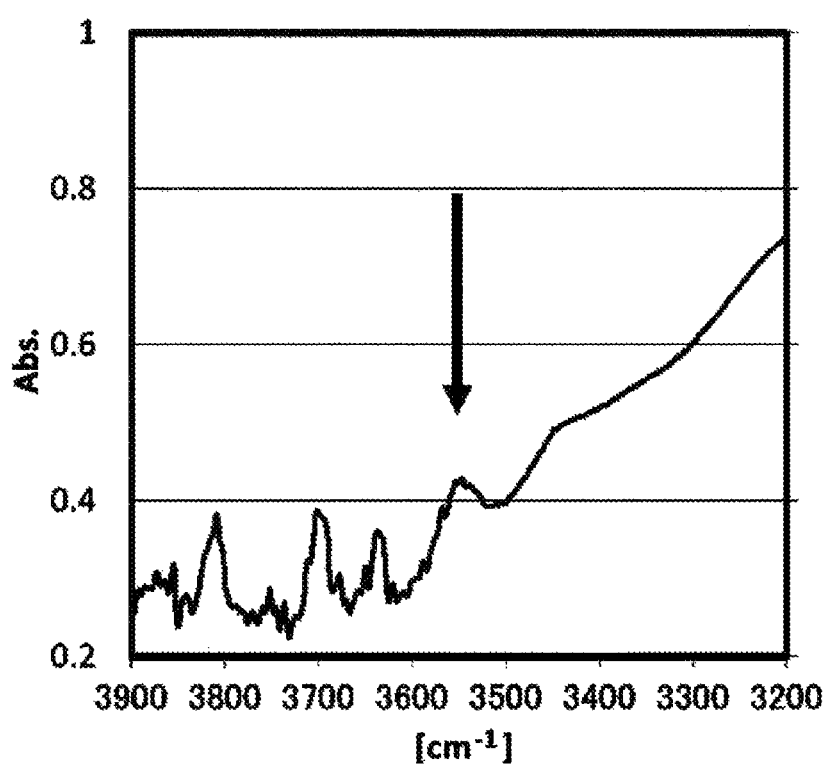

FIG. 32 shows a chart acquired from measurement of the infrared absorption spectrum of poly(p-phenylene sulfide) obtained in Example 27. The arrow (position of 3554 cm$^{-1}$) indicates the absorption peak derived from the free O—H stretching vibration of a hydroxy group.

Figure 33:
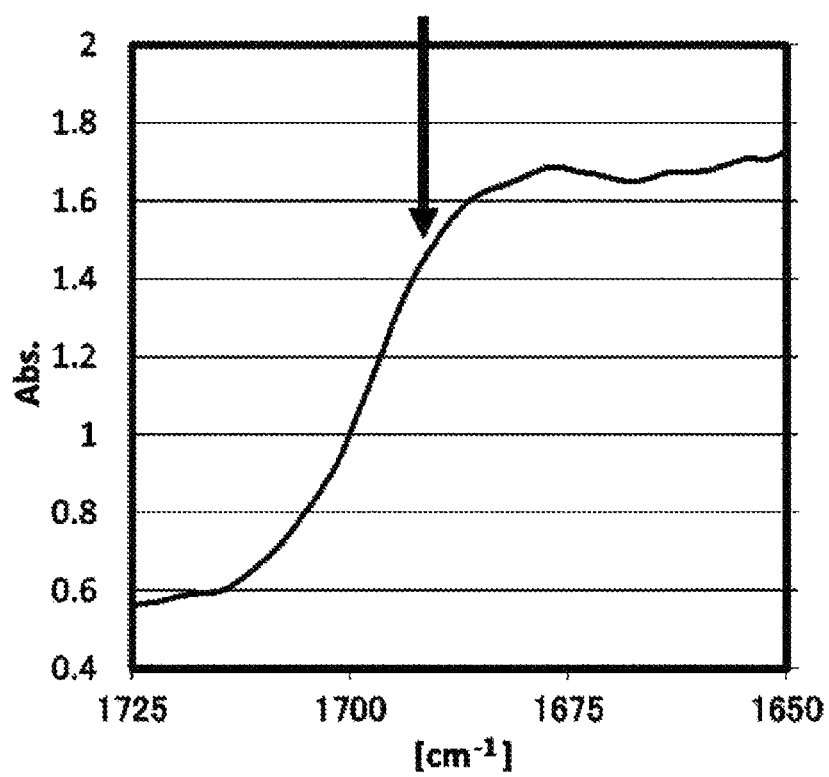

FIG. 33 shows a chart acquired from measurement of the infrared absorption spectrum of poly(p-phenylene sulfide) obtained in Example 27. The arrow (position of 1692 cm$^{-1}$) indicates the absorption peak derived from the C=O stretching vibration of a carboxy group.

Figure 34:
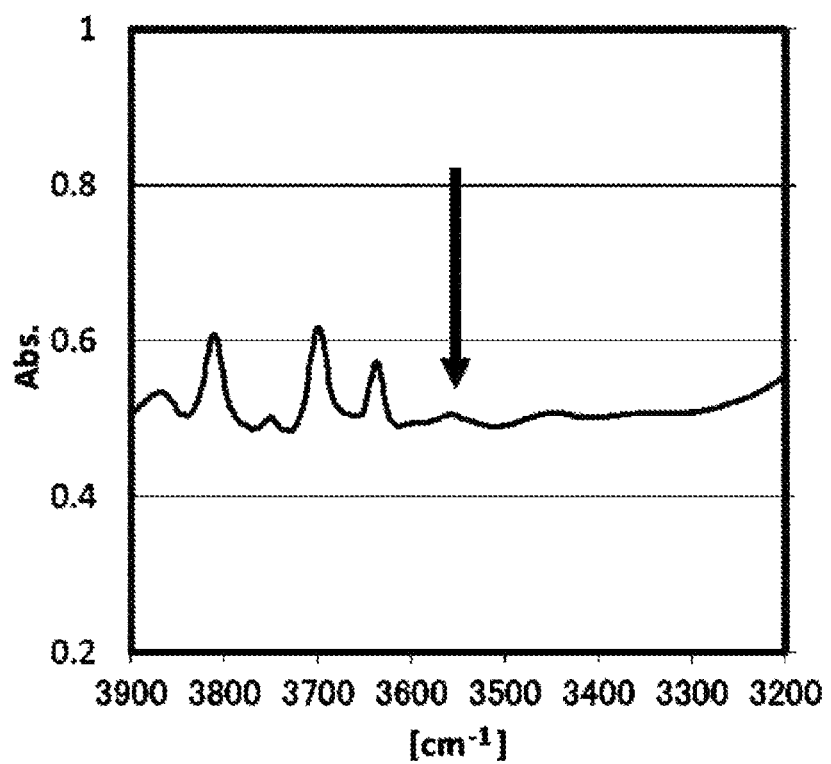

FIG. 34 shows a chart acquired from measurement of the infrared absorption spectrum of poly(p-phenylene sulfide) obtained in Example 28. The arrow (position of 3552 cm$^{-1}$) indicates the absorption peak derived from the free O—H stretching vibration of a hydroxy group.

Figure 35:
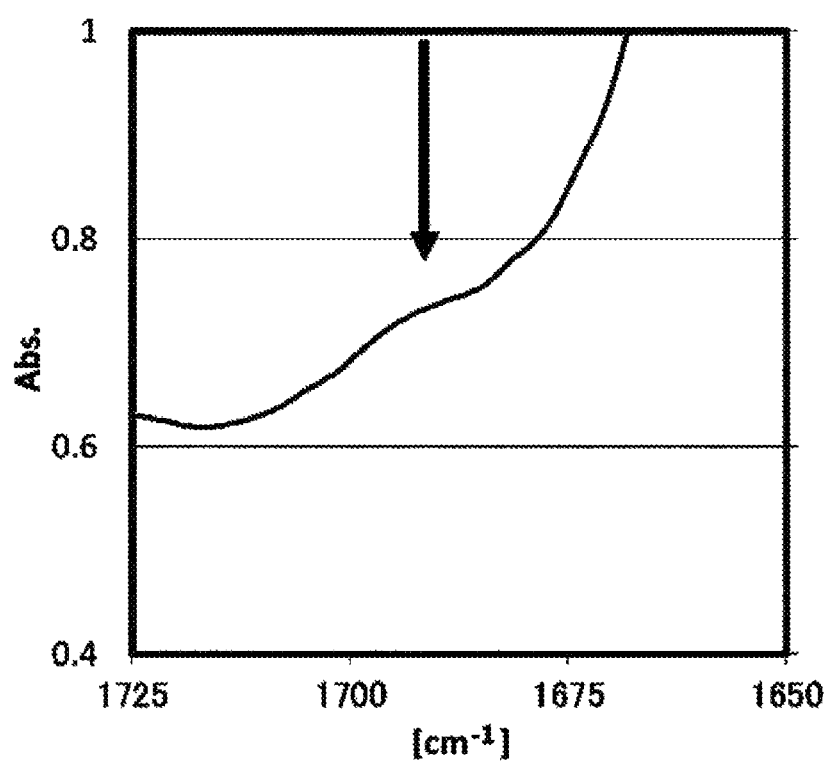

FIG. 35 shows a chart acquired from measurement of the infrared absorption spectrum of poly(p-phenylene sulfide) obtained in Example 28. The arrow (position of 1692 cm$^{-1}$) indicates the absorption peak derived from the C=O stretching vibration of a carboxy group.

Figure 36:
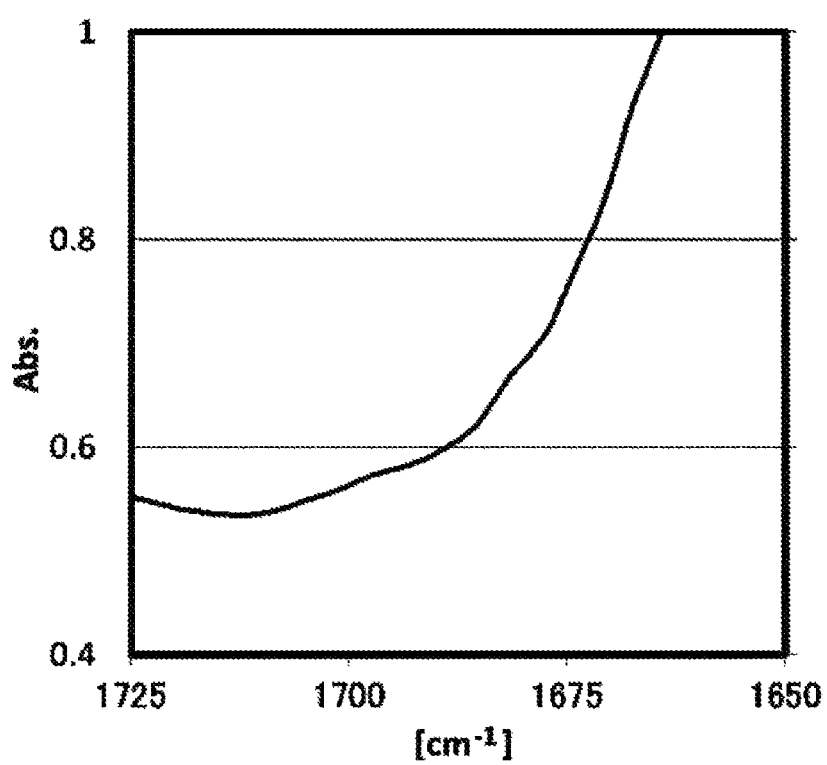

FIG. 36 shows a chart acquired from measurement of the infrared absorption spectrum of poly(p-phenylene sulfide) obtained in Example 29. The absorption peak derived from the C=O stretching vibration of a carboxy group is not found at the arrow (position of 1687 cm$^{-1}$).

Figure 37:
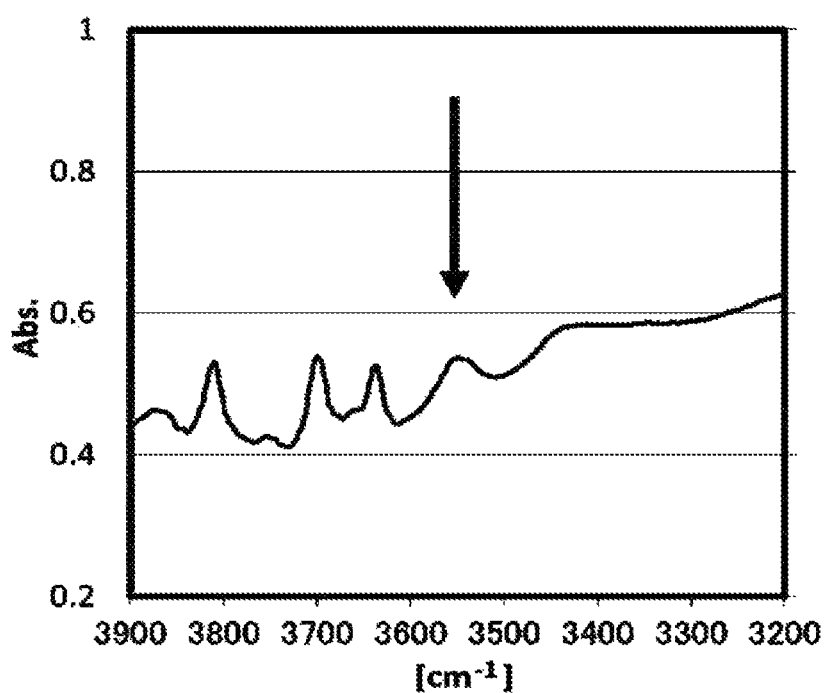

FIG. 37 shows a chart acquired from measurement of the infrared absorption spectrum of poly(p-phenylene sulfide) obtained in Example 32. The arrow (position of 3552 cm$^{-1}$) indicates the absorption peak derived from the free O—H stretching vibration of a hydroxy group.

Figure 38:
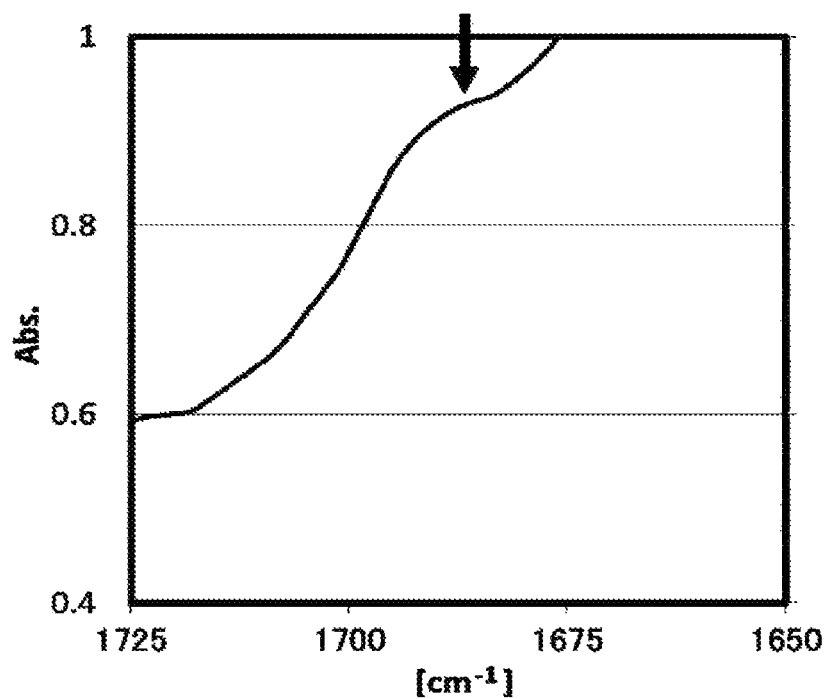

FIG. 38 shows a chart acquired from measurement of the infrared absorption spectrum of poly(p-phenylene sulfide) obtained in Example 32. The arrow (position of 1686 cm$^{-1}$) indicates the absorption peak derived from the C=O stretching vibration of a carboxy group.

Figure 39:
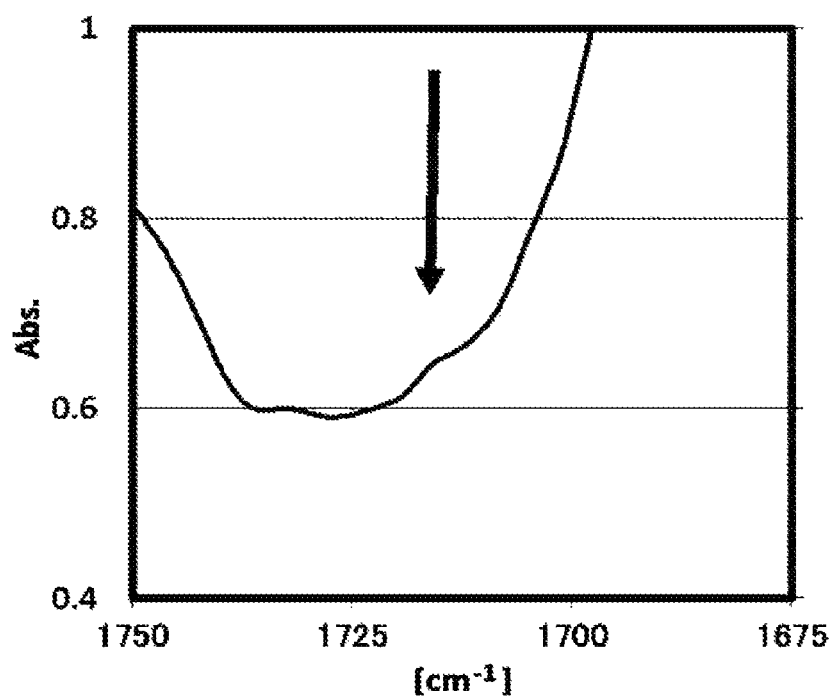

FIG. 39 shows a chart acquired from measurement of the infrared absorption spectrum of poly(p-phenylenethio-p,p'-biphenylylene sulfide) obtained in Example 34. The arrow (position of 1708 cm$^{-1}$) indicates the absorption peak derived from the C=O stretching vibration of a carboxy group.

Figure 40:
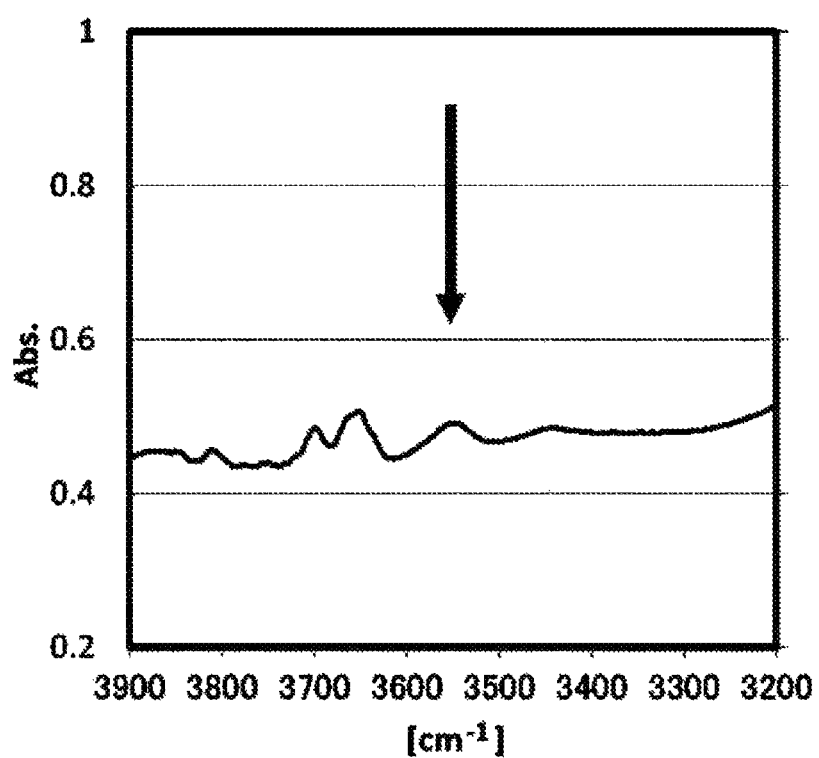

FIG. 40 shows a chart acquired from measurement of the infrared absorption spectrum of poly(p-phenylenethio-p,p'-biphenylylene sulfide) obtained in Example 35. The arrow (position of 3567 cm$^{-1}$) indicates the absorption peak derived from the free O—H stretching vibration of a hydroxy group.

Figure 41:
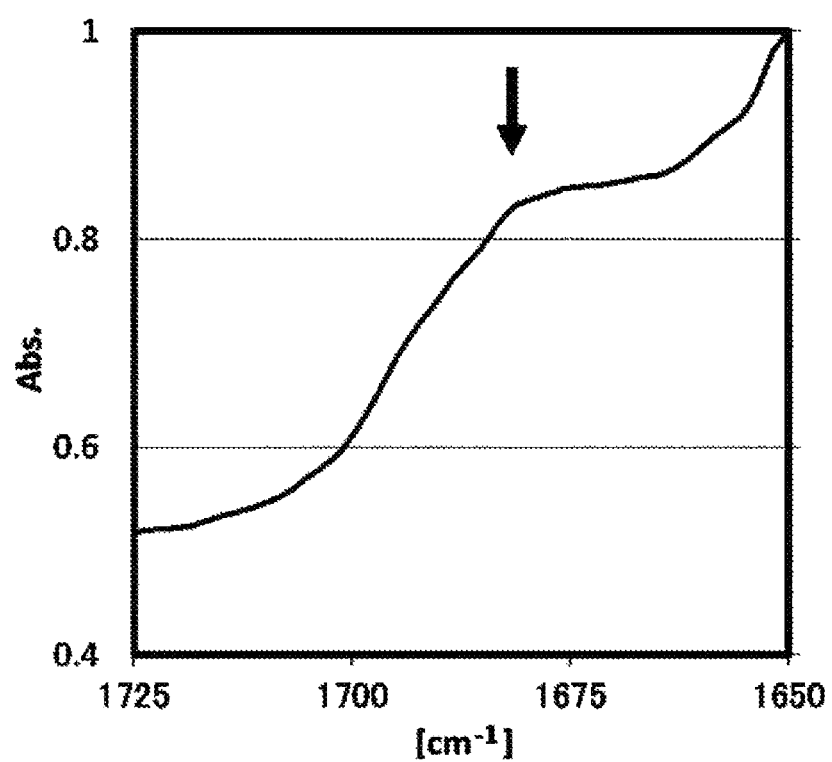

FIG. 41 shows a chart acquired from measurement of the infrared absorption spectrum of poly(p-phenylenethio-p,p'-biphenylylene sulfide) obtained in Example 35. The arrow (position of 1681 cm$^{-1}$) indicates the absorption peak derived from the C=O stretching vibration of a carboxy group.

Figure 42:
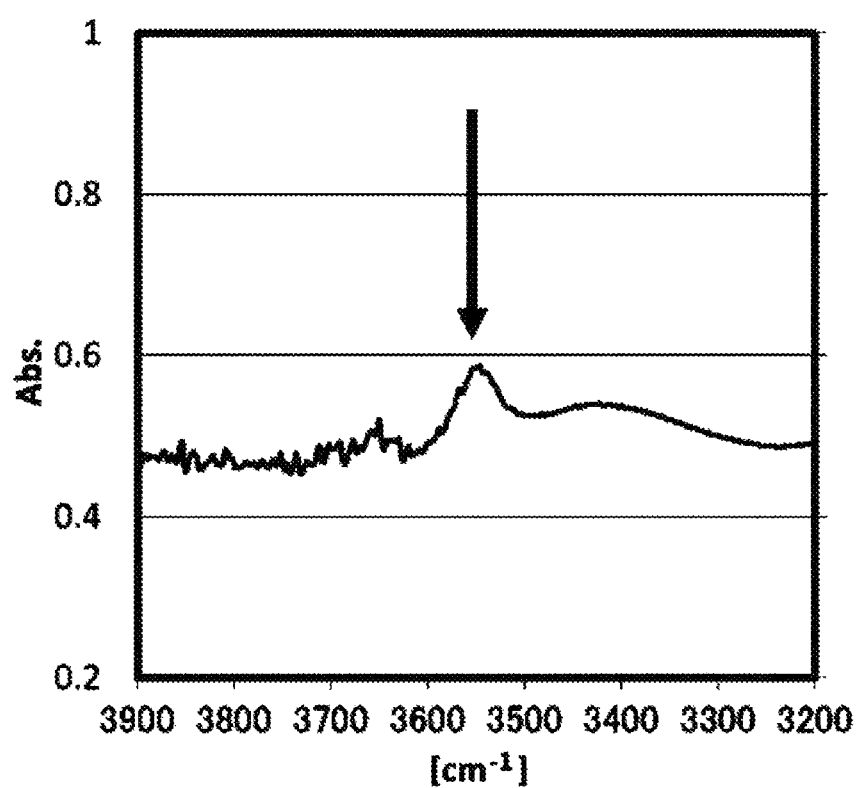

FIG. 42 shows a chart acquired from measurement of the infrared absorption spectrum of poly(p-phenylenethio-p,p'-biphenylylene sulfide) obtained in Example 36. The arrow (position of 3567 cm$^{-1}$) indicates the absorption peak derived from the free O—H stretching vibration of a hydroxy group.

Figure 43:
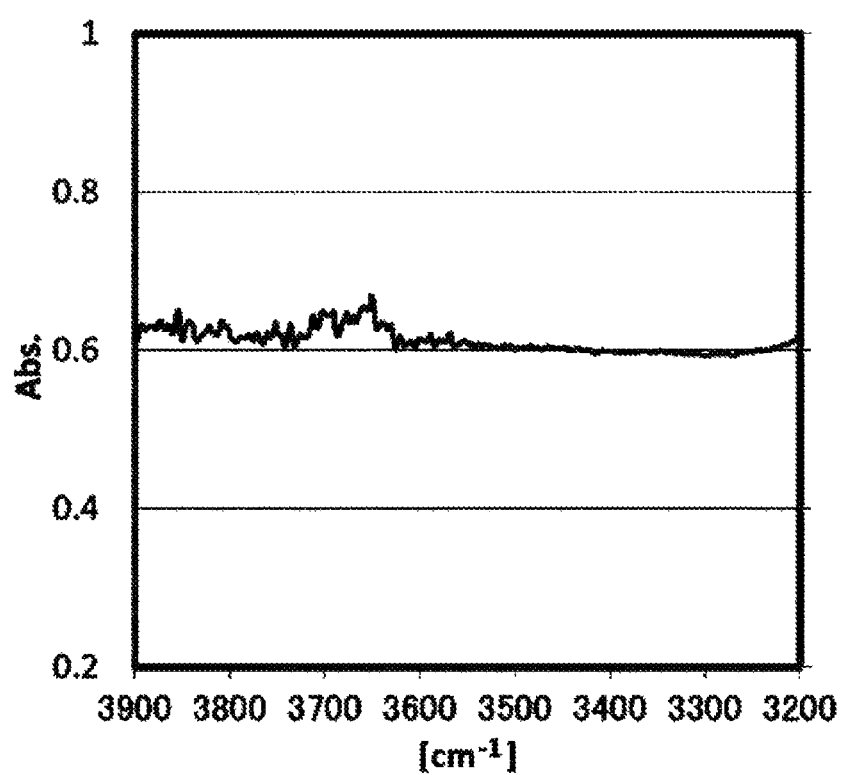

FIG. 43 shows a chart acquired from measurement of the infrared absorption spectrum (range of 3250 to 3650 cm$^{-1}$) of poly(p-phenylenethio-p,p'-biphenylylene sulfide) obtained in Reference Example 2.

Figure 44:
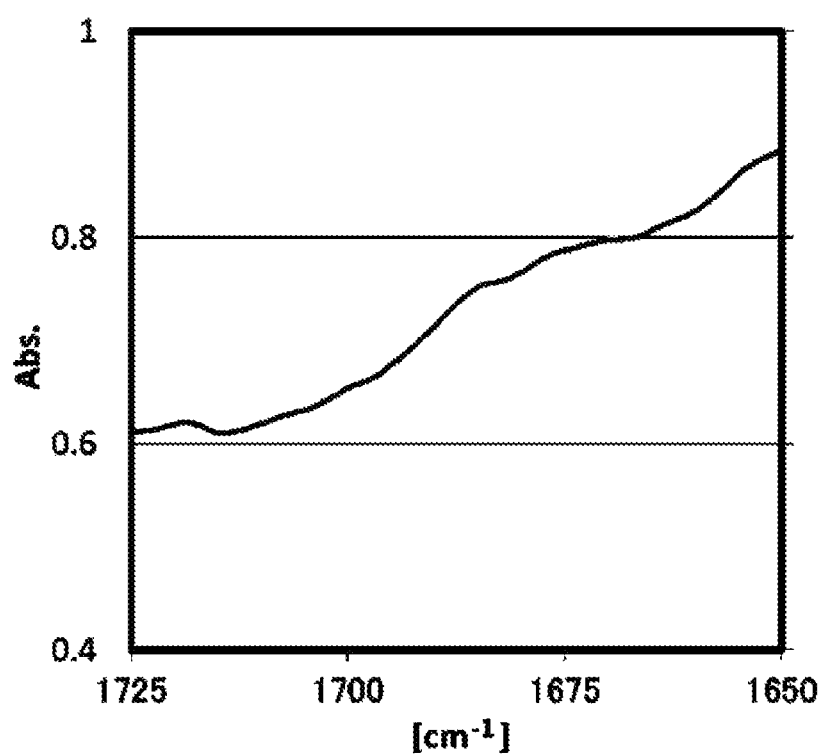

FIG. 44 shows a chart acquired from measurement of the infrared absorption spectrum (range of 1670 to 1720 cm$^{-1}$) of poly(p-phenylenethio-p,p'-biphenylylene sulfide) obtained in Reference Example 2.

Figure 45:
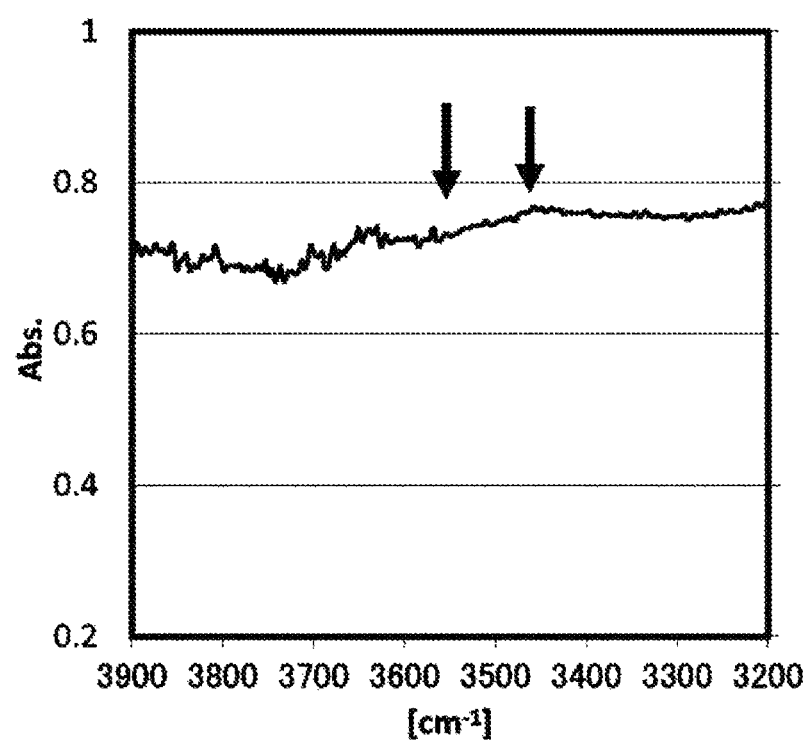

FIG. 45 shows a chart acquired from measurement of the infrared absorption spectrum of poly(p-phenylenethio-p-phenylenethio-p,p'-biphenylylene sulfide) obtained in Example 37. The arrow (position of 3454 cm$^{-1}$) indicates the absorption peak derived from the O—H stretching vibration of a hydroxy group.

Figure 46:
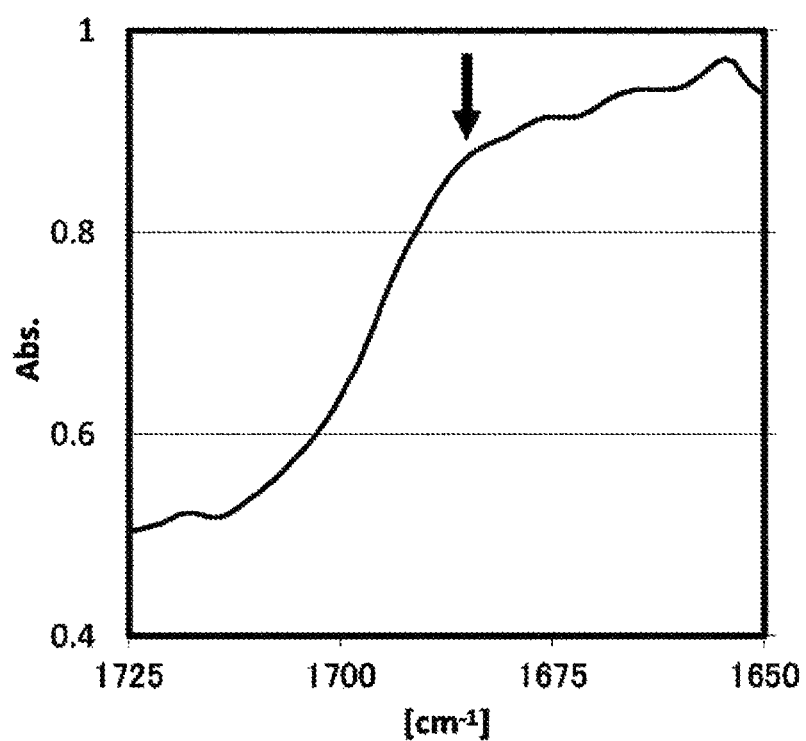

FIG. 46 shows a chart acquired from measurement of the infrared absorption spectrum of poly(p-phenylenethio-p,p'-biphenylylene sulfide) obtained in Example 37. The arrow (position of 1684 cm$^{-1}$) indicates the absorption peak derived from the C=O stretching vibration of a carboxyl group.

DESCRIPTION OF EMBODIMENTS

Hereinafter, embodiments of the present invention will be described in detail. However, the present invention is never limited to the following embodiments.

The polyarylene sulfide resin according to one embodiment is obtained by a production method comprising a step of obtaining a poly(arylene sulfonium salt) comprising a terminal group including at least one functional group selected from the group consisting of a carboxy group, a hydroxy group and an amino group (hereinafter, sometimes referred to as "particular functional group"), and a step of dealkylating or dearylating the poly(arylene sulfonium salt) to obtain a polyarylene sulfide resin.

In the present specification, the term "hydroxy group" or "carboxy group" encompasses not only a hydroxy group or carboxy group but also an anion derived by deprotonation of a hydroxy group or carboxy group and a product derived by ion exchange of the proton of a hydroxy group or carboxy group. The reason is that the hydroxy group or carboxy group is not only easily deprotonated to form an anion in a polar solvent such as an aqueous solution, but also easily forms a product with the proton ion-exchanged with a strong base including an alkali metal such as lithium, sodium, and potassium, or an alkali earth metal such as calcium and magnesium.

Poly(Arylene Sulfonium Salt) and Production Method

The poly(arylene sulfonium salt) according to one embodiment comprises a main chain including a constitutional unit represented by the following formula (1-2) or a main chain including a constitutional unit represented by formula (2-2), and a terminal group including a particular functional group bonding to a terminal of the main chain. The main chain of the poly(arylene sulfonium salt) may be substantially composed only of a constitutional unit represented by the following formula (1-2) or a constitutional unit represented by formula (2-2). The terminal group including the particular functional group typically directly bond to a constitutional unit represented by formula (1-2) or (2-2).

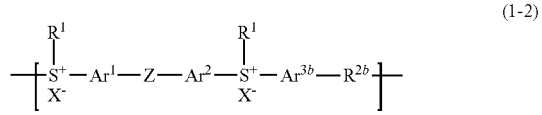

(1-2)

(2-2)

In formulas (1-2) and (2-2), $R^1$ represents an alkyl group having 1 to 10 carbon atoms or an aryl group optionally having an alkyl group having 1 to 10 carbon atoms; $R^{2b}$ represents a direct bond, —Ar$^{4b}$—, —S—Ar$^{4b}$—, —O—Ar$^{4b}$—, —CO—Ar$^{4b}$—, —SO$_2$—Ar$^{4b}$— or —C(CF$_3$)$_2$—Ar$^{4b}$—; Ar$^1$, Ar$^2$, Ar$^{3b}$ and Ar$^{4b}$ each independently represent an arylene group optionally having a substituent; Z represents a direct bond, —S—, —O—, —CO—, —SO$_2$— or —C(CF$_3$)$_2$—; and X$^-$ represents an anion.

The constitutional unit represented by formula (2-2) may be a constitutional unit represented by the following formula (5-2).

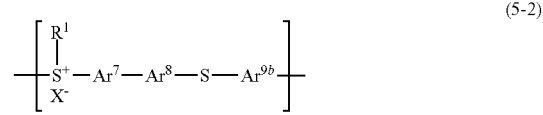

(5-2)

In the formula, $R^1$ and $X^-$ have the same definitions as those in formula (1-2), and Ar$^7$, Ar$^8$ and Ar$^{9b}$ each independently represent a phenylene group optionally having a substituent. In other words, the case that Ar$^7$, Ar$^8$ and Ar$^{9b}$ are each a 1,4-phenylene group in formula (5-2) corresponds to the case that Ar$^1$ is a 4,4'-biphenylene group, $R^{2b}$ is —S—Ar$^{4b}$—, and Ar$^{4b}$ is a 1,4-phenylene group in formula (2-2).

The poly(arylene sulfonium salt) according to one embodiment can be obtained, for example, by a production method comprising:

(a) reacting a sulfoxide represented by the following formula (1-3) with an aromatic compound represented by the following formula (1-4) in the presence of an aromatic compound having a particular functional group (hereinafter, referred to as the step (a)), or (b) polymerizing (homopolymerizing) an aromatic sulfoxide represented by the following formula (2-3) in the presence of an aromatic compound having a particular functional group (hereinafter, referred to as the step (b)).

The sulfoxide to be used in the step (a) is a compound represented by the following formula (1-3) and has two sulfinyl groups.

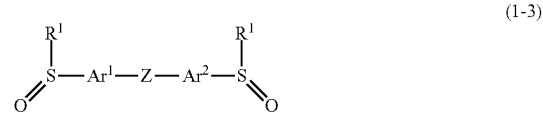

(1-3)

In formula (1-3), $R^1$, Ar$^1$, Ar$^2$ and Z have the same definitions as $R^1$, Ar$^1$, Ar$^2$ and Z in the above formulas (1-2) and (2-2), respectively.

The sulfoxide represented by formula (1-3) can be obtained, for example, by reacting a compound represented by the following formula (1-5) with an oxidant or the like to oxidize.

(1-5)

In formula (1-5), $R^1$, Ar$^1$, Ar$^2$ and Z have the same definitions as $R^1$, Ar$^1$, Ar$^2$ and Z in the above formulas (1-2) and (2-2).

The oxidant is not particularly limited, and various oxidants can be used. Examples of the oxidant which can be used include potassium permanganate, oxygen, ozone, organic peroxides, hydrogen peroxide, nitric acid, m-chloroperoxybenzoic acid, oxone (registered trademark) and osmium tetroxide.

As necessary, the compound represented by formula (1-5) (sulfide compound) can be synthesized through substitution reaction of halogen atoms represented by Y with methylthio groups or the like by using a compound represented by the following formula (1-6) and dimethyl disulfide or the like.

(1-6)

In formula (1-6), Y represents a halogen atom; and $Ar^1$, $Ar^2$ and Z have the same definitions as those in formulas (1-2) and (2-2). Y is, for example, a chlorine atom, a bromine atom, or an iodine atom, and it is preferable that Y be a chlorine atom.

In the compounds represented by formulas (1-3), (1-5) or (1-6), $Ar^1$ and $Ar^2$ may be each an arylene group such as phenylene, naphthylene, and biphenylene. Although $Ar^1$ and $Ar^2$ may be the same or different, they are preferably the same.

The mode of bonding in $Ar^1$ and $Ar^2$ is not particularly limited, but it is preferably a situation in which they are bonding to Y and Z at positions distant from each other in the arylene group. For example, in the case that $Ar^1$ and $Ar^2$ are each a phenylene group, a unit bonding at the p-position (1,4-phenylene group) and a unit bonding at the m-position (1,3-phenylene group) are preferable, and a unit bonding at the p-position is more preferable. It is preferable that $Ar^1$ and $Ar^2$ be each composed of a unit bonding at the p-position in the aspect of the heat resistance and crystalline character of a resin to be obtained.

When the arylene group represented by $Ar^1$ or $Ar^2$ has a substituent, the substituent is preferably an alkyl group having 1 to 10 carbon atoms such as a methyl group, an ethyl group, a propyl group, a butyl group, a pentyl group, a hexyl group, a heptyl group, an octyl group, a nonyl group and a decyl group, a hydroxy group, an amino group, a mercapto group, a carboxy group or a sulfo group.

Examples of the compound represented by formula (1-3) include 4,4'-bis(methylsulfinyl)biphenyl, bis[4-(methylsulfinyl)phenyl] ether, bis[4-(methylsulfinyl)phenyl] sulfide, bis[4-(methylsulfinyl)phenyl]sulfone, bis[4-(methylsulfinyl)phenyl] ketone, and 2,2-bis[4-(methylsulfinyl)phenyl]-1,1,1,3,3,3-hexafluoropropane. These compounds can be used singly or in combination.

Examples of $R^1$ include alkyl groups having 1 to 10 carbon atoms such as a methyl group, an ethyl group, a propyl group, a butyl group, a pentyl group, a hexyl group, a heptyl group, an octyl group, a nonyl group and a decyl group, and aryl groups having a structure of phenyl, naphthyl, biphenyl or the like. Further, the aryl group may have 1 to 4 alkyl groups having 1 to 10 carbon atoms such as a methyl group, an ethyl group, a propyl group, a butyl group, a pentyl group, a hexyl group, a heptyl group, an octyl group, a nonyl group and a decyl group, as substituents bonding to the aromatic ring.

The aromatic compound to be used in the step (a) is, for example, represented by the following formula (1-4).

$$Ar^{3a}-R^{2a} \quad (1\text{-}4)$$

In formula (1-4), $R^{2a}$ represents a hydrogen atom, an alkyl group having 1 to 10 carbon atoms, $-Ar^{4a}$, $-S-Ar^{4a}$, $-O-Ar^{4a}$, $-CO-Ar^{4a}$, $-SO_2-Ar^{4a}$ or $-C(CF_3)_2-Ar^{4a}$; $Ar^{3a}$ and $Ar^{4a}$ each independently represent an aryl group optionally having a substituent. In the case that $R^{2a}$ is an alkyl group having 1 to 10 carbon atoms, examples of $R^{2a}$ include a methyl group, an ethyl group, a propyl group, a butyl group, a pentyl group, a hexyl group, a heptyl group, an octyl group, a nonyl group and a decyl group. In the case that the aryl group represented by $Ar^{3a}$ or $Ar^{4a}$ has a substituent, the substituent is preferably a alkyl group (e.g., a methyl group), a hydroxy group, an amino group, a mercapto group, a carboxy group or a sulfo group. Examples of $Ar^{3a}$ and $Ar^{4a}$ include aryl groups having a structure of phenyl, naphthyl, biphenyl or the like. The aryl group may have at least one substituent selected from an alkyl group having 1 to 10 carbon atoms such as a methyl group, an ethyl group, a propyl group, a butyl group, a pentyl group, a hexyl group, a heptyl group, an octyl group, a nonyl group and a decyl group, a hydroxy group, an amino group, a mercapto group, a carboxy group and a sulfo group. Although $Ar^{3a}$ and $Ar^{4a}$ may be the same or different, they are preferably the same.

Examples of the compound represented by formula (1-4) include benzene, toluene, biphenyl, diphenyl sulfide, diphenyl ether, benzophenone, diphenyl sulfone and hexafluoro-2,2-diphenylpropane. Among these compounds, biphenyl, diphenyl sulfide and diphenyl ether are preferable from the viewpoint of the crystalline character. From the viewpoint of obtaining a polyarylene sulfide resin having a higher molecular weight, diphenyl sulfide is preferable. Diphenyl sulfide has low melting point, and can function in itself as a solvent, and is preferable also from the viewpoint of control of the reaction temperature, for example. From the viewpoint of lowering of the melting point of the polyarylene sulfide resin, diphenyl ether is preferable. From the viewpoint of enhancement of the heat resistance of the polyarylene sulfide resin, benzophenone is preferable. From the viewpoint of obtaining an amorphous polyarylene sulfide resin, diphenyl sulfone and hexafluoro-2,2-diphenylpropane are preferable. The moldability and transparency of the polyarylene sulfide resin can be improved through providing the polyarylene sulfide resin with amorphous character.

The aromatic sulfoxide to be used in the step (b) is a compound represented by the following formula (2-3), and has a sulfinyl group and an aromatic ring.

(2-3)

In formula (2-3), $R^1$ and $Ar^1$ have the same definitions as $R^1$ and $Ar^1$ in the above formulas (1-2) and (2-2), and $R^{2a}$ has the same definition as $R^{2a}$ in the above formula (1-4).

By using an aromatic sulfoxide represented by the following formula (5-3) as the aromatic sulfoxide represented by formula (2-3) in the step (b), a poly(arylene sulfonium salt) including a constitutional unit represented by formula (5-2) can be obtained.

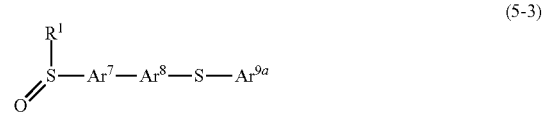

(5-3)

In formula (5-3), $R^1$ has the same definition as that in formula (2-3). $Ar^7$ and $Ar^8$ have the same definitions as those in formula (5-2). $Ar^{9a}$ represents a phenyl group optionally having a substituent.

The aromatic sulfoxide represented by formula (2-3) can be obtained, for example, by reacting a compound represented by the following formula (2-4) with an oxidant or the like to oxidize.

$$R^1-S-Ar^1-R^{2a} \quad (2\text{-}4)$$

In formula (2-4), $R^1$ and $Ar^1$ have the same definitions as $R^1$ and $Ar^1$ in the above formulas (1-2) and (2-2), and $R^2$ has the same definition as $R^{2a}$ in the above formula (1-4).

The oxidant is not particularly limited, and various oxidants can be used. Examples of the oxidant which can be used include potassium permanganate, oxygen, ozone, organic peroxides, hydrogen peroxide, nitric acid, meta-chloroperoxybenzoic acid, oxone (registered trademark) and osmium tetroxide.

As necessary, the compound represented by formula (2-4) (sulfide compound) can be synthesized through substitution reaction of a halogen atom represented by Y with a methylthio group or the like by using a compound represented by the following formula (2-5) and dimethyl disulfide or the like.

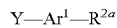
$$Y\text{—}Ar^1\text{—}R^{2a} \quad (2\text{-}5)$$

In formula (2-5), Y has the same definition as Y in the above formula (1-6), $Ar^1$ has the same definition as $Ar^1$ in formulas (1-2) and (2-2), and $R^{2a}$ has the same definition as $R^{2a}$ in the above formula (1-4).

As the aromatic sulfoxide represented by formula (2-3), for example, methyl phenyl sulfoxide or methyl-4-(phenylthio)phenyl sulfoxide can be used. Among these compounds, methyl-4-(phenylthio)phenyl sulfoxide is preferable. One of the aromatic sulfoxides may be used singly, or two or more thereof may be used in combination.

The poly(arylene sulfonium salt) according to one embodiment is obtained by reacting a sulfoxide in the presence of an aromatic compound having a particular functional group (hereinafter, sometimes referred to as "terminal modifier").

The aromatic compound having a particular functional group is not particularly limited as long as it does not depart from the spirit of the present invention, and may have a particular functional group directly bonding to the aromatic ring, or may have a particular functional group bonding to a divalent organic group as a substituent of the aromatic ring.

More specifically, preferable examples of aromatic compounds having a particular functional group include aromatic compounds represented by the following formulas (3-1a), (3-2a), (3-3a), (3-4a), (3-5a) or (3-6a).

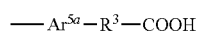
(3-1a)

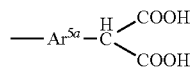
(3-2a)

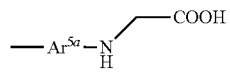
(3-3a)

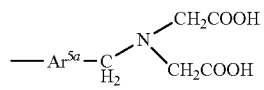
(3-4a)

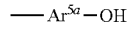
(3-5a)

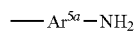
(3-6a)

In the formulas, $R^3$ represents a direct bond or an alkylene group having 1 to 10 carbon atoms; and $Ar^{5a}$ represents an aryl group.

The alkylene group having 1 to 10 carbon atoms as $R^3$ may be linear or branched. Examples of the alkylene group include methylene, 1,2-ethylene, 1,3-propylene, 1,4-butylene, 1,6-hexylene, 2-methyl-1,3-propylene, 2-ethyl-1,3-propylene, 2,2-dimethyl-1,3-propylene, 2,2-dimethyl-1,4-butylene and 1,10-decylene. Examples of $Ar^{5a}$ include aryl groups having a structure of phenyl, naphthyl, biphenyl or the like.

Specific examples of the aromatic compound represented by formula (3-1a), (3-2a), (3-3a), (3-4a), (3-5a) or (3-6a) include benzoic acid, phenylpropionic acid, phenylhexanoic acid, phenylisobutyric acid, phenylmalonic acid, phenol, N-phenylglycine, N-benzyliminodiacetic acid and aniline.

Preferable examples of aromatic compounds having a particular functional group also include aromatic compounds represented by the following formula (4-1a), (4-2a), (4-3a) or (4-4a).

(4-1a)

(4-2a)

(4-3a)

(4-4a)

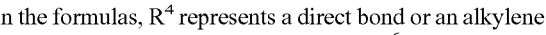

In the formulas, $R^4$ represents a direct bond or an alkylene group having 1 to 10 carbon atoms; and $Ar^{6a}$ represents an aryl group.

The alkylene group having 1 to 10 carbon atoms as $R^4$ may be linear or branched. Examples of the alkylene group include methylene, 1,2-ethylene, 1,3-propylene, 1,4-butylene, 1,6-hexylene, 2-methyl-1,3-propylene, 2-ethyl-1,3-propylene, 2,2-dimethyl-1,3-propylene, 2,2-dimethyl-1,4-butylene and 1,10-decylene. Examples of $Ar^{6a}$ include aryl groups having a structure of phenyl, naphthyl, biphenyl or the like.

The aromatic compound represented by formula (4-1a), (4-2a), (4-3a) or (4-4a) may be, for example, any of compounds represented by the following chemical formulas. In the formulas, $R^4$ has the same definition as that in formulas (4-1a) and so on.

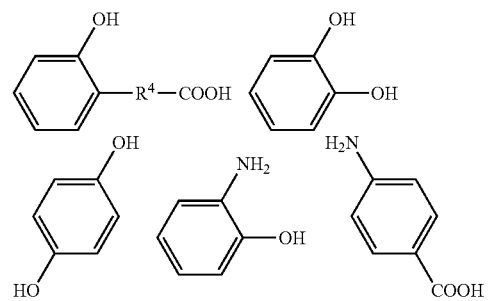

In the reaction in the step (a), an aromatic compound having a particular functional group can also be added to the reaction system for reaction after obtaining a poly(arylene sulfonium salt) by reacting the sulfoxide represented by formula (1-3) with the aromatic compound represented by formula (1-4). It is preferable that the sulfoxide represented by formula (1-3) is reacted with the aromatic compound represented by formula (1-4) in the presence of an aromatic compound having a particular functional group, from the viewpoint of excellence in further simplification of the step.

Similarly, in the reaction in the step (b), an aromatic compound having a particular functional group can also be added to the reaction system for reaction after obtaining a poly(arylene sulfonium salt) by reacting the aromatic sulfoxide represented by formula (2-3). It is preferable to react the aromatic sulfoxide represented by formula (2-3) in the presence of an aromatic compound having a particular functional group, from the viewpoint of excellence in further simplification of the step.

The reaction in the step (a) or the step (b) is preferably performed in the presence of an acid. The acid may be either an organic acid or an inorganic acid. Examples of the acid include non-oxoacids such as hydrochloric acid, hydrobromic acid, hydrocyanic acid and tetrafluoroboric acid; inorganic oxoacids such as sulfuric acid, phosphoric acid, perchloric acid, bromic acid, nitric acid, carbonic acid, boric acid, molybdic acid, isopoly acid and heteropoly acid; partial salts or partial esters of sulfuric acid such as sodium hydrogen sulfate, sodium dihydrogen phosphate, proton-remaining heteropoly acid salts, monomethyl sulfate and trifluoromethane sulfate; mono- or polycarboxylic acids such as formic acid, acetic acid, propionic acid, butanoic acid, succinic acid, benzoic acid and phthalic acid; halogen-substituted carboxylic acids such as monochloroacetic acid, dichloroacetic acid, trichloroacetic acid, monofluoroacetic acid, difluoroacetic acid and trifluoroacetic acid; mono- or polysulfonic acids such as methanesulfonic acid, ethanesulfonic acid, propanesulfonic acid, benzenesulfonic acid, toluenesulfonic acid, trifluoromethanesulfonic acid and benzenedisulfonic acid; partial metal salts of a polysulfonic acid such as sodium benzenedisulfonate; and Lewis acids such as antimony pentachloride, aluminum chloride, aluminum bromide, titanium tetrachloride, tin tetrachloride, zinc chloride, copper chloride and iron chloride. Among these acids, it is preferable to use trifluoromethanesulfonic acid or methanesulfonic acid from the viewpoint of reactivity. These acids may be used singly or in combinations of two or more thereof.

A dehydrating agent may be used in combination because the reaction in the step (a) or the step (b) is a dehydration reaction. Examples of the dehydrating agent include phosphoanhydrides such as phosphorous oxide and phosphorous pentoxide; sulfonic anhydrides such as benzenesulfonic anhydride, methanesulfonic anhydride, trifluoromethanesulfonic anhydride and p-toluenesulfonic anhydride; carboxylic anhydrides such as acetic anhydride, fluoroacetic anhydride and trifluoroacetic anhydride; anhydrous magnesium sulfate, zeolite, silica gel and calcium chloride. These dehydrating agents may be used singly or in combinations of two or more thereof.

A solvent can be appropriately used for the reaction in the step (a) or the step (b). Examples of the solvent include alcohol solvents such as methanol, ethanol, propanol and isopropyl alcohol; ketone solvents such as acetone, methyl ethyl ketone and methyl isobutyl ketone; nitrile solvents such as acetonitrile; halogen-containing solvents such as methylene chloride and chloroform; saturated hydrocarbon solvents such as n-hexane, cyclohexane, n-heptane and cycloheptane; amide solvents such as dimethylacetamide and N-methyl-2-pyrrolidone; sulfur-containing solvents such as sulfolane and DMSO; and ether solvents such as tetrahydrofuran and dioxane. These solvents may be used singly or in combinations of two or more thereof.

The conditions for reaction in the step (a) or the step (b) can be appropriately adjusted so as to allow the reaction to proceed suitably. The reaction temperature is preferably in a range of −30 to 150° C., and more preferably in a range of 0 to 100° C.

The poly(arylene sulfonium salt) obtained in the step (a) comprises a main chain including a constitutional unit represented by the following formula (1-2) and a terminal group bonding to a terminal of the main chain and including a particular functional group.

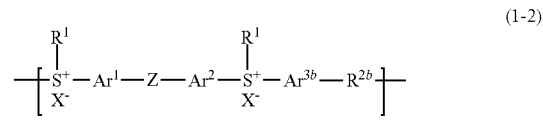

(1-2)

In formula (1-2), $R^1$ represents an alkyl group having 1 to 10 carbon atoms or an aryl group optionally having an alkyl group having 1 to 10 carbon atoms; $R^{2b}$ represents a direct bond, —$Ar^{4b}$—, —S—$Ar^{4b}$—, —O—$Ar^{4b}$—, —CO—$Ar^{4b}$—, —$SO_2$—$Ar^{4b}$— or —$C(CF_3)_2$—$Ar^{4b}$—; $Ar^1$, $Ar^2$, $Ar^{3b}$ and $Ar^{4b}$ each independently represent an arylene group optionally having a substituent; Z represents a direct bond, —S—, —O—, —CO—, —$SO_2$— or —$C(CF_3)_2$—; and $X^-$ represents an anion.

For example, $Ar^{3b}$ and $Ar^{4b}$ may be each an arylene group such as phenylene, naphthylene and biphenylene. Although $Ar^{3b}$ and $Ar^{4b}$ may be the same or different, they are preferably the same. Examples of $X^-$ representing an anion include anions such as sulfonate, carboxylate and halogen ions. In the case that $Ar^1$, $Ar^2$ and $Ar^{3b}$ are each a 1,4-phenylene group and $R^{2b}$ is a direct bond in formula (1-2), it is preferable that Z be a direct bond, —CO—, —$SO_2$— or —$C(CF_3)_2$—. In the case that $Ar^1$, $Ar^2$ and $Ar^{3b}$ are each a 1,4-phenylene group, $R^{2b}$ is —$Ar^{4b}$—, and $Ar^{4b}$ is a 1,4-phenylene group, it is preferable that Z be —S—, —O—, —CO—, —$SO_2$— or —$C(CF_3)_2$—.

In the constitutional unit represented by formula (1-2), the mode of bonding in $Ar^{3b}$ and $Ar^{4b}$ is not particularly limited, and the same concept as for the mode of bonding in $Ar^1$ and $Ar^2$ in formula (1-3) can be applied.

In the case that the arylene group represented by $Ar^{3b}$ or $Ar^{4b}$ has a substituent, the substituent is preferably an alkyl group having 1 to 10 carbon atoms such as a methyl group, an ethyl group, a propyl group, a butyl group, a pentyl group, a hexyl group, a heptyl group, an octyl group, a nonyl group and a decyl group, a hydroxy group, an amino group, a mercapto group, a carboxy group or a sulfo group. However, the ratio of the constitutional unit represented by formula (1-2) in which $Ar^1$, $Ar^2$, $Ar^{3b}$ and $Ar^{4b}$ are each an arylene group having a substituent is preferably in the range of 10% by mass or less, and more preferably 5% by mass or less based on the whole poly(arylene sulfonium salt) from the viewpoint of further suppressing reduction in the crystallinity and heat resistance of the polyarylene sulfide resin.

The constitutional unit included in the poly(arylene sulfonium salt) can be appropriately selected, for example, through changing the combination of the sulfoxide represented by formula (1-3) and the aromatic compound represented by formula (1-4), in accordance with the purpose of use of the polyarylene sulfide resin.

On the other hand, the poly(arylene sulfonium salt) obtained in the step (b) comprises a main chain including a constitutional unit represented by the following formula (2-2) and a terminal group bonding to a terminal of the main chain and including a particular functional group.

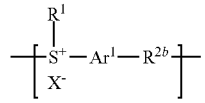
(2-2)

In formula (2-2), $R^1$ represents an alkyl group having 1 to 10 carbon atoms or an aryl group optionally having an alkyl group having 1 to 10 carbon atoms; $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1$ and $Ar^{4b}$ each independently represent an arylene group optionally having a substituent; and $X^-$ represents an anion.

In formula (2-2), $R^1$, $R^{2b}$, $Ar^1$ and $X^-$ have the same definitions as $R^1$, $R^{2b}$, $Ar^1$ and $X^-$ in formula (1-2).

Further, a poly(arylene sulfonium salt) produced by using the aromatic compound represented by formula (3-1a), (3-2a), (3-3a), (3-4a), (3-5a) or (3-6a) as a raw material can have a terminal group represented by the following formula (3-1b), (3-2b), (3-3b), (3-4b), (3-5b) or (3-6b).

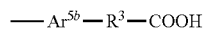
(3-1b)

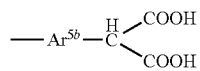
(3-2b)

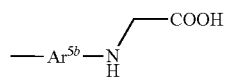
(3-3b)

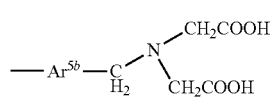
(3-4b)

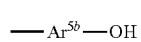
(3-5b)

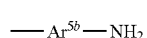
(3-6b)

In the formulas, $R^3$ represents a direct bond or an alkylene group having 1 to 10 carbon atoms; and $Ar^{5b}$ represents an aryl group.

A poly(arylene sulfonium salt) produced by using the aromatic compound represented by formula (4-1a), (4-2a), (4-3a) or (4-4a) as a raw material can have a terminal group represented by the following formula (4-1b), (4-2b), (4-3b) or (4-4b).

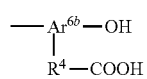
(4-1b)

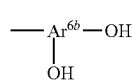
(4-2b)

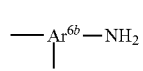
(4-3b)

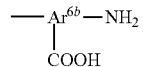
(4-4b)

In the formulas, $R^4$ represents a direct bond or an alkylene group having 1 to 10 carbon atoms; and $Ar^{6b}$ represents an aryl group.

The aryl group of each of $Ar^{5b}$ and $Ar^{6b}$ can include an arylene group in which a substituent bonds to an aryl group.

Examples of the terminal group represented by formula (4-1b), (4-2b), (4-3b) or (4-4b) include groups represented by the following chemical formulas. In the formulas, $R^4$ has the same definition as that in formulas (4-1a) and so on.

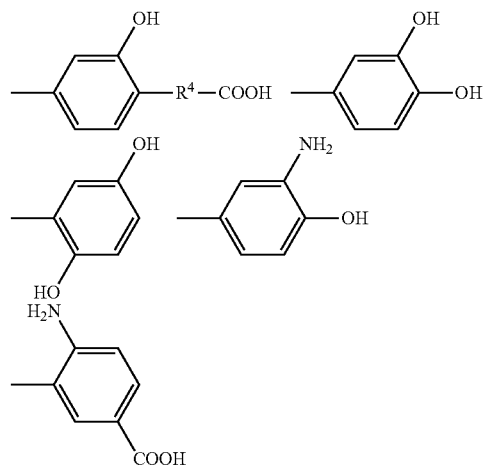

Polyarylene Sulfide Resin and Production Method

The polyarylene sulfide resin according to one embodiment comprises a main chain including a constitutional unit represented by formula (1-1) or a constitutional unit represented by formula (2-1), and a terminal group bonding to a terminal of the main chain and including at least one functional group selected from the group consisting of a carboxy group, a hydroxy group and an amino group (particular functional group).

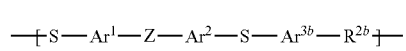
(1-1)

(2-1)

In formulas (1-1) and (2-1), $R^{2b}$ represents a direct bond, $-Ar^{4b}-$, $-S-Ar^{4b}-$, $-O-Ar^{4b}-$, $-CO-Ar^{4b}-$, $-SO_2-Ar^{4b}-$ or $-C(CF_3)_2-Ar^{4b}-$; $Ar^1$, $Ar^2$, $Ar^{3b}$ and $Ar^{4b}$ each independently represent an arylene group optionally having a substituent; and Z represents a direct bond, $-S-$, $-O-$, $-CO-$, $-SO_2-$ or $-C(CF_3)_2-$.

The constitutional unit represented by formula (2-1) may be a constitutional unit represented by the following formula (5-1).

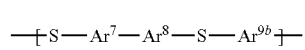
(5-1)

In the formula, $Ar^7$, $Ar^8$ and $Ar^{9b}$ each independently represent a phenylene group optionally having a substituent. In other words, the case that $Ar^7$, $Ar^8$ and $Ar^{9b}$ are each a 1,4-phenylene group in formula (5-1) corresponds to the case that $Ar^1$ is a 4,4'-biphenylene group, $R^{2b}$ is —S—$Ar^{4b}$—, and $Ar^{4b}$ is a 1,4-phenylene group in formula (2-1).

The polyarylene sulfide resin according to one embodiment can be obtained by a production method comprising a step of dealkylating or dearylating a poly(arylene sulfonium salt) comprising a main chain including a constitutional unit represented by the following formula (1-2) or a constitutional unit represented by the following formula (2-2) and a terminal group bonding to a terminal of the main chain and including a particular functional group.

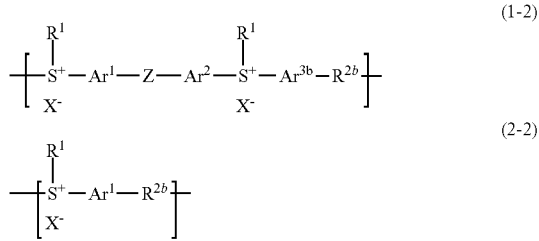

In formulas (1-2) and (2-2), $R^1$ represents an alkyl group having 1 to 10 carbon atoms or an aryl group optionally having an alkyl group having 1 to 10 carbon atoms; $R^{2b}$ represents a direct bond, —$Ar^{4b}$—, —S—$Ar^{4b}$—, —O—$Ar^{4b}$—, —CO—$Ar^{4b}$—, —$SO_2$—$Ar^{4b}$— or —$C(CF_3)_2$—$Ar^{4b}$—; $Ar^1$, $Ar^2$, $Ar^{3b}$ and $Ar^{4b}$ each independently represent an arylene group optionally having a substituent; Z represents a direct bond, —S—, —O—, —CO—, —$SO_2$— or —$C(CF_3)_2$—; and $X^-$ represents an anion.

The polyarylene sulfide resin having a main chain comprising the constitutional unit represented by formula (5-1) can be obtained, for example, by a step of dealkylating or dearylating a poly(arylene sulfonium salt) comprising a main chain including the constitutional unit represented by the above formula (5-2).

Dealkylation or dearylation of the poly(arylene sulfonium salt) proceeds presumably as represented by the following reaction formula, for example.

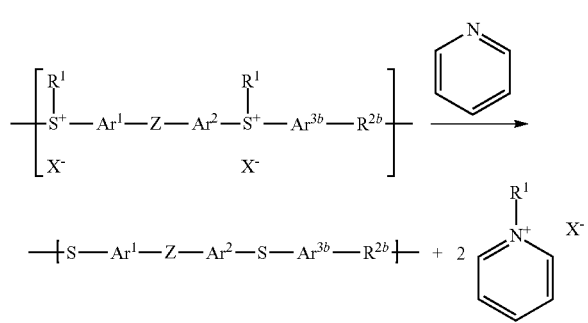

In this step, a dealkylating agent or dearylating agent can be used. The dealkylating agent or dearylating agent contains a nucleophilic agent or reductant. As the nucleophilic agent, a nitrogen-containing aromatic compound, an amine compound, an amide compound, or the like can be used. As the reductant, metal potassium, metal sodium, potassium chloride, sodium chloride, hydrazine, or the like can be used. One of these compounds may be used singly, or two or more thereof may be used in combination.

Examples of the nitrogen-containing aromatic compound include pyridine, quinoline and aniline. Among these compounds, pyridine, which is a general-purpose compound, is preferable.

Examples of the amine compound include trialkylamines and ammonia.

As the amide compound, an aromatic amide compound or an aliphatic amide compound can be used. The aliphatic amide compound is, for example, a compound represented by the following formula (4).

In formula (4), $R^{11}$, $R^{12}$ and $R^{13}$ each independently represent a hydrogen atom or an alkyl group having 1 to 10 carbon atoms; and $R^{11}$ and $R^{13}$ may be bonded together to form a cyclic structure. Examples of the alkyl group having 1 to 10 carbon atoms include a methyl group, an ethyl group, a propyl group, a butyl group, a pentyl group, a hexyl group, a heptyl group, an octyl group, a nonyl group and a decyl group.

The compound represented by formula (4) presumably functions as a dealkylating agent or dearylating agent to dealkylate or dearylate an alkyl group or aryl group bonding to a sulfur atom in a sulfonium salt, for example, through reaction represented by the following reaction formula (1) or (2).

Reaction Formula 1

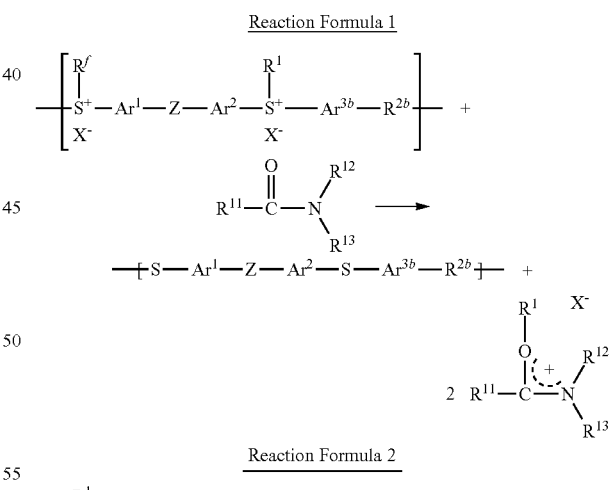

Reaction Formula 2

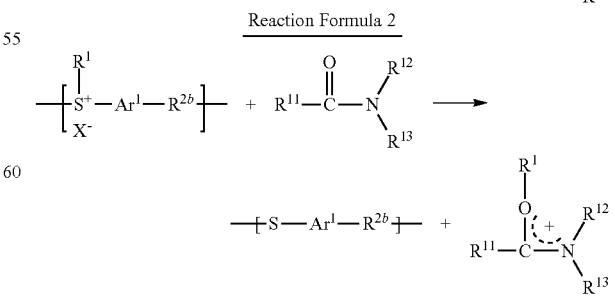

Moreover, the aliphatic amide compound has a higher water miscibility than those of aromatic amide compounds, and hence can be easily removed by washing the reaction mixture with water. Due to this, in the case that an aliphatic amide compound is used, the amount of the aliphatic amide compound remaining in a polyarylene sulfide resin can be further reduced in comparison with the case that an aromatic amide compound is used.

Thus, use of an aliphatic amide compound as a dealkylating agent or dearylating agent is preferable because the generation of gas can be suppressed, for example, in processing a resin, the quality of a polyarylene sulfide resin molding can be enhanced and the working environment can be improved, and in addition the maintainability of a metal mold can be enhanced. Further, because an aliphatic amide compound is also excellent in solubility for organic compounds, use of the aliphatic amide compound enables easy removal of an oligomer component of a polyarylene sulfide from the reaction mixture. As a result, the oligomer component, which may contribute to the generation of gas, can be removed by the aliphatic amide compound to synergistically enhance the quality of a polyarylene sulfide resin to be obtained.

Examples of the aliphatic amide compound which can be used include primary amide compounds such as formamide; secondary amide compounds such as β-lactam; and tertiary amide compounds such as N-methyl-2-pyrrolidone, dimethylformamide, diethylformamide, dimethylacetamide and tetramethylurea. From the view point of the solubility for a poly(arylene sulfonium salt) and the solubility in water, the aliphatic amide compound preferably includes an aliphatic tertiary amide compound in which $R^{12}$ and $R^{13}$ are each an aliphatic group, and especially, N-methyl-2-pyrrolidone is preferable among tertiary amide compounds.

The aliphatic amide compound not only functions as a dealkylating agent or dearylating agent, but also can be used as a reaction solvent because of being excellent in solubility. Although the amount of the aliphatic amide compound to be used is not particularly limited, the lower limit is preferably in a range of 1.00 equivalent or more, more preferably in a range of 1.02 equivalents or more, and still more preferably in a range of 1.05 equivalents or more with respect to the total amount of a poly(arylene sulfonium salt). In the case that the amount of the aliphatic amide compound to be used is 1.00 equivalent or more, dealkylation or dearylation of a poly(arylene sulfonium salt) can be carried out satisfactorily. On the other hand, the upper limit of the amount of the aliphatic amide compound to be used is preferably 100 equivalents or less, and more preferably 10 equivalents or less based on the total amount of a poly(arylene sulfonium salt). As the reaction solvent, the aliphatic amide compound may be used alone or in combination with another solvent such as toluene.

Conditions for the reaction of the poly(arylenesulfonium salt) according to the present embodiment with the aliphatic amide compound can be appropriately adjusted so as to allow dealkylation or dearylation to proceed suitably. The reaction temperature is preferably in a range of 50 to 250° C., and more preferably in a range of 80 to 230° C.

The method for manufacturing a polyarylene sulfide resin according to the present embodiment may further include a step of washing a polyarylene sulfide resin with water, a water-soluble solvent or a mixture solvent thereof. By including such a washing step, it is possible to more reliably reduce the amount of a remaining dealkylating agent or dearylating agent contained in a polyarylene sulfide resin to be obtained. This tendency becomes more significant when an aliphatic amide compound is used as a dealkylating agent or dearylating agent.

Through a washing step, it is possible to more reliably reduce the amount of a dealkylating agent or dearylating agent remaining in a polyarylene sulfide resin to be obtained. The amount of a dealkylating agent or dearylating agent remaining in the resin is preferably in a range of 1000 ppm or less, more preferably in a range of 700 ppm or less, and still more preferably in a range of 100 ppm or less based on the mass of the resin including a polyarylene sulfide resin and other components such as a dealkylating agent or dearylating agent. In the case that the amount of a dealkylating agent or dearylating agent remaining in the resin is 1000 ppm or less, it is possible to further reduce a substantial influence on the quality of a polyarylene sulfide resin to be obtained.

The solvent used in the washing step is, although not particularly limited, preferably one which dissolves an unreacted material therein. Examples of the solvent include water; acidic aqueous solutions such as hydrochloric acid, an aqueous solution of acetic acid, an aqueous solution of oxalic acid and an aqueous solution of nitric acid; aromatic hydrocarbon solvents such as toluene and xylene; alcohol solvents such as methanol, ethanol, propanol and isopropyl alcohol; ketone solvents such as acetone, methyl ethyl ketone and methyl isobutyl ketone; nitrile solvents such as acetonitrile; ether solvents such as tetrahydrofuran and dioxane; amide solvents such as dimethylacetamide and N-methyl-2-pyrrolidone; and halogen-containing solvents such as dichloromethane and chloroform. These solvents may be used singly or in combinations of two or more thereof. Among these solvents, water and N-methyl-2-pyrrolidone are preferable from the viewpoint of removal of the reaction reagents and removal of the oligomer component of the resin.

The reaction product obtained by the washing step may be subjected to base treatment with an aqueous solution containing a basic compound, as necessary, to replace the hydroxy group or carboxy group present in the molecular structure of a polyarylene sulfide resin with a metal salt.

The temperature condition for the base treatment is, for example, in a range of 5 to 100° C. The temperature condition is particularly preferably in a range of 15 to 80° C. from the viewpoint of increasing the amount of terminal metal salts in a polyarylene sulfide resin and preventing lowering of the molecular weight. It is preferable that the pH in the base treatment process be controlled in a range of 3.0 to 10.0 after the base treatment process, and it is more preferable that the pH in the base treatment process be controlled in a range of 6.0 to 8.0, from the viewpoint of increasing the content of terminal metal salts in a polyarylene sulfide resin. Examples of the method for measuring pH in the case that an acid is added to a slurry include a method in which the pH of a filtrate after filtration of the slurry is measured. Further, examples of the method for measuring pH in the case that base treatment is performed for a polyarylene sulfide resin as a solid content after filtration include a method in which the pH of a filtrate after washing, as a mixture of all filtrates obtained through repeated washing with an aqueous solution having a predetermined base concentration, is measured.

The basic compound to be used in the base treatment is preferably a compound which is highly basic in an aqueous solution. Examples of such compounds which may be used include hydroxides of alkali metal such as lithium hydroxide, sodium hydroxide and potassium hydroxide; hydroxides of alkali earth metal such as calcium hydroxide and magnesium hydroxide; sodium carbonate; calcium carbonate; and sodium phosphate.

The polyarylene sulfide resin obtained by the production method according to one embodiment with the poly(arylene sulfonium salt) obtained in the step (a) comprises a main chain including a constitutional unit represented by the following formula (1-1) and a terminal group bonding to a terminal of the main chain and including a particular functional group.

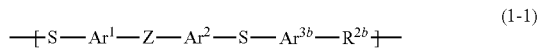
(1-1)

In formula (1-1), $R^{2b}$, $Ar^1$, $Ar^2$, $Ar^{3b}$ and Z are as defined in the above. In the case that $Ar^1$, $Ar^2$ and $Ar^{3b}$ are each a 1,4-phenylene group, and $R^{2b}$ is a direct bond in formula (1-1), it is preferable that Z be a direct bond, —CO—, —SO$_2$— or —C(CF$_3$)$_2$—. In the case that $Ar^1$, $Ar^2$ and $Ar^{3b}$ are each a 1,4-phenylene group, $R^{2b}$ is —$Ar^{4b}$—, and $Ar^{4b}$ is a 1,4-phenylene group, it is preferable that Z be —S—, —O—, —CO—, —SO$_2$— or —C(CF$_3$)$_2$—.

In the constitutional unit represented by formula (1-1), the mode of bonding in $Ar^1$, $Ar^2$, $Ar^{3b}$ and $Ar^{4b}$ is not particularly limited, and the same concept as for the mode of bonding in $Ar^1$ and $Ar^2$ in formulas (1-2), (1-3) and (1-4) can be applied.

In the case that the arylene group represented by $Ar^1$, $Ar^2$, $Ar^{3b}$ or $Ar^{4b}$ has a substituent, the substituent is preferably an alkyl group having 1 to 10 carbon atoms such as a methyl group, an ethyl group, a propyl group, a butyl group, a pentyl group, a hexyl group, a heptyl group, an octyl group, a nonyl group and a decyl group, a hydroxy group, an amino group, a mercapto group, a carboxy group or a sulfo group. However, the ratio of the constitutional unit represented by formula (1-1) in which $Ar^1$, $Ar^2$, $Ar^3$ and $Ar^{4b}$ are each an arylene group having a substituent is preferably in a range of 10% by mass or less, and more preferably in a range of 5% by mass or less with respect to the whole polyarylene sulfide resin from the viewpoint of further suppressing reduction in the crystallinity and heat resistance of the polyarylene sulfide resin.

The constitutional unit included in the polyarylene sulfide resin can be appropriately selected, for example, by changing the combination of the sulfoxide represented by formula (1-3) and the aromatic compound represented by formula (1-4), in accordance with the purpose of use of the resin.

The weight-average molecular weight of the polyarylene sulfide resin represented by formula (1-1) is preferably in a range of 8000 or higher, more preferably in a range of 9000 or higher, even more preferably in a range of 10000 or higher, and particularly preferably in a range of 11000 or higher. By virtue of the weight-average molecular weight being in such a range, the polyarylene sulfide resin exerts more excellent heat resistance and mechanical properties. Weight-average molecular weight refers to a value measured using gel permeation chromatography. Measurement conditions for gel permeation chromatography are the same measurement conditions as in Examples herein. However, the measurement conditions may be appropriately changed in a manner such that the change does not have substantial influence on measurements of weight-average molecular weight.

The glass transition temperature of the polyarylene sulfide resin represented by formula (1-1) is preferably in a range of 70 to 200° C., and more preferably in a range of 80 to 170° C. The glass transition temperature of a resin refers to a value measured using a DSC instrument.

The melting point of the polyarylene sulfide resin represented by formula (1-1) is preferably in a range of 100 to 400° C., and more preferably 150 to 370° C. The melting point of a resin refers to a value measured using a DSC instrument.

On the other hand, the polyarylene sulfide resin obtained by the production method according to one embodiment with the poly(arylene sulfonium salt) obtained in the step (b) comprises a main chain including a constitutional unit represented by the following formula (2-1) and a terminal group bonding to a terminal of the main chain and including a particular functional group.

(2-1)

In formula (2-1), $R^{2b}$ and $Ar^1$ are as defined in the above.

The glass transition temperature of the polyarylene sulfide resin represented by formula (2-1) is preferably in a range of 70 to 200° C., and more preferably in a range of 80 to 170° C. The glass transition temperature of a resin refers to a value measured using a DSC instrument.

The melting point of the polyarylene sulfide resin represented by formula (2-1) is preferably in a range of 100 to 400° C., and more preferably in a range of 150 to 370° C. The melting point of a resin is a value measured using a DSC instrument.

The terminal group including a particular functional group in the polyarylene sulfide resin is preferably a group represented by the following formula (3-1b), (3-2b), (3-3b), (3-4b), (3-5b) or (3-6b). The polyarylene sulfide resin having such a terminal group has good compatibility with silane coupling agents or other resins such as epoxy resin in production of a resin composition. The polyarylene sulfide resin having such a terminal group can also impart, to a member obtained from a resin composition, excellent adhesion to a different member.

(3-1b)

(3-2b)

(3-3b)

(3-4b)

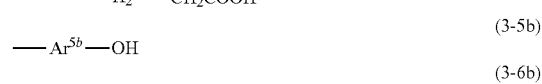
(3-5b)

(3-6b)

In the formulas, $R^3$ represents a direct bond or an alkylene group having 1 to 10 carbon atoms; and $Ar^{5b}$ represents an aryl group.

The terminal group including a particular functional group in the polyarylene sulfide group may be a group represented by the following formula (4-1b), (4-2b), (4-3b) or (4-4b). The polyarylene sulfide resin having such a terminal group also has good compatibility with silane coupling agents or other resins such as epoxy resin in production of a resin composition. The polyarylene sulfide resin having such a terminal group can also impart, to a member obtained from a resin composition, excellent adhesion to a different member.

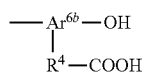 (4-1b)

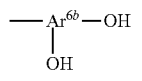 (4-2b)

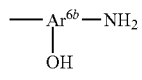 (4-3b)

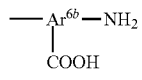 (4-4b)

In the formulas, $R^4$ represents a direct bond or an alkylene group having 1 to 10 carbon atoms; and $Ar^{6b}$ represents an aryl group.

The aryl group of each of $Ar^{5b}$ and $Ar^{6b}$ can include an arylene group in which a substituent is bonding to an aryl group.

Examples of the terminal group represented by formula (4-1b), (4-2b), (4-3b) or (4-4b) include groups represented by the following chemical formulas. In the formulas, $R^4$ has the same definition as that in formulas (4-1a) and so on.

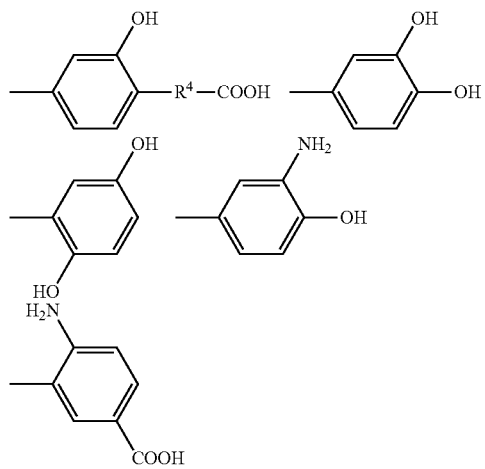

Uses and Applied Technologies

The polyarylene sulfide resin can be combined with another component for utilizing as a polyarylene sulfide resin composition. For example, an inorganic filler can be used as the other component, and a resin other than the polyarylene sulfide resin selected from a thermoplastic resin, an elastomer and a cross-linkable resin or the like can also be used.

Examples of the inorganic filler include powdered fillers such as carbon black, calcium carbonate, silica and titanium oxide; platy fillers such as talk and mica; granular fillers such as a glass bead, a silica bead and a glass balloon; fibrous fillers such as a glass fiber, a carbon fiber and a wollastonite fiber; and a glass flake. These inorganic fillers can be used singly or in combinations of two or more thereof. By formulating an inorganic filler, a composition having a high stiffness and a high thermal stability can be obtained. The polyarylene sulfide resin composition particularly preferably contains at least one inorganic filler selected from the group consisting of a glass fiber, a carbon fiber, carbon black and calcium carbonate.

The content of an inorganic filler is preferably in a range of 1 to 300 parts by mass, more preferably in a range of 5 to 200 parts by mass, and still more preferably in a range of 15 to 150 parts by mass based on 100 parts by mass of the polyarylene sulfide resin. Due to the content of an inorganic filler being within such a range, more excellent effect can be obtained in terms of retaining the mechanical strength of a molding.

The polyarylene sulfide resin composition may contain a resin other than the polyarylene sulfide resin selected from a thermoplastic resin, an elastomer and a cross-linkable resin. These resins can also be formulated in the resin composition together with an inorganic filler.

Examples of the thermoplastic resin to be formulated in the polyarylene sulfide resin composition include polyester, polyamide, polyimide, polyetherimide, polycarbonate, polyphenylene ether, polysulfone, polyether sulfone, polyether ether ketone, polyether ketone, polyethylene, polypropylene, polytetrafluoroethylene, polydifluoroethylene, polystyrene, ABS resins, silicone resins and liquid crystal polymers (e.g., liquid crystal polyester). These thermoplastic resins can be used singly or in combinations of two or more thereof.

The content of the thermoplastic resin is preferably in a range of 1 to 300 parts by mass, more preferably in a range of 3 to 100 parts by mass and still more preferably in a range of 5 to 45 parts by mass with respect to 100 parts by mass of the polyarylene sulfide resin. Due to the content of the thermoplastic resin other than the polyarylene sulfide resin being within such a range, an effect of the further enhancement of heat resistance, chemical resistance and mechanical properties can be obtained.

As the elastomer to be formulated in the polyarylene sulfide resin composition, a thermoplastic elastomer is often used. Examples of the thermoplastic elastomer include polyolefin elastomers, fluorine-based elastomers and silicone elastomers. In the present specification, thermoplastic elastomers are classified into not the thermoplastic resin, but an elastomer.

In the case that the polyarylene sulfide resin has a functional group such as a carboxyl group, the elastomer (in particular, the thermoplastic elastomer) preferably has a functional group which can react with it. This enables to obtain a resin composition particularly excellent in adhesion properties, impact resistance and the like. Examples of the functional group include an epoxy group, an amino group, a hydroxyl group, a carboxy group, a mercapto group, an isocyanate group, an oxazoline group and a group represented by the formula: R(CO)O(CO)— or R(CO)O— (wherein R represents an alkyl group having 1 to 8 carbon atoms). A thermoplastic elastomer having the functional group can be obtained, for example, by copolymerization of an α-olefin and a vinyl-polymerizable compound having the functional group. Examples of the α-olefin include α-olefins having 2 to 8 carbon atoms such as ethylene, propylene and butene-1. Examples of the vinyl-polymerizable compound having the functional group include α,β-unsaturated carboxylic acids such as (meth)acrylic acid and (meth)acrylate and alkyl esters thereof; maleic acid, fumaric acid, itaconic acid and other α,β-unsaturated dicarboxylic acids having 4 to 10 carbon atoms and derivatives (mono- or diesters and acid anhydrides thereof) thereof; and glycidyl (meth)acrylate. Among them, ethylene-propylene copolymers and ethylene-butene copolymers having at least one functional group selected from the group consisting of an epoxy group, a carboxy group and a group represented by the formula: R(CO)O(CO)— or R(CO)O— (wherein R represents an alkyl group having 1 to 8 carbon atoms) are preferable in terms of further enhancing the toughness and shock resistance.

The content of the elastomer, which varies depending on the type or application and therefore cannot be defined sweepingly. The content of the elastomer is for example, preferably in a range of 1 to 300 parts by mass, more preferably in a range of 3 to 100 parts by mass, and still more preferably in a range of 5 to 45 parts by mass with respect to 100 parts by mass of the polyarylene sulfide resin. Due to the content of the elastomer being within such a range, an even more excellent effect can be obtained in terms of ensuring the heat resistance and toughness of a molding.

The cross-linkable resin to be formulated in the polyarylene sulfide resin composition has two or more cross-linkable functional groups. Examples of the cross-linkable functional group include an epoxy group, a phenolic hydroxyl group, an amino group, an amide group, a carboxy group, an acid anhydride group and an isocyanate group. Examples of the cross-linkable resin include epoxy resins, phenol resins and urethane resins.

As the epoxy resin, aromatic epoxy resins are preferable. The aromatic epoxy resin may have a halogen group, a hydroxyl group or the like. Examples of a suitable aromatic epoxy resin include a bisphenol A type epoxy resin, a bisphenol F type epoxy resin, a bisphenol S type epoxy resin, a biphenyl type epoxy resin, a tetramethylbiphenyl type epoxy resin, a phenol novolac type epoxy resin, a cresol novolac type epoxy resin, a bisphenol A novolac type epoxy resin, a triphenylmethane type epoxy resin, a tetraphenylethane type epoxy resin, a dicyclopentadiene-phenol addition reaction type epoxy resin, a phenol aralkyl type epoxy resin, a naphthol novolac type epoxy resin, a naphthol aralkyl type epoxy resin, a naphthol-phenol-cocondensed novolac type epoxy resin, a naphthol-cresol-cocondensed novolac type epoxy resin, an aromatic hydrocarbon formaldehyde resin-modified phenol resin type epoxy resin and biphenyl novolac type epoxy resin. These aromatic epoxy resins can be used singly or in combinations of two or more thereof. Among these aromatic epoxy resins, a novolac type epoxy resin is preferable, and a cresol novolac type epoxy resin is more preferable in terms of an excellent compatibility with other resin components in particular.

The content of the cross-linkable resin is preferably in a range of 1 to 300 parts by mass, more preferably 3 to 100 parts by mass, and still more preferably 5 to 30 parts by mass with respect to 100 parts by mass of the polyarylene sulfide resin. Due to the content of the cross-linkable resin being within such a range, an effect of enhancing the stiffness and heat resistance of a molding can be obtained much more significantly.

The polyarylene sulfide resin composition can contain a silane compound having a functional group. Examples of the silane compound include silane coupling agents such as γ-glycidoxypropyltrimethoxysilane, γ-glycidoxypropyltriethoxysilane, β-(3,4-epoxycyclohexyl)ethyltrimethoxysilane, γ-glycidoxypropylmethyldiethoxysilane, and γ-glycidoxypropylmethyldimethoxysilane.

The content of the silane compound is, for example, in a range of 0.01 to 10 parts by mass, and preferably in a range of 0.1 to 5 parts by mass with respect to 100 parts by mass of the polyarylene sulfide resin. Due to the content of the silane compound being within such a range, an effect of further enhancing the compatibility of the polyarylene sulfide resin with other components can be obtained.

The polyarylene sulfide resin composition may contain other additives such as a release agent, a colorant, a thermal stabilizer, an ultraviolet stabilizer, a foaming agent, a rust inhibitor, a flame retardant and a lubricant. The content of the additive is, for example, in a range of 1 to 10 parts by mass with respect to 100 parts by mass of the polyarylene sulfide resin.

The polyarylene sulfide resin composition can be obtained in a form of a pelletized compound or the like by using a method in which the polyarylene sulfide resin (a reaction product of melt polymerization) and other components are melt-kneaded. The temperature in melt-kneading is, for example, in a range of 250 to 350° C. The duration in melt-kneading is, for example, 5 to 30 seconds. Melt-kneading can be carried out with a twin-screw extruder or the like.

The polyarylene sulfide resin composition can be processed, alone or in combination with other materials, into a molding excellent in heat resistance, molding processability, dimensional stability or the like by various melt processing methods such as injection molding, extrusion molding, compression molding and blow molding. The polyarylene sulfide resin obtained by the manufacturing method according to the present embodiment or a resin composition containing it enables to produce a high-quality molding easily because the generation of gas in heating is small.

The polyarylene sulfide resin obtained by the production method according to any of the present embodiments or a resin composition containing the resin possesses various performances such as heat resistance and dimensional stability, which the polyarylene sulfide resin has by nature. Therefore, the polyarylene sulfide resin or a resin composition containing the resin is widely useful for materials for various molding such as injection molding or compression molding for electric/electronic parts such as a connector, a printed substrate and a sealed molding, automotive parts such as a lamp reflector and various electrical component parts, interior decoration materials for various buildings, an airplane, an automobile and the like or precision parts such OA equipment parts, camera parts and clock parts, extrusion molding for a composite, a sheet, a pipe or the like, or pultrusion molding; or materials for a fiber or a film, for example.

EXAMPLES

Hereinafter, the present invention will be described more specifically by exemplifying Examples. However the present invention is never limited to these Examples.

1. Evaluation method
1-1. Identification Method (NMRs)
With DPX-400 instrument manufactured by Bruker Corporation, NMR measurements were performed for samples containing each compound dissolved in various deuterated solvents.
1-2. Identification Method (GC-MS)
With GCMS-QP2010 manufactured by Shimadzu Corporation, the molecular weight of each compound was measured.
1-3. Melting Point
Measurements were performed from 40 to 350° C. under a nitrogen flow of 50 mL/min under temperature elevation conditions of 20° C./min to determine melting points with the DSC instrument Pyris Diamond manufactured by PerkinElmer Co., Ltd. For resins obtained in Examples 34, 35 and 36, and Reference Example 2, measurements were performed from 40 to 400° C. under a nitrogen flow of 50 mL/min under temperature elevation conditions of 20° C./min to determine melting points.

1-4. Weight-Average Molecular Weight

With the high-temperature gel permeation chromatograph (GPC) SSC-7000 manufactured by Senshu Scientific co., ltd., the weight-average molecular weight was measured. The average molecular weight was calculated in terms of standard polystyrene.

Solvent: 1-chloronaphthalene
Inlet: 250° C.
Temperature: 210° C.
Detector: UV detector (360 nm)
Sample concentration: 1 g/L
Flow rate: 0.7 mL/min 1-5. Determination of Infrared Absorption Spectrum With "FT/IR-6100" manufactured by JASCO Corporation, the infrared absorption spectrum was measured. A resin synthesized was heated to melt on a hot plate at 330° C., and immediately cooled to produce an amorphous film, which was used as a measurement sample. For resins obtained in Examples 34, 35 and 36, and Reference Example 2, a resin synthesized was heated to melt on a hot plate at 400° C., and immediately cooled to produce an amorphous film, which was used as a measurement sample.

1-6. Viscosity Measurement (V6)

Using a flow tester (CFT-500C manufactured by Shimadzu Corporation) with an orifice having a ratio of the orifice length to the orifice diameter (orifice length/orifice diameter) of 10/1 at a temperature of 300° C. and a load of 1.96 MPa, the melt viscosity after 6 minutes of retention (hereinafter, referred to as melt viscosity (V6)) was measured.

1-7. Melt Stability

To evaluate thermal stability in processing, the melt viscosity after 30 minutes of retention at 300° C. (hereinafter, referred to as melt viscosity (V30)) was measured and the presence or absence of gelling was measured by using a flow tester (CFT-500C manufactured by Shimadzu Corporation) with an orifice having a ratio of the orifice length to the orifice diameter (orifice length/orifice diameter) of 10/1 at a load of 1.96 MPa.

1-8. Evaluation of Reactivity

Using a flow tester (CFT-500C manufactured by Shimadzu Corporation) with an orifice having a ratio of the orifice length to the orifice diameter (orifice length/orifice diameter) of 10/1 at a temperature of 300° C. and a load of 1.96 MPa, the melt viscosity after 15 minutes of retention of a poly(p-phenylene sulfide) resin (hereinafter, referred to as "melt viscosity (V15)") was measured (hereinafter, referred to as "melt viscosity (V15) before addition" or "melt viscosity (V15) of PPS resin without epoxy resin").

Subsequently, 3 parts by mass of a cresol novolac type epoxy resin (N-695P manufactured by DIC Corporation) was blended in 100 parts by mass of a poly(p-phenylene sulfide) resin, and they were homogeneously mixed together. Thereafter, the melt viscosity (V15) was measured using a flow tester (CFT-500C manufactured by Shimadzu Corporation) under the same conditions as in the above (hereinafter, referred to as "melt viscosity (V15) after addition" or "melt viscosity (V15) of PPS resin with epoxy resin").

From the ratio of (melt viscosity (V15) after addition)/(melt viscosity (V15) before addition), the viscosity increase rate was calculated as a factor. A higher viscosity increase rate indicates higher reactivity to epoxy resin and thus being excellent.

2. Synthesis of Monomer

In Examples shown hereinafter, the following reagents were used.

methyl phenyl sulfoxide: Wako Pure Chemical Industries, Ltd.
thioanisole: Wako Pure Chemical Industries, Ltd., purity 99%
methanesulfonic acid: Wako Pure Chemical Industries, Ltd., Wako special grade
60% perchloric acid: Wako Pure Chemical Industries, Ltd., JIS special grade
pyridine: Wako Pure Chemical Industries, Ltd., JIS special grade
potassium hydrogen carbonate: Wako Pure Chemical Industries, Ltd., JIS special grade
bromine: Wako Pure Chemical Industries, Ltd., JIS special grade
bis[4-(methylthio)phenyl] sulfide: manufactured by Sigma-Aldrich Co., LLC., product number S203815-25MG
nitric acid (1.38): manufactured by Wako Pure Chemical Industries, Ltd., JIS special grade, content 60 to 61%, density 1.38 g/mL
phosphorus oxide (V) (diphosphorus pentoxide): Wako Pure Chemical Industries, Ltd., Wako special grade
N-methyl-2-pyrrolidone (NMP): KANTO CHEMICAL CO., INC., special grade
benzoic acid: Tokyo Chemical Industry Co., Ltd.
phenylpropionic acid: Tokyo Chemical Industry Co., Ltd., purity >98%
phenylhexanoic acid: Tokyo Chemical Industry Co., Ltd., purity >98%
phenylisobutyric acid: Tokyo Chemical Industry Co., Ltd., purity >98%
phenylmalonic acid: Tokyo Chemical Industry Co., Ltd., purity >98%
phenol: Tokyo Chemical Industry Co., Ltd., purity >98%
N-phenylglycine: Tokyo Chemical Industry Co., Ltd., purity >98%
N-benzyliminodiacetic acid: Tokyo Chemical Industry Co., Ltd., purity >98%
aniline: Tokyo Chemical Industry Co., Ltd., purity >98%
diphenyl sulfide: manufactured by Wako Pure Chemical Industries, Ltd., Wako special grade
diphenyl ether: manufactured by Wako Pure Chemical Industries, Ltd., Wako special grade
sodium hydroxide: Kanto Chemical Industry Co., Ltd., special grade Synthesis Example 1

Synthesis of methylphenyl[4-(methylthio)phenyl] sulfonium Perchlorate

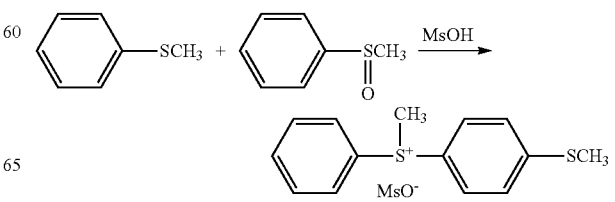

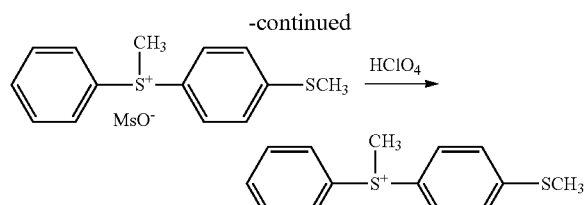

In a three-necked flask were placed 100 parts by mass of methyl phenyl sulfoxide and 120 parts by mass of thioanisole, and cooled to 5° C. or less in an ice bath under a nitrogen atmosphere. While keeping the temperature at 10° C. or less, 2000 parts by mass of methanesulfonic acid was added to the reaction solution, and thereafter the ice bath was removed followed by raising the temperature to a room temperature and stirring for 20 hours. Then, the reaction solution was placed into 2000 parts by mass of 60% aqueous solution of perchloric acid and stirred for 1 hour. Thereto, 1000 parts by mass of water and 1000 parts by mass of dichloromethane were added, and the organic layer was recovered by an extraction/separation process. A process of adding 500 parts by mass of dichloromethane to the aqueous layer, and recovering the organic layer, was carried out twice. To the recovered organic layer was added anhydrous magnesium sulfate for dehydration, and filtration was performed to separate the solution, from which the solvent was removed with a rotary evaporator. Thereafter, an ether was added to the remaining solid to recrystallize, and the solid was filtered out by filtration and dried under a reduced pressure for 20 hours to afford methylphenyl[4-(methylthio)phenyl]sulfonium perchlorate at a yield of 75%. The result of $^1$H-NMR confirmed that the product was formed.

$^1$H-NMR (solvent, CDCl$_3$): 2.49, 3.63, 7.40, 7.65, 7.78, 7.85 [ppm]

Synthesis Example 2

Synthesis of Methyl 4-(phenylthio)phenyl Sulfide

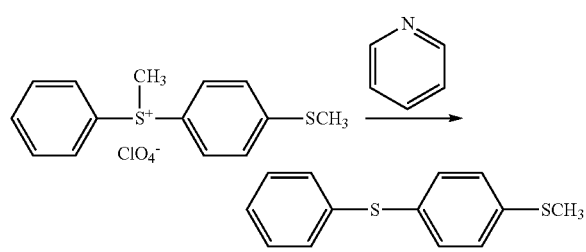

In a three-necked flask was placed 100 parts by mass of methylphenyl[4-(methylthio)phenyl]sulfonium perchlorate, and 500 parts by mass of pyridine was added under a nitrogen atmosphere followed by stirring for 30 minutes. Thereafter, the temperature of the reaction solution was raised to 100° C. followed by stirring for 30 minutes. The reaction solution was placed into 3000 parts by mass of 10% HCl solution and stirred for 10 minutes. Then, the organic layer was recovered from the reaction solution by an extraction/separation process with dichloromethane. To the organic layer was added anhydrous magnesium sulfate for dehydration, and filtration was performed to separate the solution, from which the solvent was removed with a rotary evaporator. The residue was subjected to column chromatography with hexane/chloroform=3/1 as the developing solvent to separate the targeted product. From the solution containing the separated targeted product, the solvent was removed with a rotary evaporator, and the resultant was then dried under a reduced pressure for 20 hours to afford methyl 4-(phenylthio)phenyl sulfide at a yield of 83%. The result of $^1$H-NMR confirmed that the product was formed.

$^1$H-NMR (solvent, CDCl$_3$): 2.48, 7.18-7.23, 7.28-7.31 [ppm]

Synthesis Example 3

Synthesis of Methyl 4-(phenylthio)phenyl Sulfoxide

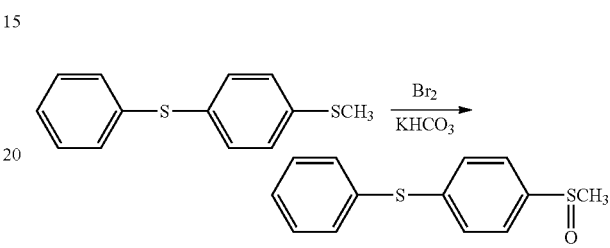

In a three-necked flask were placed 100 parts by mass of methyl 4-(phenylthio)phenyl sulfide, 86 parts by mass of potassium hydrogen carbonate, 800 parts by mass of water and 1000 parts by mass of dichloromethane, and stirred for 30 minutes. A solution in which 69 parts by mass of bromine had been dissolved in 1000 parts by mass of dichloromethane was added dropwise into the reaction vessel over 5 minutes followed by stirring for 30 minutes. Into the reaction solution were placed 1 liter of a saturated KCl solution and 1 liter of dichloromethane, and the organic layer was recovered by an extraction/separation process. A process of adding 1000 parts by mass of dichloromethane to the residual aqueous layer and recovering the organic layer, was carried out twice. The recovered organic layer was subjected to washing with water/separation, and anhydrous magnesium sulfate was added thereto for dehydration, and filtration was performed to separate the solution, from which the solvent was removed with a rotary evaporator. An ether was added to the remaining solid to recrystallize, and the solid was filtered out by filtration and dried under a reduced pressure for 20 hours to afford methyl 4-(phenylthio)phenyl sulfoxide at a yield of 57%. The results of $^1$H-NMR and $^{13}$C-NMR confirmed that the product was formed.

$^1$H-NMR (solvent, CDCl$_3$): 2.71, 7.34, 7.39, 7.46, 7.52 [ppm]

$^{13}$C-NMR (solvent, CDCl$_3$): 46.0, 124.5, 128.5, 129.7, 133.0, 133.5, 141.5, 144.3 [ppm]

Synthesis Example 4

Synthesis of bis[4-(methylsulfinyl)phenyl] sulfide

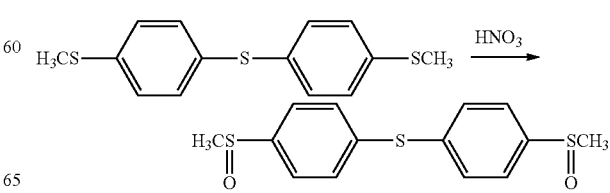

Into a three-necked flask were added 100 parts by mass of bis[4-(methylthio)phenyl] sulfide and 2500 parts by mass of dichloromethane and dissolved together, and cooled in an ice bath. To the reaction solution, 20 parts by mass of nitric acid (1.38) was gradually added dropwise, and the reaction solution was stirred at a room temperature for 72 hours. The reaction solution was neutralized with an aqueous solution of potassium carbonate, and subjected to an extraction/separation process with dichloromethane to recover the organic layer. The organic layer was dehydrated with anhydrous magnesium sulfate. The dehydrated organic layer was subjected to filtration, and the solvent was removed from the filtrate with a rotary evaporator, and the resultant was dried under a reduced pressure to afford a crude product. The crude product was subjected to column chromatography with ethyl acetate as the developing solvent to separate the targeted product. The solvent was removed from the solution containing the separated targeted product with a rotary evaporator, and the resultant was then dried under a reduced pressure to afford bis[4-(methylsulfinyl)phenyl] sulfide at a yield of 30%. As a result of $^1$H-NMR measurement, it was confirmed that the targeted product was obtained.

$^1$H-NMR (solvent, CDCl$_3$): 2.75, 7.49, 7.61 [ppm]

3. Synthesis of Terminal-Modified Polysulfonium Salt and PAS Resin

Example 1

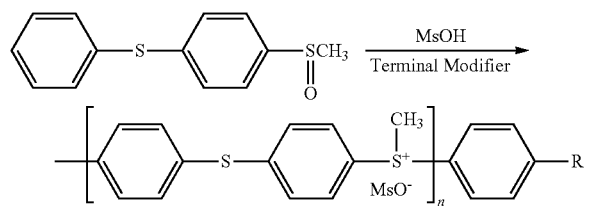

In a separable flask were placed 100 parts by mass of methyl 4-(phenylthio)phenyl sulfoxide and 3 parts by mass of benzoic acid, and 800 parts by mass of methanesulfonic acid and 70 parts by mass of diphosphorus pentoxide were further added thereto with cooling to 10° C. or less, and the resultant was stirred for 20 hours. The reaction solution was placed into 10000 parts by mass of acetone, and a solid precipitated was collected through filtration and washed with 600 parts by mass of acetone twice. The resulting solid was dried under a reduced pressure to afford poly[methyl (4-phenylthiophenyl)sulfonium methanesulfonate] at a yield of 98%. The results of $^1$H-NMR and $^{13}$C-NMR confirmed that the produce was formed.

$^1$H-NMR (solvent, DMSO-d$_6$): 3.77, 7.59, 8.03 [ppm]
$^{13}$C-NMR (solvent, DMSO-d$_6$): 27.1, 127.1, 131.7, 132.9, 140.8 [ppm]

Example 2

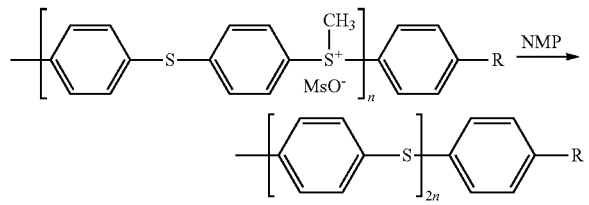

Into an eggplant flask were added 100 parts by mass of poly[methyl(4-phenylthiophenyl)sulfonium methanesulfonate] and 800 parts by mass of N-methyl-2-pyrrolidone, and dissolved together. This was stirred at 70° C. for 8 hours, and a solid precipitated was collected through filtration. The resulting solid was charged into an autoclave, and 800 parts by mass of N-methyl-2-pyrrolidone was added thereto, and the resultant was stirred at 230° C. for 1 hour. The solid was collected through filtration, and the solid collected was washed with 1000 parts by mass of water at 70° C. twice. The solid collected was dried at 120° C. for 4 hours to afford the targeted poly(p-phenylene sulfide) at a yield of 58%.

Figure 1:
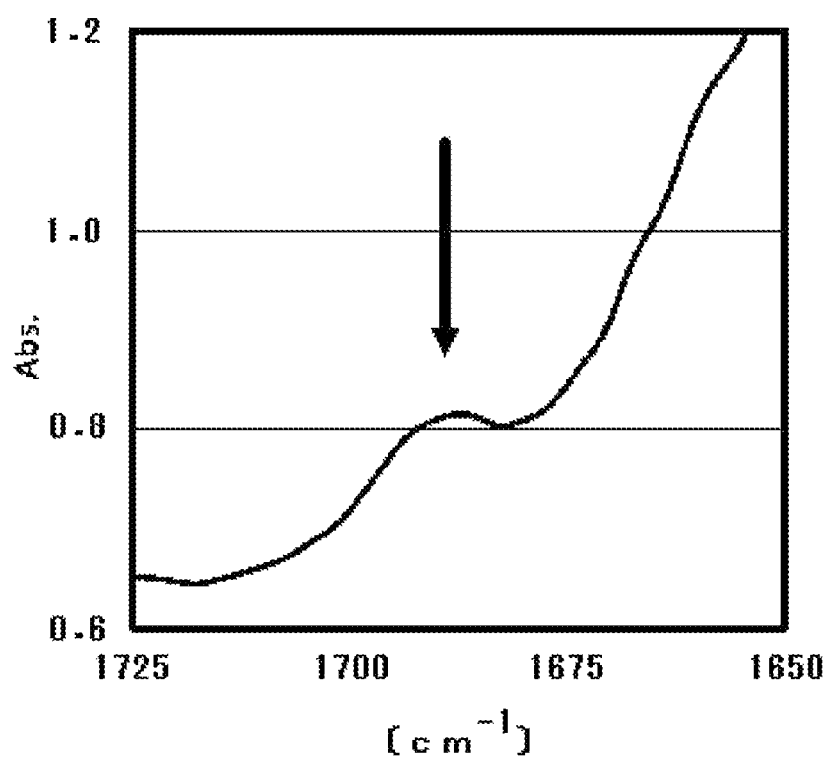
FIG. 1 shows a chart acquired from measurement of the infrared absorption spectrum of poly(p-phenylene sulfide) obtained in Example 2. The arrow (position of 1681 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1681 cm$^{-1}$ as shown in FIG. 1.

Example 3

The same operations as in Example 1 were performed except that 3 parts by mass of phenylpropionic acid was used in place of benzoic acid to afford poly[methyl(4-phenylthiophenyl)sulfonium methanesulfonate] at a yield of 97%. Thereafter, the same operations as in Example 2 were performed to afford poly(p-phenylene sulfide) at a yield of 72%.

Figure 2:
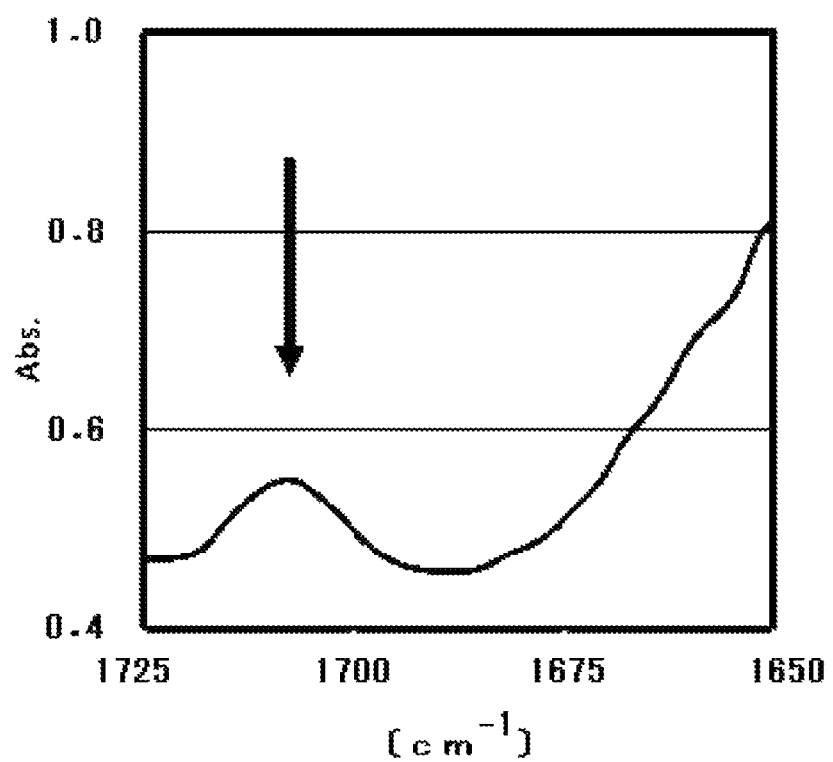
FIG. 2 shows a chart acquired from measurement of the infrared absorption spectrum of poly(p-phenylene sulfide) obtained in Example 3. The arrow (position of 1708 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1708 cm$^{-1}$ as shown in FIG. 2.

Example 4

The same operations as in Example 1 were performed except that 4 parts by mass of phenylhexanoic acid was used in place of benzoic acid to afford poly[methyl(4-phenylthiophenyl)sulfonium methanesulfonate] at a yield of 100%. Thereafter, the same operations as in Example 2 were performed to afford poly(p-phenylene sulfide) at a yield of 50%.

Figure 3:
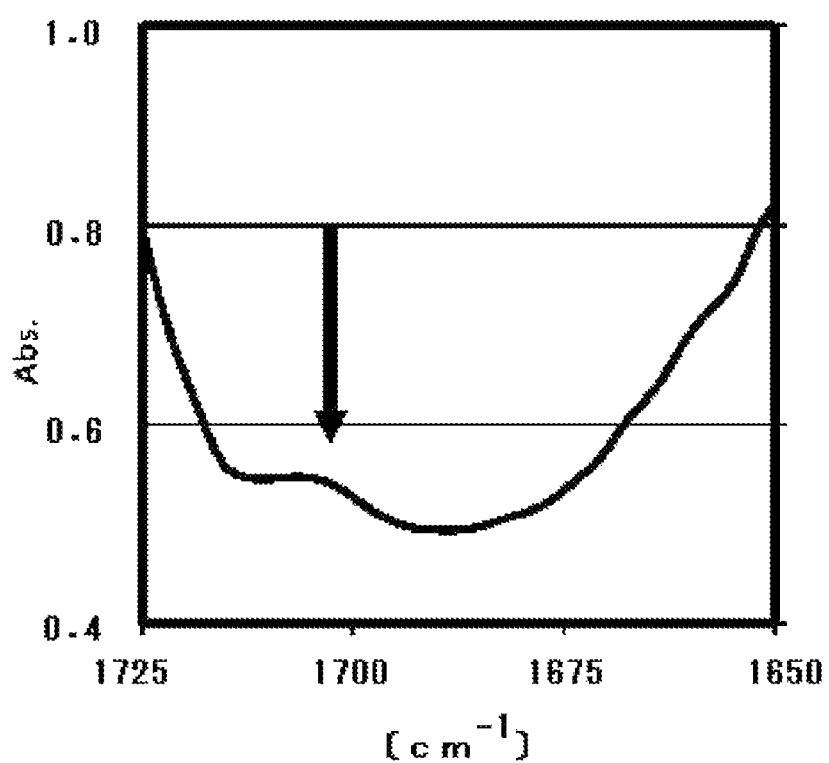
FIG. 3 shows a chart acquired from measurement of the infrared absorption spectrum of poly(p-phenylene sulfide) obtained in Example 4. The arrow (position of 1706 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1706 cm$^{-1}$ as shown in FIG. 3.

Example 5

The same operations as in Example 1 were performed except that 3 parts by mass of phenylisobutyric acid was used in place of benzoic acid to afford poly[methyl(4-phenylthiophenyl)sulfonium methanesulfonate] at a yield of 100%. Thereafter, the same operations as in Example 2 were performed to afford poly(p-phenylene sulfide) at a yield of 51%.

Figure 4:
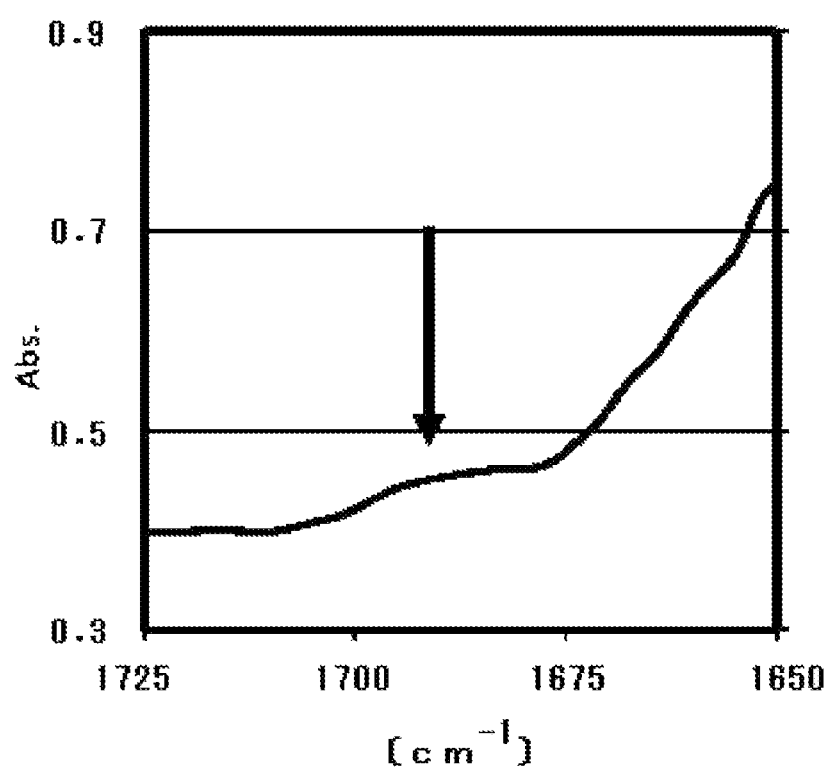
FIG. 4 shows a chart acquired from measurement of the infrared absorption spectrum of poly(p-phenylene sulfide) obtained in Example 5. The arrow (position of 1695 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1695 cm$^{-1}$ as shown in FIG. 4.

Example 6

The same operations as in Example 1 were performed except that 4 parts by mass of phenylmalonic acid was used in place of benzoic acid to afford poly[methyl(4-phenylthiophenyl)sulfonium methanesulfonate] at a yield of 99%.

Thereafter, the same operations as in Example 2 were performed to afford poly(p-phenylene sulfide) at a yield of 47%.

Figure 5:
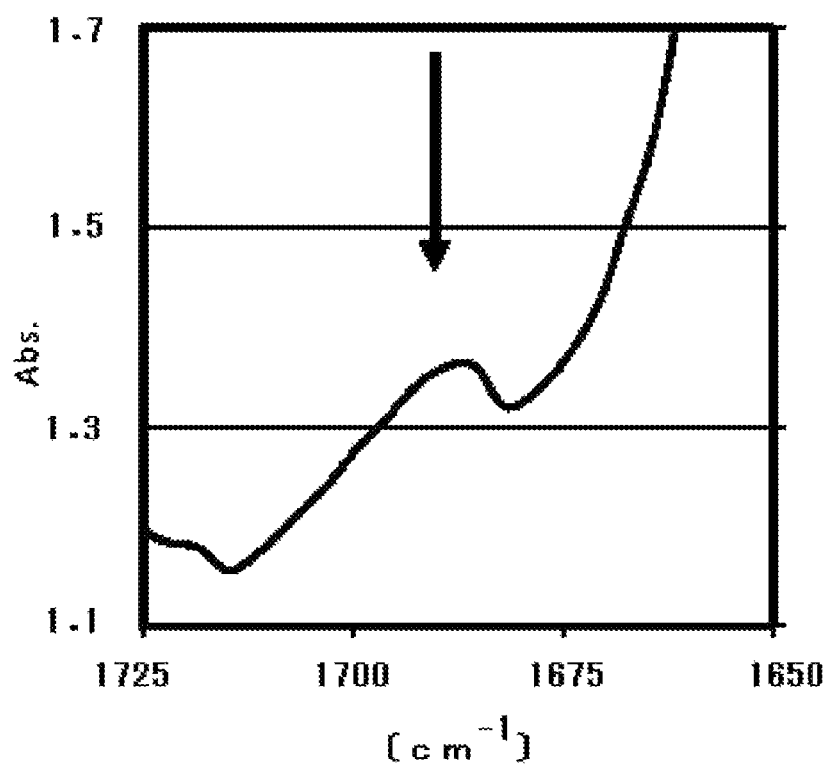
FIG. 5 shows a chart acquired from measurement of the infrared absorption spectrum of poly(p-phenylene sulfide) obtained in Example 6. The arrow (position of 1687 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1687 cm$^{-1}$ as shown in FIG. 5.

Example 7

The same operations as in Example 1 were performed except that 2 parts by mass of phenol was used in place of benzoic acid to afford poly[methyl(4-phenylthiophenyl) sulfonium methanesulfonate] at a yield of 100%. Thereafter, the same operations as in Example 2 were performed to afford poly(p-phenylene sulfide) at a yield of 47%.

Figure 6:
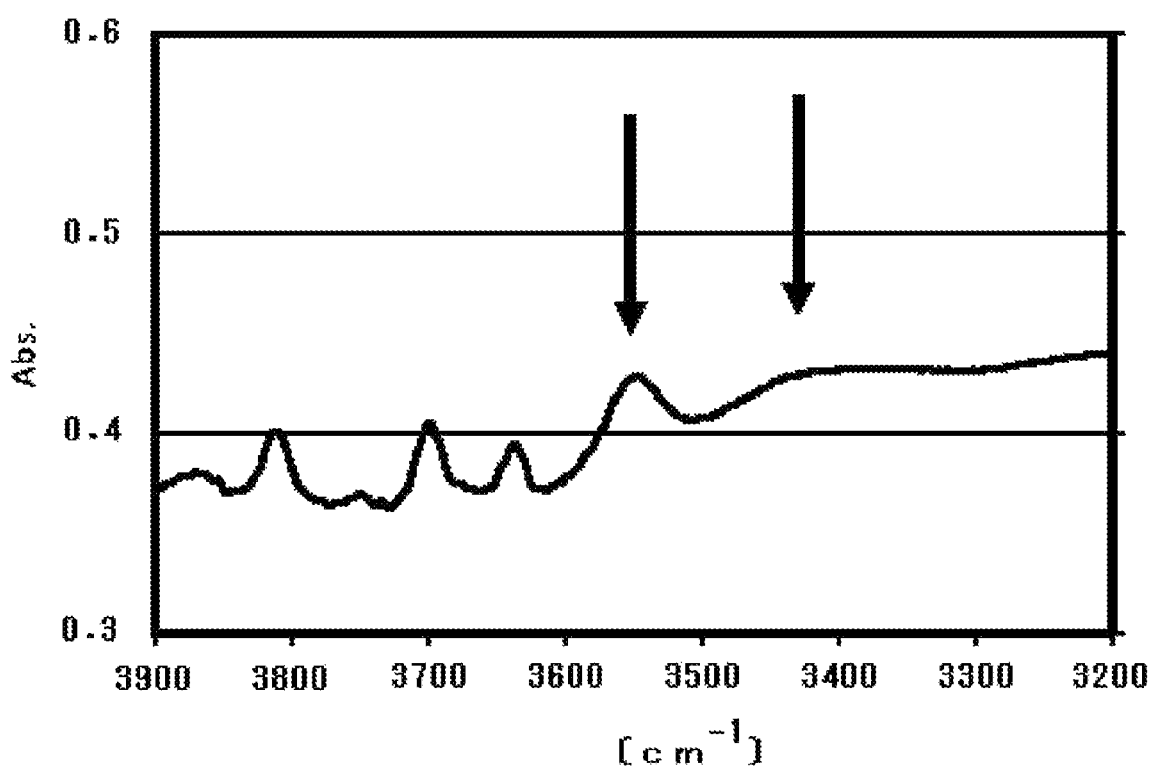
FIG. 6 shows a chart acquired from measurement of the infrared absorption spectrum of poly(p-phenylene sulfide) obtained in Example 7. The arrows (positions of 3551 cm$^{-1}$ and 3500 to 3300 cm$^{-1}$) indicate the absorption peaks derived from the O—H stretching vibration of a hydroxy group.

The infrared absorption spectrum was measured, and it was found that absorption peaks for the free O—H stretching vibration of a hydroxy group were present at positions of 3551 cm$^{-1}$ and 3500 to 3300 cm$^{-1}$ as shown in FIG. 6.

Example 8

The same operations as in Example 1 were performed except that 3 parts by mass of N-phenylglycine was used in place of benzoic acid to afford poly[methyl(4-phenylthiophenyl)sulfonium methanesulfonate] at a yield of 100%. Thereafter, the same operations as in Example 2 were performed to afford poly(p-phenylene sulfide) at a yield of 48%.

Figure 7:
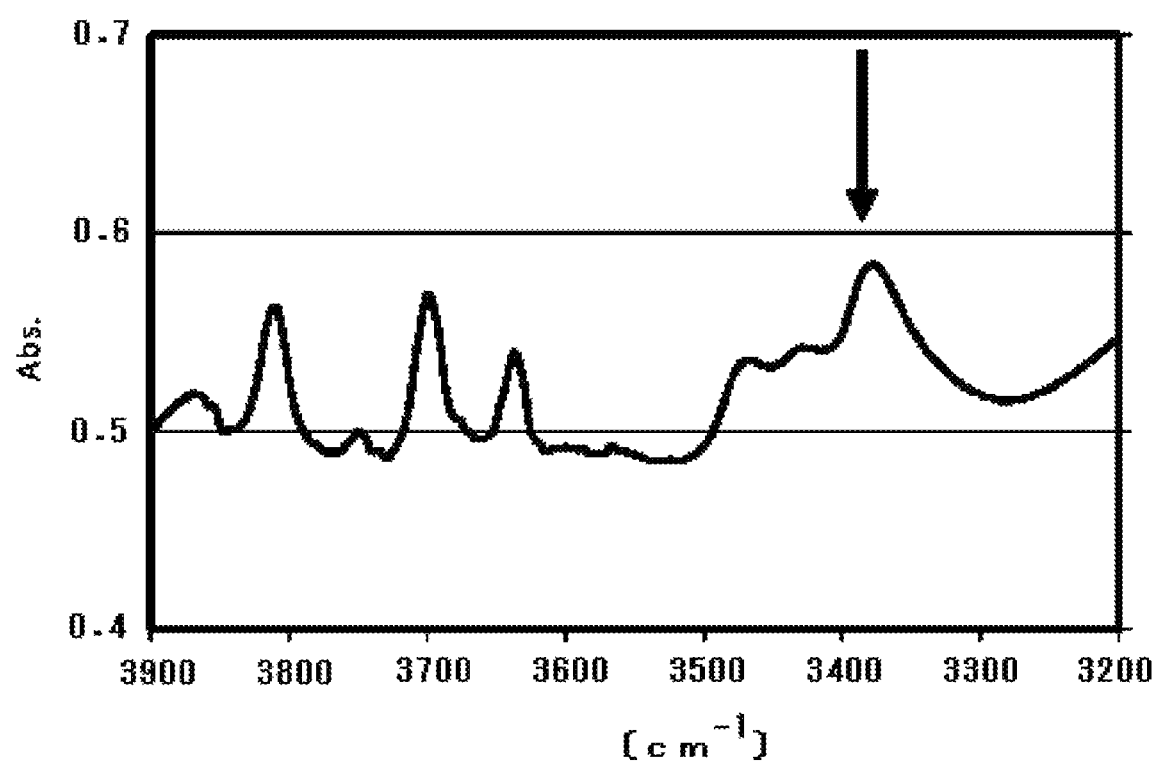
FIG. 7 shows a chart acquired from measurement of the infrared absorption spectrum of poly(p-phenylene sulfide) obtained in Example 8. The arrow (position of 3379 cm$^{-1}$) indicates the absorption peak derived from the N—H stretching vibration of an amino group.
Figure 8:
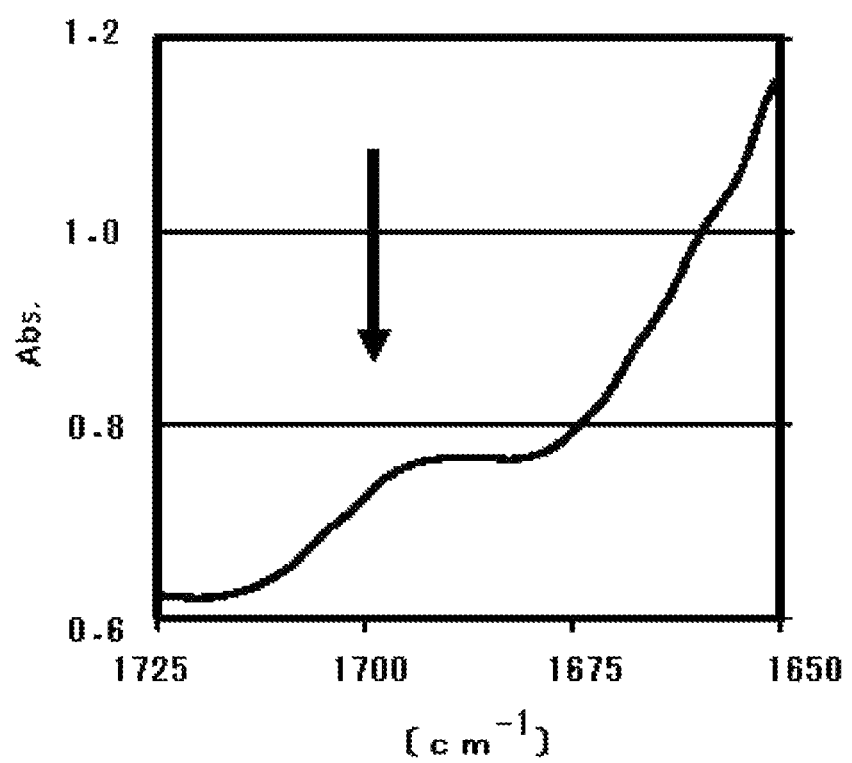
FIG. 8 shows a chart acquired from measurement of the infrared absorption spectrum of poly(p-phenylene sulfide) obtained in Example 8. The arrow (position of 1692 cm$^{-1}$) indicates the absorption peak derived from the C=O stretching vibration of a carboxy group.

The infrared absorption spectrum was measured, and it was found that an absorption peak derived from the N—H stretching vibration of an amino group was present at a position of 3379 cm$^{-1}$ as shown in FIG. 7, and it was found that an absorption peak derived from the C=O stretching vibration of a carboxy group was present at a position of 1692 cm$^{-1}$ as shown in FIG. 8.

Example 9

The same operations as in Example 1 were performed except that 4 parts by mass of N-benzyliminodiacetic acid was used in place of benzoic acid to afford poly[methyl(4-phenylthiophenyl)sulfonium methanesulfonate] at a yield of 98%. Thereafter, the same operations as in Example 2 were performed to afford poly(p-phenylene sulfide) at a yield of 51%.

Figure 9:
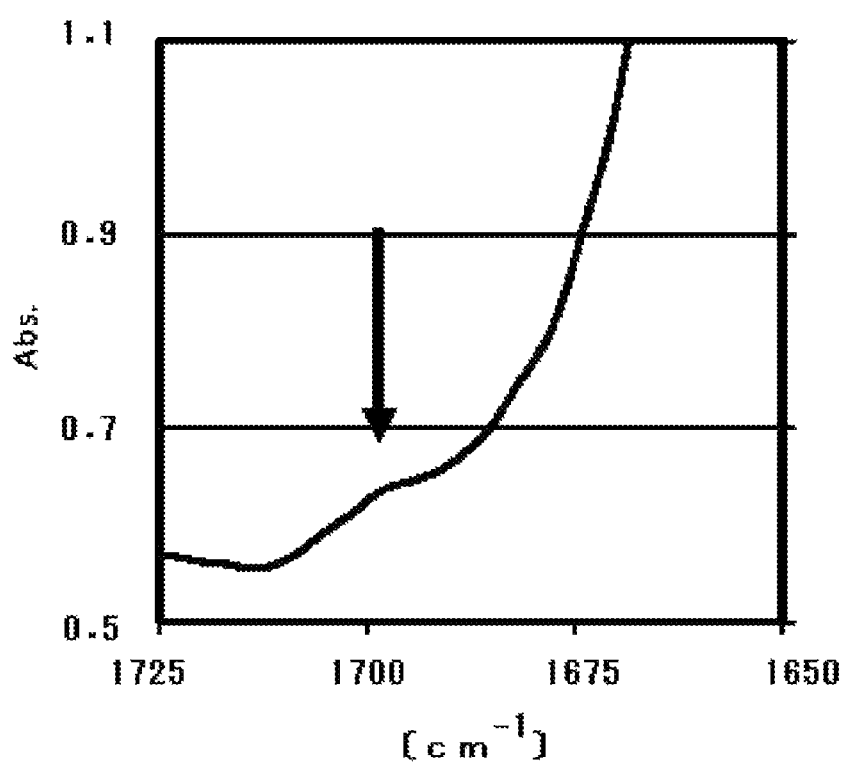
FIG. 9 shows a chart acquired from measurement of the infrared absorption spectrum of poly(p-phenylene sulfide) obtained in Example 9. The arrow (position of 1695 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1695 cm$^{-1}$ as shown in FIG. 9.

Example 10

The same operations as in Example 1 were performed except that 2 parts by mass of aniline was used in place of benzoic acid to afford poly[methyl(4-phenylthiophenyl) sulfonium methanesulfonate] at a yield of 100%. Thereafter, the same operations as in Example 2 were performed to afford poly(p-phenylene sulfide) at a yield of 48%.

Figure 10:
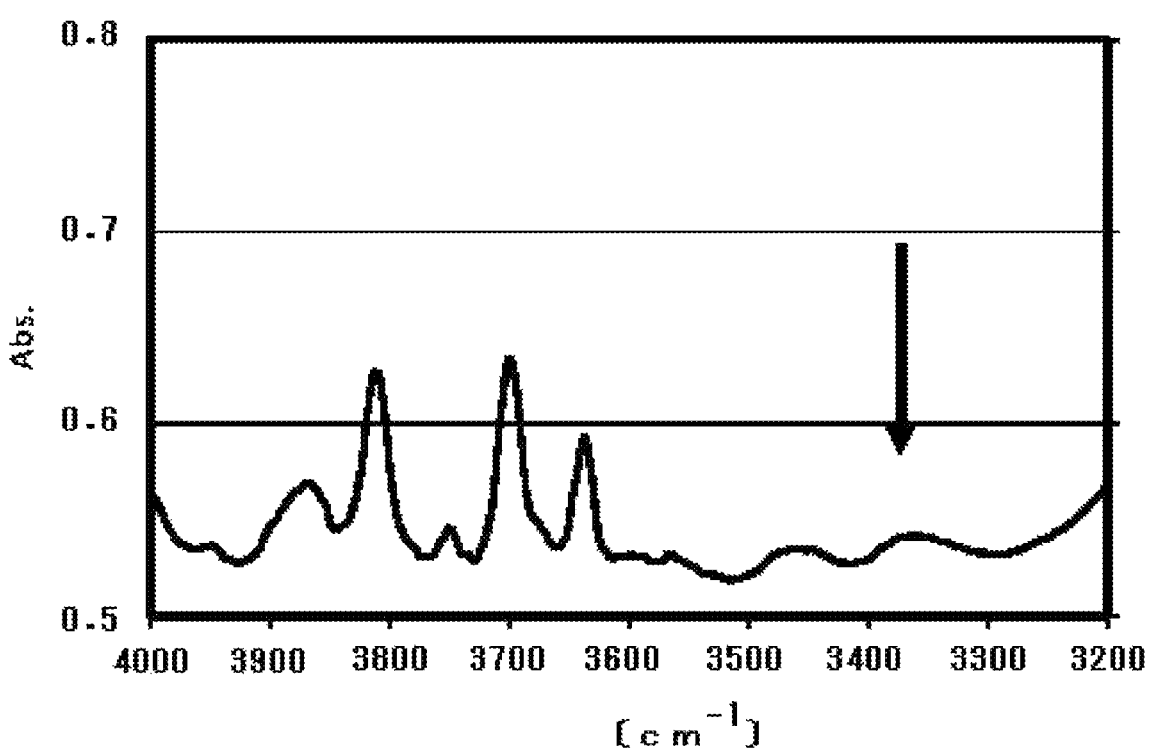
FIG. 10 shows a chart acquired from measurement of the infrared absorption spectrum of poly(p-phenylene sulfide) obtained in Example 10. The arrow (position of 3365 cm$^{-1}$) indicates the absorption peak derived from the N—H stretching vibration of an amino group.

The infrared absorption spectrum was measured, and it was found that an absorption peak derived from the N—H stretching vibration of an amino group was present at a position of 3365 cm$^{-1}$ as shown in FIG. 10.

Reference Example 1

Synthesis of PAS Resin without Terminal Modification

Into a separable flask were added 100 parts by mass of methyl 4-(phenylthio)phenyl sulfoxide, 800 parts by mass of methanesulfonic acid and 70 parts by mass of diphosphorus pentoxide, with cooling to 10° C. or less, and the resultant was stirred for 20 hours. The reaction solution was placed into 10000 parts by mass of acetone, and a solid precipitated was collected and washed with 600 parts by mass of acetone twice. The resulting solid was dried under a reduced pressure to afford poly[methyl(4-phenylthiophenyl)sulfonium methanesulfonate] at a yield of 99%.

Into an eggplant flask were added 100 parts by mass of poly[methyl(4-phenylthiophenyl)sulfonium methanesulfonate] and 800 parts by mass of N-methyl-2-pyrrolidone, and dissolved together. This was stirred at 70° C. for 8 hours, and a solid precipitated was collected through filtration. The resulting solid was charged into an autoclave, and 800 parts by mass of N-methyl-2-pyrrolidone was added thereto, and the resultant was stirred at 230° C. for 1 hour. The solid was collected through filtration, and the solid collected was washed with 1000 parts by mass of water at 70° C. twice. The solid washed was dried at 120° C. for 4 hours to afford the targeted poly(p-phenylene sulfide) at a yield of 72%.

Figure 11:
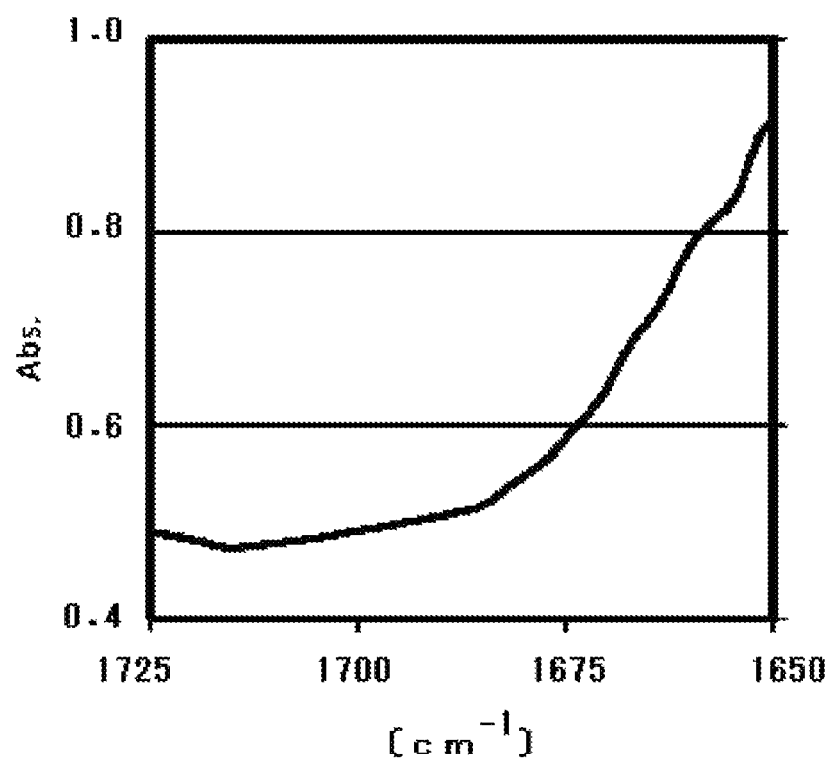
FIG. 11 shows a chart acquired from measurement of the infrared absorption spectrum (range of 1670 to 1720 cm$^{-1}$) of poly(p-phenylene sulfide) obtained in Reference Example 1.
Figure 12:
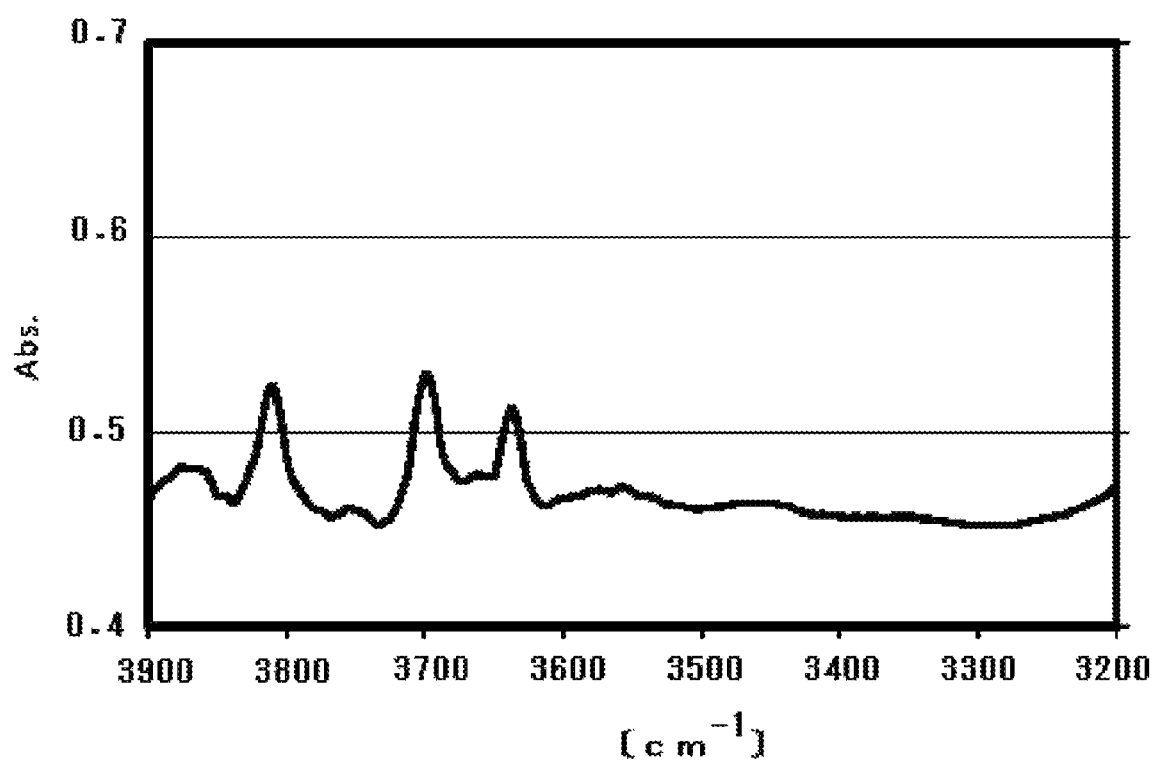
FIG. 12 shows a chart acquired from measurement of the infrared absorption spectrum (range of 3250 to 3650 cm$^{-1}$) of poly(p-phenylene sulfide) obtained in Reference Example 1.

The infrared absorption spectrum was measured, and it was found that no clear absorption peak was present in a range of 1670 to 1720 cm$^{-1}$ as shown in FIG. 11 and in a range of 3250 to 3650 cm$^{-1}$ as shown in FIG. 12. Thus, it was confirmed that the targeted compound did not have any of a hydroxy group, an amino group and a carboxy group.

Table 1 shows the results of measurements of the properties of the resins prepared in Examples 2 to 6. Table 2 shows the results of measurements of the properties of the resins prepared in Examples 7 to 10 and Reference Example 1.

TABLE 1

| | | | Example | | | | |
|---|---|---|---|---|---|---|---|
| | | | 2 | 3 | 4 | 5 | 6 |
| GPC | Mw | [—] | 22,000 | 25,000 | 20,000 | 66,000 | 14,000 |
| DSC | Tg | [° C.] | 97 | 100 | 88 | 95 | 89 |
| | Tm | | 269 | 274 | 272 | 269 | 275 |
| Melt viscosity (V6) | | [Pa · s] | 20 | 23 | 15 | 112 | 10 |

TABLE 2

| | | | Example | | | | Reference Example |
|---|---|---|---|---|---|---|---|
| | | | 7 | 8 | 9 | 10 | 1 |
| GPC | Mw | [—] | 14,000 | 15,000 | 85,000 | 36,000 | 53,000 |
| DSC | Tg | [° C.] | 87 | 91 | 98 | 97 | 99 |
| | Tm | | 277 | 274 | 261 | 264 | 260 |
| Melt viscosity (V6) | | [Pa · s] | 9 | 9 | 155 | 45 | 2,300 |

Example 11

The same operations as in Example 1 were performed except that 0.03 parts by mass of phenylpropionic acid was used in place of benzoic acid to afford poly[methyl(4-phenylthiophenyl)sulfonium methanesulfonate] at a yield of 99%. Thereafter, the same operations as in Example 2 were performed to afford poly(p-phenylene sulfide) at a yield of 83%.

Figure 13:
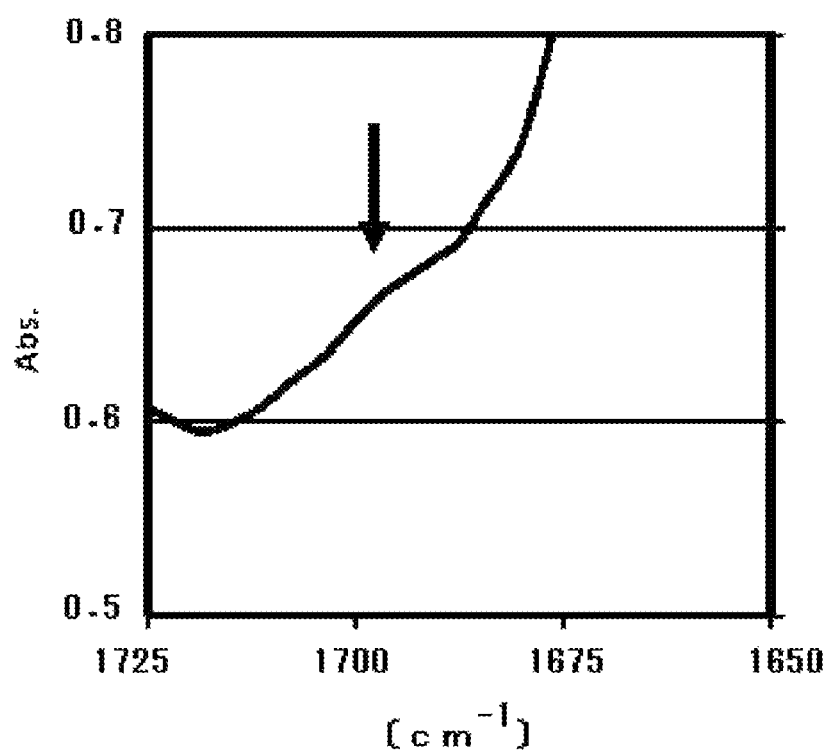
FIG. 13 shows a chart acquired from measurement of the infrared absorption spectrum of poly(p-phenylene sulfide) obtained in Example 11. The arrow (position of 1706 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1706 cm$^{-1}$ as shown in FIG. 13.

Example 12

The same operations as in Example 1 were performed except that 300 parts by mass of phenylpropionic acid was used in place of benzoic acid to afford poly[methyl(4-phenylthiophenyl)sulfonium methanesulfonate] at a yield of 95%. Thereafter, the same operations as in Example 2 were performed to afford poly(p-phenylene sulfide) at a yield of 45%.

Figure 14:
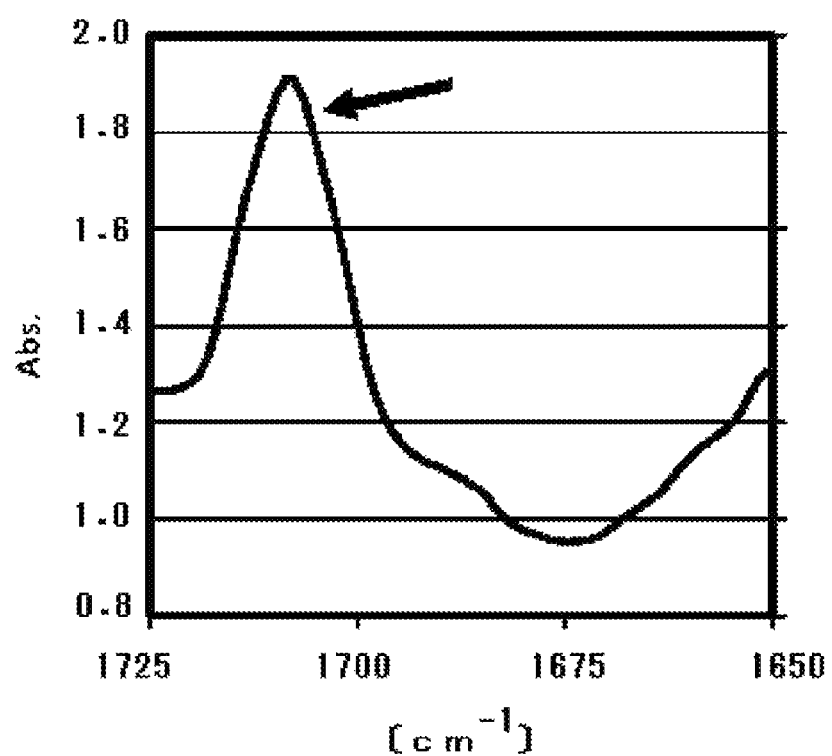
FIG. 14 shows a chart acquired from measurement of the infrared absorption spectrum of poly(p-phenylene sulfide) obtained in Example 12. The arrow (position of 1708 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1708 cm$^{-1}$ as shown in FIG. 14.

Example 13

The same operations as in Example 1 were performed except that polymerization was performed without addition of benzoic acid for 20 hours followed by adding 3 parts by mass of phenylpropionic acid, and then polymerization was further performed for 10 hours to afford poly[methyl(4-phenylthiophenyl)sulfonium methanesulfonate] at a yield of 100%. Thereafter, the same operations as in Example 2 were performed to afford poly(p-phenylene sulfide) at a yield of 68%.

Figure 15:
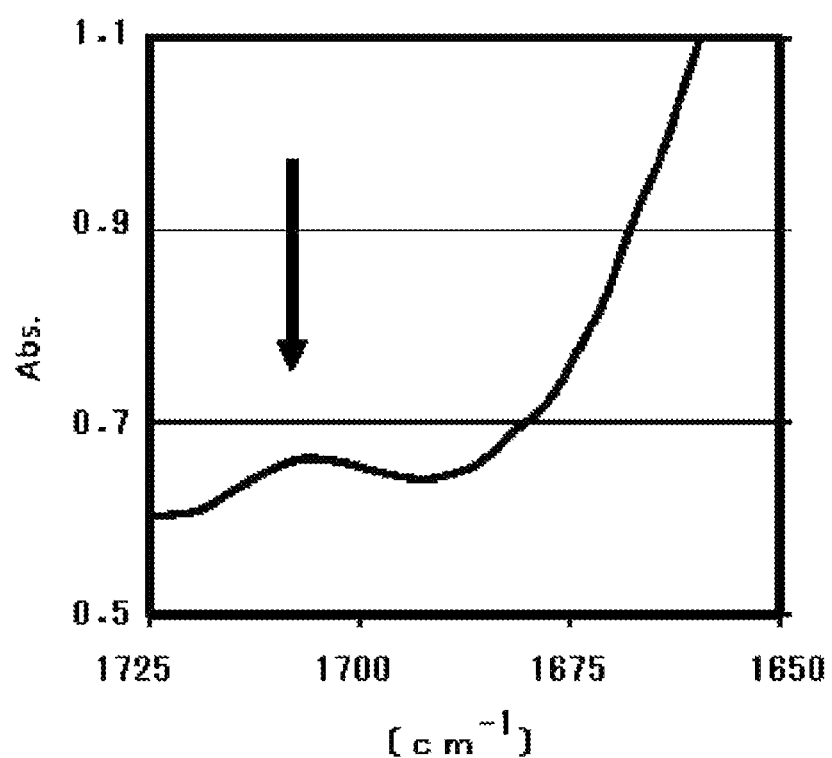
FIG. 15 shows a chart acquired from measurement of the infrared absorption spectrum of poly(p-phenylene sulfide) obtained in Example 13. The arrow (position of 1707 cm$^{-1}$) indicates the absorption peak derived from the C=O stretching vibration of a carboxy group.

The infrared absorption spectrum was measured, and it was found that an absorption peak derived from the C=O stretching vibration of a carboxy group was present at a position of 1707 cm$^{-1}$ as shown in FIG. 15.

Table 3 shows the results of measurements of the properties of the resins prepared in Examples 11 to 13.

TABLE 3

|  |  |  | Example | | |
|---|---|---|---|---|---|
|  |  |  | 11 | 12 | 13 |
| GPC | Mw | [—] | 40,000 | 7,000 | 35,000 |
| DSC | Tg | [° C.] | 95 | 89 | 98 |
|  | Tm |  | 269 | 276 | 268 |
| Melt viscosity (V6) | [Pa · s] |  | 113 | 12 | 120 |

Example 14

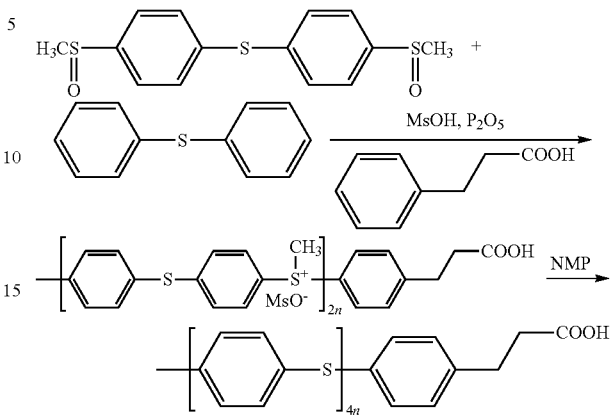

In a separable flask was placed 100 parts by mass of bis[4-(methylsulfinyl)phenyl] sulfide, and 60 parts by mass of diphenyl sulfide, 100 parts by mass of diphosphorus pentoxide and 2.5 parts by mass of phenylpropionic acid were added thereto under a nitrogen atmosphere. After the reaction solution was cooled in an ice bath, 750 parts by mass of methanesulfonic acid was slowly added dropwise. Thereafter, the temperature of the reaction solution was raised to a room temperature, and the reaction solution was stirred for 20 hours. The reaction solution was placed into 10000 parts by mass of acetone, and a solid precipitated was collected through filtration, and washed with 600 parts by mass of acetone twice. The resulting solid was dried under a reduced pressure to afford poly[methyl(4-phenylthiophenyl)sulfonium methanesulfonate] at a yield of 99%. Thereafter, the same operations as in Example 2 were performed to afford poly(p-phenylene sulfide) at a yield of 48%.

Figure 16:
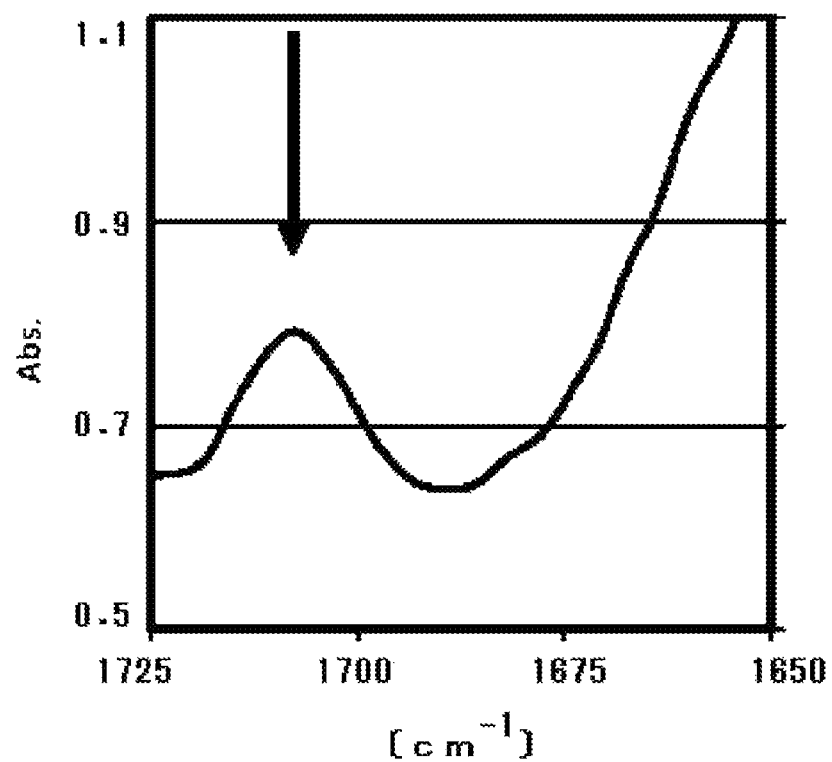
FIG. 16 shows a chart acquired from measurement of the infrared absorption spectrum of poly(p-phenylene sulfide) obtained in Example 14. The arrow (position of 1707 cm$^{-1}$) indicates the absorption peak derived from the C=O stretching vibration of a carboxy group.

The weight-average molecular weight of the obtained resin was measured to be 22000. The result of a thermal analysis showed that the glass transition temperature (Tg) was 92° C., the melting point was 275° C., and the melt viscosity was 10 Pa·s. The infrared absorption spectrum was measured, and it was found that an absorption peak derived from the C=O stretching vibration of a carboxy group was present at a position of 1707 cm$^{-1}$ as shown in FIG. 16.

Example 15

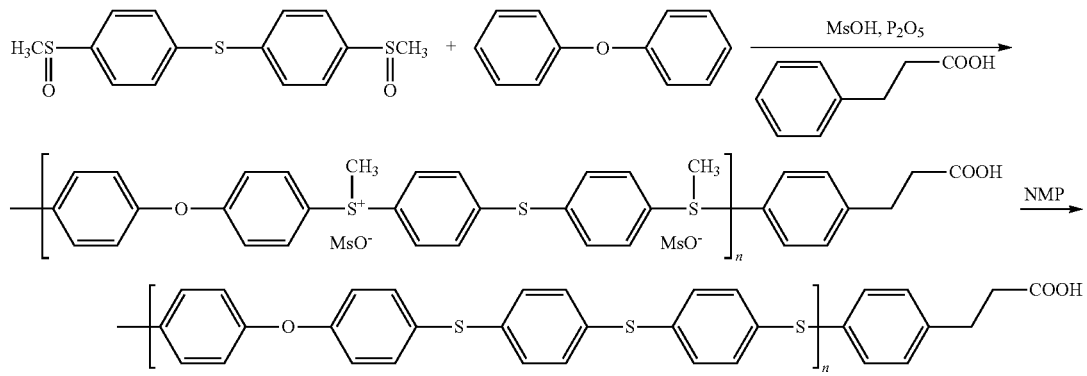

Into a separable flask was added 100 parts by mass of bis[4-(methylsulfinyl)phenyl] sulfide, and 50 parts by mass of diphenyl ether, 100 parts by mass of diphosphorus pentoxide and 2.5 parts by mass of phenylpropionic acid were further added thereto under a nitrogen atmosphere. After the reaction solution was cooled in an ice bath, 750 parts by mass of methanesulfonic acid was slowly added dropwise. The temperature of the reaction solution was raised to a room temperature, and the reaction solution was stirred for 20 hours. The reaction solution was placed into 10000 parts by mass of acetone, and a solid precipitated was collected through filtration, and washed with 600 parts by mass of acetone twice. The resulting solid was dried under a reduced pressure to afford poly[methyl(4-phenyloxyphenyl)sulfonium-4'-methyl(4-phenylthiophen yl)sulfonium methanesulfonate] at a yield of 100%. Thereafter, the same operations as in Example 2 were performed to afford poly [(phenylene ether)-(phenylene sulfide)] at a yield of 46%.

Figure 17:
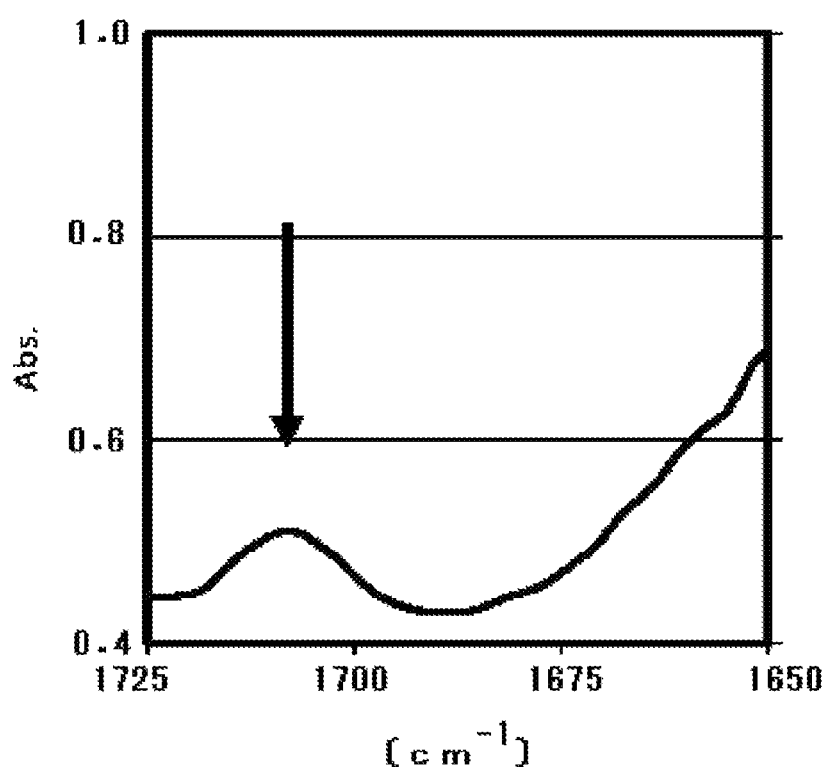
FIG. 17 shows a chart acquired from measurement of the infrared absorption spectrum of poly(p-phenylene sulfide) obtained in Example 15. The arrow (position of 1708 cm$^{-1}$) indicates the absorption peak derived from the C=O stretching vibration of a carboxy group.

The weight-average molecular weight of the obtained resin was measured to be 8000. The result of a thermal analysis showed that the glass transition temperature (Tg) was 95° C., and the melting point was 229° C. The infrared absorption spectrum was measured, and it was found that an absorption peak derived from the C=O stretching vibration of a carboxy group was present at a position of 1708 cm$^{-1}$ as shown in FIG. 17.

Example 16

The same operations as Example 3 were performed until just before drying at 120° C. to obtain a slurry, and to 100 parts by mass of the slurry 1000 parts by mass of warm water and sodium hydroxide were added to adjust the pH to 8.0, and thus the carboxy group at the terminal was ion-exchanged to convert into sodium carboxylate. Thereafter, the reaction solution was stirred for 1 hour, and a solid precipitated was filtered out, and the separated solid was washed with 1000 parts by mass of warm water. This solid was again placed in 1000 parts by mass of warm water, which was stirred for 1 hour, and the solid was filtered out, and then washed with 1000 parts by mass of warm water. This operation was repeated twice. Thereafter, the washed solid was dried at 120° C. for 4 hours to afford poly(p-phenylene sulfide).

Figure 18:
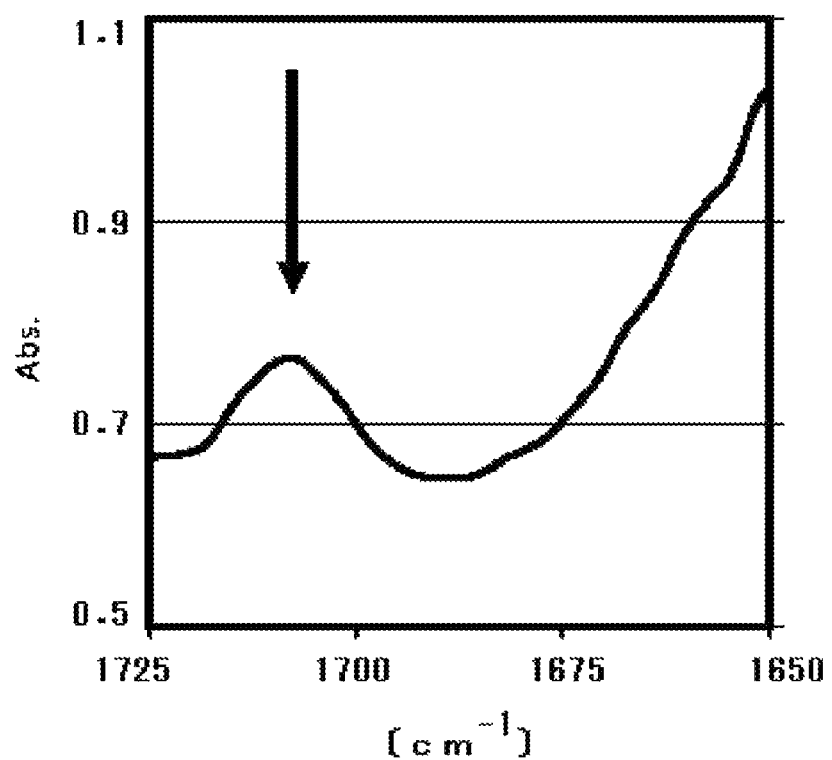
FIG. 18 shows a chart acquired from measurement of the infrared absorption spectrum of poly(p-phenylene sulfide) before base treatment process used in Example 16. The arrow (position of 1708 cm$^{-1}$) indicates the absorption peak derived from the C=O stretching vibration of a carboxy group.
Figure 19:
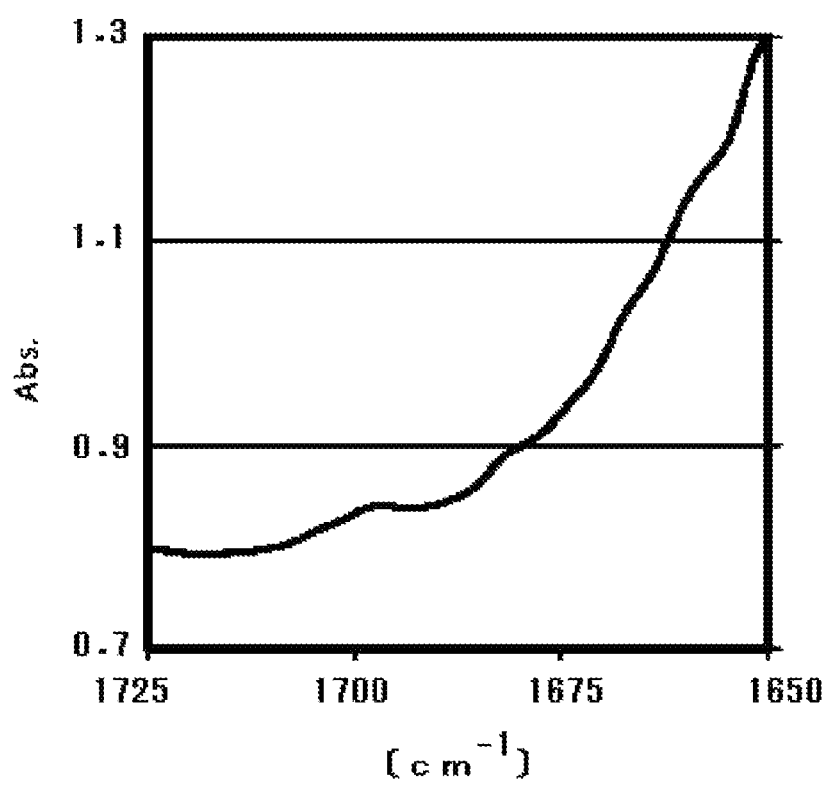
FIG. 19 shows a chart acquired from measurement of the infrared absorption spectrum of poly(p-phenylene sulfide) after base treatment process obtained in Example 16. The absorption peak derived from the C=O stretching vibration of a carboxy group (position of 1708 cm$^{-1}$) is not found for this infrared absorption spectrum chart.

The infrared absorption spectrum was measured, and an absorption peak derived from a carboxy group at a position of 1708 cm$^{-1}$ was found before the base treatment process as shown in FIG. 18 but reduction in the peak strength was found after the base treatment process as shown in FIG. 19, which confirmed that the carboxy group at the terminal had been converted into sodium carboxylate. The melt viscosity was 27 Pa·s.

Example 17

For poly(p-phenylene sulfide) obtained in each of Example 3 and Reference Example 1, the melt stability was tested. The results are shown in Table 4.

TABLE 4

| | | Example 3 | Reference Example 1 |
|---|---|---|---|
| Melt viscosity (V30) | [Pa · s] | 29 | unmeasurable |
| Gelling | presence/absence | absence | presence |

Example 18

The reactivity of the PPS resin obtained in Example 3 was evaluated, and it was found that the melt viscosity (V15) of the PPS resin with epoxy resin was 100 Pa·s, the viscosity being 4 times higher than the melt viscosity (V15) of the PPS resin without epoxy resin. The reactivity of the PPS resin obtained in Example 16 was evaluated in the same manner, and it was found that the melt viscosity (V15) of the PPS resin with epoxy resin was 108 Pa·s, the viscosity being 4 times higher than the melt viscosity (V15) of the PPS resin without epoxy resin.

Example 19

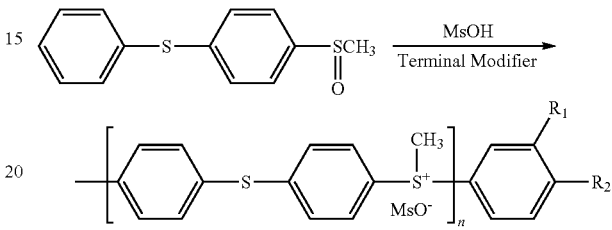

Into a separable flask were added 100 parts by mass of methyl 4-(phenylthio)phenyl sulfoxide and 3 parts by mass of salicylic acid, and 800 parts by mass of methanesulfonic acid and 70 parts by mass of diphosphorus pentoxide were further added thereto with cooling to 10° C. or less, and the resultant was stirred for 20 hours. The reaction solution was placed into 10000 parts by mass of acetone, and a solid precipitated was collected through filtration and washed with 600 parts by mass of acetone twice. The resulting solid was dried under a reduced pressure to afford poly[methyl (4-phenylthiophenyl)sulfonium methanesulfonate] at a yield of 98%. The results of $^1$H-NMR and $^{13}$C-NMR confirmed that the product was formed.

$^1$H-NMR (solvent, DMSO-d$_6$): 3.77, 7.59, 8.03 [ppm]
$^{13}$C-NMR (solvent, DMSO-d$_6$): 27.1, 127.1, 131.7, 132.9, 140.8 [ppm]

Example 20

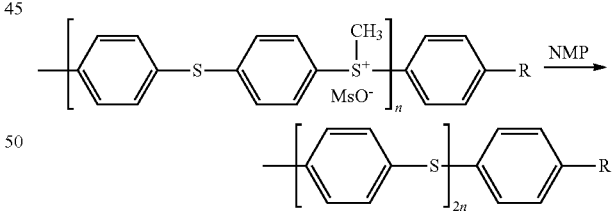

Into an eggplant flask were added 100 parts by mass of poly[methyl(4-phenylthiophenyl)sulfonium methanesulfonate] and 800 parts by mass of N-methyl-2-pyrrolidone, and dissolved together. This was stirred at 70° C. for 8 hours, and a solid precipitated was collected through filtration. The resulting solid was charged into an autoclave, and 800 parts by mass of N-methyl-2-pyrrolidone was added thereto, and the resultant was stirred at 230° C. for 1 hour. The reaction solution was filtrated to collect the solid, and the solid was washed with 1000 parts by mass of water at 70° C. twice. The solid collected was dried at 120° C. for 4 hours to afford the targeted poly(p-phenylene sulfide) at a yield of 58%.

Figure 20:
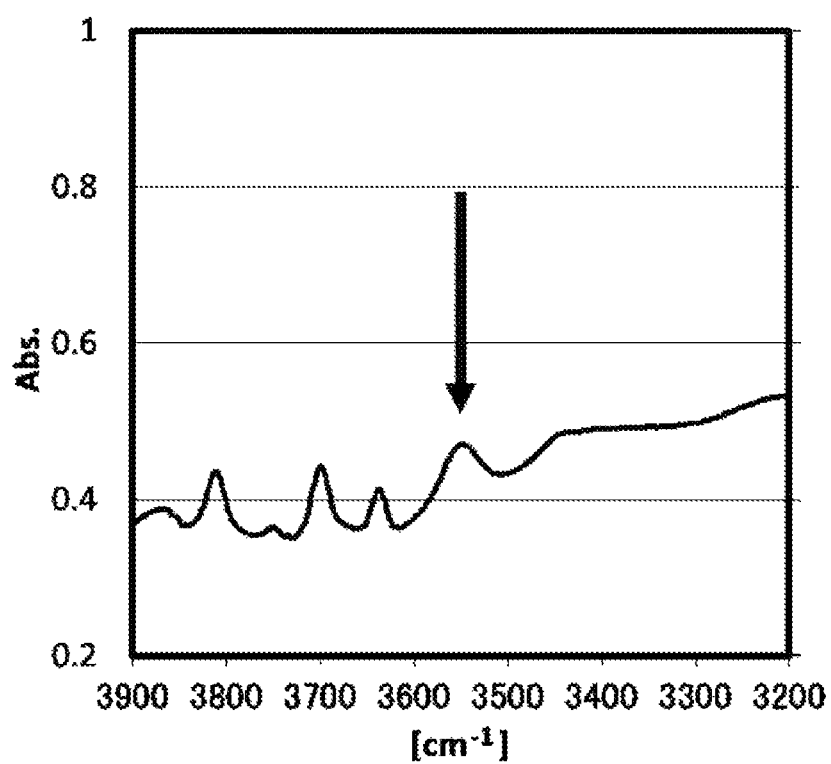
FIG. 20 shows a chart acquired from measurement of the infrared absorption spectrum of poly(p-phenylene sulfide) obtained in Example 20. The arrow (position of 3552 cm$^{-1}$)

The infrared absorption spectrum was measured, and it was found that an absorption peak derived from the free O—H stretching vibration of a hydroxy group was present at a position of 3552 cm$^{-1}$ as shown in FIG. 20, and an absorption peak derived from the C=O stretching vibration of a carboxy group was present at a position of 1687 cm$^{-1}$ as shown in FIG. 21.

Example 21

The same operations as in Example 19 were performed except that 3 parts by mass of 2-hydroxyphenylacetic acid was used in place of salicylic acid to afford poly[methyl(4-phenylthiophenyl)sulfonium methanesulfonate] at a yield of 97%. Thereafter, the same operations as in Example 20 were performed to afford poly(p-phenylene sulfide) at a yield of 72%.

The infrared absorption spectrum was measured, and it was found that an absorption peak derived from the free O—H stretching vibration of a hydroxy group was present at a position of 3555 cm$^{-1}$ as shown in FIG. 22, and an absorption peak derived from the C=O stretching vibration of a carboxy group was present at a position of 1690 cm$^{-1}$ as shown in FIG. 23.

Example 22

The same operations as in Example 19 were performed except that 2 parts by mass of hydroquinone was used in place of salicylic acid to afford poly[methyl(4-phenylthiophenyl)sulfonium methanesulfonate] at a yield of 97%. Thereafter, the same operations as in Example 20 were performed to afford poly(p-phenylene sulfide) at a yield of 72%.

The infrared absorption spectrum was measured, and it was found that an absorption peak derived from the free O—H stretching vibration of a hydroxy group was present at a position of 3555 cm$^{-1}$ as shown in FIG. 24.

Example 23

The same operations as in Example 19 were performed except that 2 parts by mass of catechol was used in place of salicylic acid to afford poly[methyl(4-phenylthiophenyl)sulfonium methanesulfonate] at a yield of 97%. Thereafter, the same operations as in Example 20 were performed to afford poly(p-phenylene sulfide) at a yield of 72%.

The infrared absorption spectrum was measured, and it was found that an absorption peak derived from the free O—H stretching vibration of a hydroxy group was present at a position of 3524 cm$^{-1}$ as shown in FIG. 25.

Example 24

The same operations as in Example 19 were performed except that 2 parts by mass of aminophenol was used in place of salicylic acid to afford poly[methyl(4-phenylthiophenyl)sulfonium methanesulfonate] at a yield of 97%. Thereafter, the same operations as in Example 20 were performed to afford poly(p-phenylene sulfide) at a yield of 72%.

The infrared absorption spectrum was measured, and it was found that an absorption peak derived from the free O—H stretching vibration of a hydroxy group was present at a position of 3555 cm$^{-1}$ as shown in FIG. 26, and absorption peaks derived from the N—H stretching vibration of an amino group were present at positions of 3433 cm$^{-1}$ and 3377 cm$^{-1}$ as shown in FIG. 27.

Example 25

The same operations as in Example 19 were performed except that 3 parts by mass of 4-aminobenzoic acid was used in place of salicylic acid to afford poly[methyl(4-phenylthiophenyl)sulfonium methanesulfonate] at a yield of 97%. Thereafter, the same operations as in Example 20 were performed to afford poly(p-phenylene sulfide) at a yield of 72%.

The infrared absorption spectrum was measured, and it was found that absorption peaks derived from the N—H stretching vibration of an amino group were present at positions of 3433 cm$^{-1}$ and 3377 cm$^{-1}$ as shown in FIG. 28, and an absorption peak derived from the C=O stretching vibration of a carboxy group was present at a position of 1689 cm$^{-1}$ as shown in FIG. 29.

Table 5 shows the results of measurements of the properties of the resins prepared in Examples 20 to 25 and Reference Example 1.

TABLE 5

| | | | Example | | | | | | Ref. |
|---|---|---|---|---|---|---|---|---|---|
| | | | 20 | 21 | 22 | 23 | 24 | 25 | Ex. 1 |
| GPC | Mw | [—] | 14,000 | 22,000 | 11,000 | 13,000 | 25,000 | 101,000 | 53,000 |
| DSC | Tg | [° C.] | 88 | 92 | 81 | 85 | 91 | 95 | 99 |
| | Tm | | 277 | 273 | 276 | 277 | 275 | 260 | 260 |
| Melt viscosity (V6) | | [Pa · s] | 8 | 11 | 6 | 6 | 23 | 178 | 2,300 |

Example 26

The same operations as in Example 19 were performed except that 0.15 parts by mass of salicylic acid was used to afford poly[methyl(4-phenylthiophenyl)sulfonium methanesulfonate] at a yield of 97%. Thereafter, the same operations as in Example 20 were performed to afford poly(p-phenylene sulfide) at a yield of 65%.

The infrared absorption spectrum was measured, and it was found that an absorption peak derived from the free O—H stretching vibration of a hydroxy group was present at a position of 3555 cm$^{-1}$ as shown in FIG. 30, and an absorption peak derived from the C=O stretching vibration of a carboxy group was present at a position of 1691 cm$^{-1}$ as shown in FIG. 31.

Example 27

The same operations as in Example 19 were performed except that 30 parts by mass of salicylic acid was used to afford poly[methyl(4-phenylthiophenyl)sulfonium methanesulfonate] at a yield of 97%. Thereafter, the same operations as in Example 20 were performed to afford poly(p-phenylene sulfide) at a yield of 48%.

The infrared absorption spectrum was measured, and it was found that an absorption peak derived from the free O—H stretching vibration of a hydroxy group was present at a position of 3554 cm$^{-1}$ as shown in FIG. 32, and an absorption peak derived from the C=O stretching vibration of a carboxy group was present at a position of 1692 cm$^{-1}$ as shown in FIG. 33.

Example 28

The same operations as in Example 19 were performed except that polymerization was performed without addition of salicylic acid for 20 hours followed by adding 3 parts by mass of salicylic acid, and then polymerization was further performed for 10 hours to afford poly[methyl(4-phenylthiophenyl)sulfonium methanesulfonate] at a yield of 100%. Thereafter, the same operations as in Example 20 were performed to afford poly(p-phenylene sulfide) at a yield of 58%.

The infrared absorption spectrum was measured, and it was found that an absorption peak derived from the free O—H stretching vibration of a hydroxy group was present at a position of 3552 cm$^{-1}$ as shown in FIG. 34, and an absorption peak derived from the C=O stretching vibration of a carboxy group was present at a position of 1692 cm$^{-1}$ as shown in FIG. 35.

Table 6 shows the results of measurements of the properties of the resins prepared in Examples 26 to 28.

TABLE 6

|  |  |  | Example | | |
|---|---|---|---|---|---|
|  |  |  | 26 | 27 | 28 |
| GPC | Mw | [—] | 28,000 | 7,000 | 63,000 |
| DSC | Tg | [° C.] | 83 | 93 | 89 |
|  | Tm |  | 277 | 272 | 275 |
| Melt viscosity (V6) | [Pa · s] |  | 25 | 3 | 132 |

Example 29

The operations in Example 20 were performed until just before drying at 120° C. to obtain a slurry, and to 100 parts by mass of the slurry 1000 parts by mass of warm water and sodium hydroxide were added to adjust the pH to 8.0, and thus the carboxy group at the terminal was ion-exchanged to convert into sodium carboxylate. The reaction solution was stirred for 1 hour, and filtered to collect a solid, and the solid collected was washed with 1000 parts by mass of warm water. The solid collected was again added to 1000 parts by mass of warm water, and the resultant was stirred for 1 hour, and the solid was filtered out, and then washed with 1000 parts by mass of warm water. This washing operation was repeated twice. Thereafter, the washed solid was dried at 120° C. for 4 hours to afford poly(p-phenylene sulfide).

The infrared absorption spectrum was measured, and an absorption peak derived from a carboxy group at a position of 1687 cm$^{-1}$ was found before the base treatment process as shown in FIG. 21. On the other hand, reduction in the peak strength of the carboxy group absorption peak was found after the base treatment process as shown in FIG. 36, which confirmed that the carboxy group had been converted into sodium carboxylate. The melt viscosity was 9 Pa·s.

Example 30

For poly(p-phenylene sulfide) obtained in each of Example 20 and Reference Example 1, the melt stability was evaluated. The results are shown in Table 7.

TABLE 7

|  |  | Example 20 | Reference Example 1 |
|---|---|---|---|
| Melt viscosity (V30) | [Pa · s] | 10 | unmeasurable |
| Gelling | presence/absence | absence | presence |

Example 31

The reactivity of the PPS resin obtained in Example 20 was evaluated, and it was found that the melt viscosity (V15) of the PPS resin with epoxy resin was 69 Pa·s, the viscosity being 9 times higher than the melt viscosity (V15) of the PPS resin without epoxy resin. The reactivity of the PPS resin obtained in Example 26 was evaluated in the same manner, and it was found that the melt viscosity (V15) of the PPS resin with epoxy resin was 72 Pa·s, the viscosity being 9 times higher than the melt viscosity (V15) of the PPS resin without epoxy resin.

Example 32

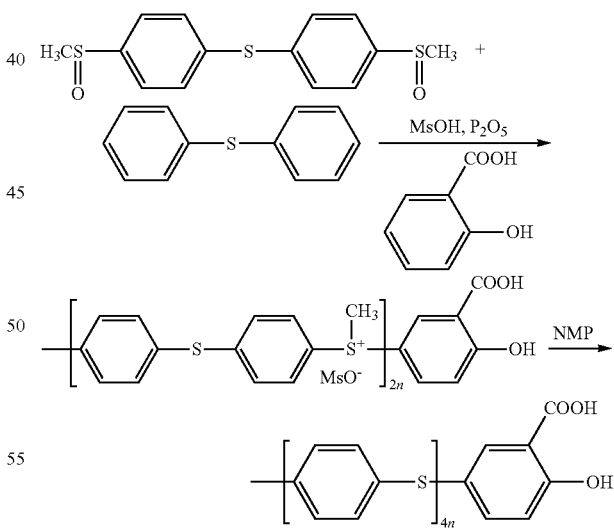

The same operations as in Example 14 were performed except that 2.5 parts by mass of salicylic acid was used to afford poly[methyl(4-phenylthiophenyl)sulfonium methanesulfonate] at a yield of 98%. Thereafter, the same operations as in Example 2 were performed to afford poly(p-phenylene sulfide) at a yield of 46%.

The weight-average molecular weight of the obtained resin was measured to be 25000. The result of a thermal analysis showed that the glass transition temperature (Tg) was 93° C., the melting point was 271° C., and the melt viscosity was 21 Pa·s. The infrared absorption spectrum was measured, and it was found that an absorption peak derived from the free O—H stretching vibration of a hydroxy group was present at a position of 3552 cm$^{-1}$ as shown in FIG. 37, and an absorption peak derived from the C═O stretching vibration of a carboxy group was present at a position of 1686 cm$^{-1}$ as shown in FIG. 38.

Example 33

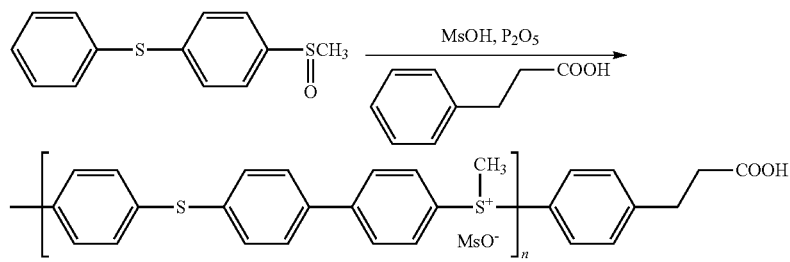

In a separable flask were placed 100 parts by mass of 4-methylsulfinyl-4'-(phenylthio)biphenyl and 3 parts by mass of phenylpropionic acid, and 500 parts by mass of methanesulfonic acid and 50 parts by mass of diphosphorus pentoxide were further added thereto with cooling to 10° C. or less, and the resultant was stirred for 20 hours. The reaction solution was placed into 10000 parts by mass of acetone, and a solid precipitated was collected through filtration and washed with 600 parts by mass of acetone twice. The resulting solid was dried under a reduced pressure to afford poly{methyl-4-[4-(phenylthio)phenyl]phenylsulfonium methanesulfonate} at a yield of 98%.

$^1$H-NMR (solvent, DMSO-d$_6$): 3.84, 7.63, 7.86, 8.04, 8.14 [ppm]

Example 34

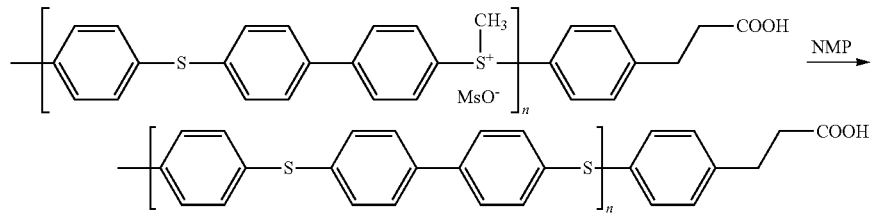

Into an eggplant flask was added 100 parts by mass of poly {methyl-4-[4-(phenylthio)phenyl]phenylsulfonium methanesulfonate}, and dissolved in 800 parts by mass of N-methyl-2-pyrrolidone. This was stirred at 70° C. for 8 hours, and a solid precipitated was collected through filtration. The resulting solid was charged into an autoclave, and 800 parts by mass of N-methyl-2-pyrrolidone was added thereto, and the resultant was stirred at 230° C. for 1 hour. The solid was collected through filtration, and washed with 1000 parts by mass of water at 70° C. twice. Thereafter, the washed solid was dried at 120° C. for 4 hours to afford poly(p-phenylenethio-p,p'-biphenylylene sulfide) at a yield of 67%.

The infrared absorption spectrum was measured, and it was found that an absorption peak derived from the C═O stretching vibration of a carboxy group was present at a position of 1708 cm$^{-1}$ as shown in FIG. 39.

Example 35

The same operations as in Example 33 were performed except that 3 parts by mass of salicylic acid was used in place of phenylpropionic acid to afford poly{methyl-4-[4-(phenylthio)phenyl]phenylsulfonium methanesulfonate} at a yield of 95%. Thereafter, the same operations as in Example 34 were performed to afford poly(p-phenylenethio-p,p'-biphenylylene sulfide) at a yield of 45%.

The infrared absorption spectrum was measured, and it was found that an absorption peak derived from the free O—H stretching vibration of a hydroxy group was present at a position of 3567 cm$^{-1}$ as shown in FIG. 40, and an absorption peak derived from the C═O stretching vibration of a carboxy group was present at a position of 1681 cm$^{-1}$ as shown in FIG. 41.

Example 36

The same operations as in Example 33 were performed except that 2 parts by mass of phenol was used in place of phenylpropionic acid to afford poly{methyl-4-[4-(phenylthio)phenyl]phenylsulfonium methanesulfonate} at a yield of 96%. Thereafter, the same operations as in Example 34 were performed to afford poly(p-phenylenethio-p,p'-biphenylylene sulfide) at a yield of 42%.

The infrared absorption spectrum was measured, and it was found that an absorption peak derived from the free O—H stretching vibration of a hydroxy group was present at a position of 3567 cm$^{-1}$ as shown in FIG. 42.

Reference Example 2

Into a separable flask were added 100 parts by mass of 4-methylsulfinyl-4'-(phenylthio)biphenyl and 50 parts by mass of diphosphorus pentoxide, and 500 parts by mass of methanesulfonic acid was further added thereto dropwise at 0° C. The reaction solution was stirred at 25° C. for 20 hours, and this was poured into acetone to terminate the reaction. A solid precipitated was taken out through filtration, and washed with acetone. The solid washed was dried under a reduced pressure to afford poly{methyl-4-[4-(phenylthio)phenyl]phenylsulfonium methanesulfonate} at a yield of 93%. $^1$H-NMR confirmed that the product was produced.

$^1$H-NMR (solvent, DMSO-$d_6$): 3.84, 7.63, 7.87, 8.04, 8.15 [ppm]

Into an eggplant flask were added 100 parts by mass of poly{methyl-4-[4-(phenylthio)phenyl]phenylsulfonium methanesulfonate} and 5000 parts by mass of pyridine. The reaction solution was stirred at 25° C. for 30 minutes, and then stirred at 110° C. for 20 hours. The reaction solution was placed into water to terminate the reaction, and a solid precipitated was taken out through filtration. The solid was washed with chloroform, NMP and water. The solid washed was dried under a reduced pressure to afford poly(p-phenylenethio-p,p'-biphenylylene sulfide) at a yield of 43%.

The infrared absorption spectrum was measured, and it was found that no clear absorption peak was present in a range of 3250 to 3650 cm$^{-1}$ as shown in FIG. 43 and in a range of 1670 to 1720 cm$^{-1}$ as shown in FIG. 44. Thus, it was confirmed that the targeted compound did not have any of a hydroxy group, an amino group and a carboxy group.

Table 8 shows the results of measurements of the properties of the resins prepared in Examples 34, 35 and 36, and Reference Example 2.

TABLE 8

|  |  |  | Example | | | Reference |
| --- | --- | --- | --- | --- | --- | --- |
|  |  |  | 34 | 35 | 36 | Example 2 |
| GPC | Mw | [–] | 4,000 (reference value) | 10,000 | 8,000 | unmeasurable |
| DSC | Tg | [° C.] | 162 | 155 | 126 | 164 |
|  | Tm |  | 352 | 372 | 369 | 347 |

Example 37

Into a separable flask was added 100 parts by mass of bis[4-(methylsulfinyl)]biphenyl, and 66 parts by mass of diphenyl sulfide, 130 parts by mass of diphosphorus pentoxide and 2 parts by mass of salicylic acid were further added thereto under a nitrogen atmosphere. After the reaction solution was cooled in an ice bath, 1300 parts by mass of methanesulfonic acid was slowly added dropwise. The temperature of the reaction solution was raised to a room temperature, and the reaction solution was stirred for 20 hours. The reaction solution was placed into 10000 parts by mass of acetone, and a solid precipitated was collected through filtration, and washed with 600 parts by mass of acetone twice. The resulting solid was dried under a reduced pressure to afford poly[methyl(4-phenylthiophenyl)sulfonium-4'-thiomethyl(biphenyl)sulfonium methanesulfonate] at a yield of 98%. Thereafter, the same operations as in Example 34 were performed to afford poly(p-phenylenethio-p-phenylenethio-p,p'-biphenylylene sulfide) at a yield of 70%.

The weight-average molecular weight of the obtained resin was measured to be 18000. The result of a thermal analysis showed that the glass transition temperature (Tg) was 122° C., and the melting point was 330° C. The infrared absorption spectrum was measured, and it was found that an absorption peak derived from the O—H stretching vibration of a hydroxy group was present at a position of 3454 cm$^{-1}$ as shown in FIG. 45, and an absorption peak derived from the C=O stretching vibration of a carboxy group was present at a position of 1684 cm$^{-1}$ as shown in FIG. 46.

The invention claimed is:

1. A method for producing a polyarylene sulfide resin comprising a main chain including a constitutional unit represented by the following formula (1-1) or the following formula (2-1) and a terminal group bonding to a terminal of the main chain and including at least one functional group selected from the group consisting of a carboxy group, a hydroxy group and an amino group, the method comprising:
   a step of dealkylating or dearylating a poly(arylene sulfonium salt) comprising a main chain including a constitutional unit represented by the following formula (1-2) or a constitutional unit represented by the following formula (2-2) and a terminal group bonding to a terminal of the main chain and including at least one functional group selected from the group consisting of a carboxy group, a hydroxy group and an amino group:

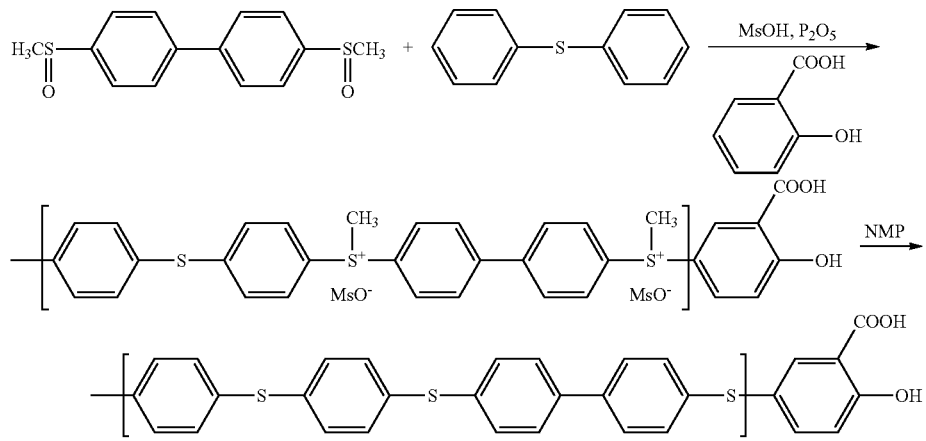

-continued

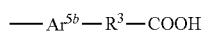
(2-1)

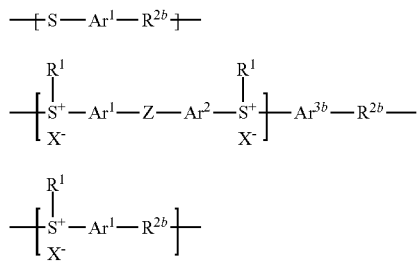
(1-2)

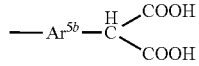
(2-2)

wherein, in formulas (1-1), (1-2), (2-1) and (2-2), $R^1$ represents an alkyl group having 1 to 10 carbon atoms or an aryl group optionally having an alkyl group having 1 to 10 carbon atoms; $R^{2b}$ represents a direct bond, —$Ar^{4b}$—, —S—$Ar^{4b}$—, —O—$Ar^{4b}$—, —CO—$Ar^{4b}$—, —$SO_2$—$Ar^{4b}$— or —$C(CF_3)_2$—$Ar^{4b}$—; $Ar^1$, $Ar^2$, $Ar^{3b}$ and $Ar^{4b}$ each independently represent an arylene group optionally having a substituent; Z represents a direct bond, —S—, —O—, —CO—, —$SO_2$— or —$C(CF_3)_2$—; and $X^-$ represents an anion.

2. The method for producing a polyarylene sulfide resin according to claim 1, wherein the terminal group included in the polyarylene sulfide resin and the poly(arylene sulfonium salt) is a group represented by the following formula (3-1b), (3-2b), (3-3b), (3-4b), (3-5b) or (3-6b):

—$Ar^{5b}$—$R^3$—COOH  (3-1b)

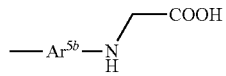
(3-2b)

(3-3b)

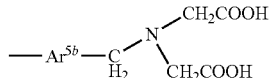
(3-4b)

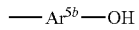
—$Ar^{5b}$—OH  (3-5b)

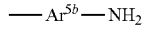
—$Ar^{5b}$—$NH_2$  (3-6b)

wherein $R^3$ represents a direct bond or an alkylene group having 1 to 10 carbon atoms; and $Ar^{5b}$ represents an aryl group.

3. The method for producing a polyarylene sulfide resin according to claim 1, wherein the terminal group included in the polyarylene sulfide resin and the poly(arylene sulfonium salt) is a group represented by the following formula (4-1b), (4-2b), (4-3b) or (4-4b):

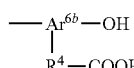
(4-1b)

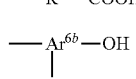
(4-2b)

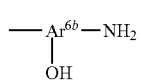
(4-3b)

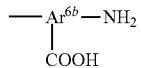
(4-4b)

wherein $R^4$ represents a direct bond or an alkylene group having 1 to 10 carbon atoms; and $Ar^{6b}$ represents an aryl group.

* * * * *